United States Patent
Park et al.

(10) Patent No.: US 11,095,348 B2
(45) Date of Patent: Aug. 17, 2021

(54) METHOD AND APPARATUS FOR UPLINK SIGNAL TRANSMISSION BASED ON CODEBOOK IN A WIRELESS COMMUNICATION SYSTEM

(71) Applicant: LG ELECTRONICS INC., Seoul (KR)

(72) Inventors: Haewook Park, Seoul (KR); Jonghyun Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/993,971

(22) Filed: Aug. 14, 2020

(65) Prior Publication Data

US 2021/0050890 A1 Feb. 18, 2021

Related U.S. Application Data

(60) Provisional application No. 62/887,792, filed on Aug. 16, 2019.

(51) Int. Cl.
*H04W 72/04* (2009.01)
*H04B 7/0456* (2017.01)
*H04B 7/06* (2006.01)

(52) U.S. Cl.
CPC ......... *H04B 7/0486* (2013.01); *H04B 7/0626* (2013.01); *H04B 7/0639* (2013.01); *H04W 72/042* (2013.01)

(58) Field of Classification Search
CPC ... H04B 7/0486; H04B 7/0626; H04B 7/0639
See application file for complete search history.

(56) References Cited

U.S. PATENT DOCUMENTS

| 2011/0081935 A1* | 4/2011 | Yeon | H04W 52/146 455/522 |
| 2015/0215023 A1* | 7/2015 | Thurfjell | H04L 25/03898 375/295 |

(Continued)

FOREIGN PATENT DOCUMENTS

KR 1020190027757 3/2019

OTHER PUBLICATIONS

Fujitsu, "Corrections on Codebook based UL transmission," R1-1810479, 3GPP TSG RAN WG1 Meeting #94bis, Chengdu, China, dated Oct. 8-12, 2018, 2 pages.

(Continued)

*Primary Examiner* — Chi Ho A Lee
(74) *Attorney, Agent, or Firm* — Fish & Richardson P.C.

(57) ABSTRACT

A method in which a UE transmits an uplink signal, based on a codebook, in a wireless communication system includes: receiving downlink control information (DCI) for determining a precoding matrix, which is applied to transmission of the uplink signal, from a base station; determining a precoding matrix that is applied to transmission of the uplink signal from a codebook subset related to transmission of the uplink signal, based on the DCI; and transmitting the uplink signal to the base station, based on the determined precoding matrix, in which, based on that differences of phase values applied to antenna ports for transmitting the uplink signal are changed in all pairs of antenna ports, the codebook subset includes at least one specific precoding matrix for full power transmission.

18 Claims, 20 Drawing Sheets

(56) References Cited

U.S. PATENT DOCUMENTS

| | | | | |
|---|---|---|---|---|
| 2016/0218783 A1* | 7/2016 | Janis | ............... | H04B 7/0639 |
| 2017/0343947 A1* | 11/2017 | Hozono | ............ | G03G 15/6502 |
| 2018/0006700 A1* | 1/2018 | Frenne | ............... | H04B 7/0626 |
| 2018/0367193 A1* | 12/2018 | Tan | ..................... | H04B 7/0617 |
| 2019/0312617 A1* | 10/2019 | Wernersson | ........ | H04L 25/0226 |
| 2019/0327691 A1* | 10/2019 | Zhang | ............... | H04B 7/0456 |
| 2019/0349098 A1* | 11/2019 | Jiang | .................. | H04L 1/0015 |
| 2020/0174604 A1* | 6/2020 | Zhang | ................ | G06F 3/0412 |
| 2020/0186215 A1* | 6/2020 | Rahman | ............... | H04W 52/42 |
| 2020/0274604 A1* | 8/2020 | Sun | ..................... | H04B 7/0486 |

OTHER PUBLICATIONS

InterDigital Inc., "On Solutions for Full TX UL Transmission," R1-1906862, 3GPP TSG RAN WG1 #97, Reno, USA, dated May 13-17, 2019, 7 pages.

MediaTek Inc., "Full Tx power UL transmission," R1-1904477, 3GPP TSG RAN WG1 #96bis, Xi'an, China, dated Apr. 8-12, 2019, 17 pages.

Nokia, Nokia Shanghai Bell, "Discussion on Full Tx power UL transmission," R1-1900693, 3GPP TSG-RAN WG1 Ad-Hoc Meeting #1901, Taipei, Taiwan, dated Jan. 21-25, 2019, 7 pages.

PCT International Search Report in International Appln. No. PCT/KR2020/010952, dated Nov. 27, 2020, 7 pages (with English translation).

* cited by examiner

- DL/UL ACK/NACK
- UE CQI/PMI RI REPORT
  USING PUSCH AND PUCCH (a)

Repetition "on"

(b)

Repetition "off"

METHOD AND APPARATUS FOR UPLINK SIGNAL TRANSMISSION BASED ON CODEBOOK IN A WIRELESS COMMUNICATION SYSTEM

CROSS-REFERENCE TO RELATED APPLICATIONS

This application claims priority to Provisional Application No. 62/887,792 filed on 16 Aug. 2019 in US the entire contents of which is hereby incorporated by reference in its entirety.

BACKGROUND OF THE INVENTION

Field of the Invention

The present disclosure relates to a wireless communication system, and more particularly, to a method for transmitting an uplink signal based on a codebook in a wireless communication system, and an apparatus therefor.

Related Art

Mobile communication systems have been developed to guarantee user activity while providing voice services. Mobile communication systems are expanding their services from voice only to data. Current soaring data traffic is depleting resources and users' demand for higher-data rate services is leading to the need for more advanced mobile communication systems.

Next-generation mobile communication systems are required to meet, e.g., handling of explosively increasing data traffic, significant increase in per-user transmission rate, working with a great number of connecting devices, and support for very low end-to-end latency and high-energy efficiency. To that end, various research efforts are underway for various technologies, such as dual connectivity, massive multiple input multiple output (MIMO), in-band full duplex, non-orthogonal multiple access (NOMA), super wideband support, and device networking.

SUMMARY OF THE INVENTION

The present disclosure provides a method for transmitting an uplink signal based on a codebook in a wireless communication system, and an apparatus therefor.

The present disclosure also provides a method for transmitting an uplink signal based on a codebook subset supporting transmission based full power transmission, and an apparatus therefor.

The technical objects of the present disclosure are not limited to the aforementioned technical objects, and other technical objects, which are not mentioned above, will be apparently appreciated by a person having ordinary skill in the art from the following description.

In order to solve the above-described problem, the present disclosure provides a method and apparatus for uplink signal transmission through a previously configured uplink resource in a wireless communication system.

In more detail, a method in which a UE transmits an uplink signal, based on a codebook, in a wireless communication system of the present disclosure includes: receiving downlink control information (DCI) for determining a precoding matrix, which is applied to transmission of the uplink signal, from a base station; determining a precoding matrix that is applied to transmission of the uplink signal from a codebook subset related to transmission of the uplink signal, based on the DCI; and transmitting the uplink signal to the base station, based on the determined precoding matrix, in which, based on that differences of phase values applied to antenna ports for transmitting the uplink signal are changed in all pairs of antenna ports, the codebook subset includes at least one specific precoding matrix for full power transmission.

Further, based on that the determined precoding matrix is one precoding matrix of at least one specific precoding matrix, the uplink signal is transmitted, based on the full power transmission.

Further, based on that the determined precoding matrix is one precoding matrix of at least one specific precoding matrix, the uplink signal is transmitted through all of the antenna ports for transmitting the uplink signal.

Further, the method further includes determining uplink transmission power for the uplink transmission, based on the DCI, in which the DCI further includes information about an optimal power level for the uplink transmission, and the determined uplink transmission power is divided and applied into the same values across all of antenna ports for transmitting the uplink signal.

Further, the codebook includes a first codebook for a rank 1 using two antenna ports to transmit the uplink signal and a second codebook for a rank 2 using two antenna ports to transmit the uplink signal, the codebook subset is configured based on precoding matrixes respectively included in the first codebook and the second codebook, and, among a first precoding matrix set for the rank 1 and a second precoding matrix set for the rank 2 that are included in the codebook subset, the at least one specific precoding matrix is included in the first precoding matrix set.

Further, the precoding matrixes respectively included in the first codebook and the second codebook are indexed by a TPMI (transmit precoding matrix indicator) index.

Further, the first codebook is determined by the following table,

TABLE

| TPMI index | W (ordered from left to right in increasing order of TPMI index) | | | | | | | |
|---|---|---|---|---|---|---|---|---|
| 0-5 | $\frac{1}{\sqrt{2}}\begin{bmatrix}1\\0\end{bmatrix}$ | $\frac{1}{\sqrt{2}}\begin{bmatrix}0\\1\end{bmatrix}$ | $\frac{1}{\sqrt{2}}\begin{bmatrix}1\\1\end{bmatrix}$ | $\frac{1}{\sqrt{2}}\begin{bmatrix}1\\-1\end{bmatrix}$ | $\frac{1}{\sqrt{2}}\begin{bmatrix}1\\j\end{bmatrix}$ | $\frac{1}{\sqrt{2}}\begin{bmatrix}1\\-j\end{bmatrix}$ | — | — | where, the TPMI index is indexed in ascending power from the left to the right in the tables for the precoding matrixes included in the first codebook.

Further, the at least one specific precoding matrix is a precoding matrix in which the TPMI index is 2 of the precoding matrixes included in the first codebook.

Further, the codebook further includes (i) a first codebook related to a rank 1 using four antenna ports to transmit the uplink signal, (ii) a second codebook related to a rank 2 using four antennas to transmit the uplink signal, and (iii) a third codebook related to a rank 3 using four antennas to transmit the uplink signal, and (iv) a fourth codebook using four antenna ports to transmit the uplink signal, and the codebook set is configured based on precoding matrixes included in each of the first codebook to the fourth codebook.

Further, the at least one specific precoding matrix includes precoding matrixes that are respectively applied to the rank 1, the rank 2, and the rank 3, and, among (i) a first precoding matrix set for the rank 1 included in the codebook set, (ii) a second precoding matrix set for the rank 2, (iii) a third precoding matrix set for the rank 3, and (iv) a fourth precoding matrix set for the rank 4, the at least one specific precoding matrix is included in the first precoding matrix set for the rank 1, the second precoding matrix set for the rank 2, and the third precoding matrix set for the rank 3 for each rank.

Further, the precoding matrixes included in each of the first codebook to the fourth codebook are indexed by a TPMI index.

Further, the first code book is determined by one of the following tables,

TABLE

| TPMI index | W (ordered from left to right in increasing order of TPMI index) |
|---|---|
| 0-7 | $\frac{1}{2}\begin{bmatrix}1\\0\\0\\0\end{bmatrix}$ $\frac{1}{2}\begin{bmatrix}0\\1\\0\\0\end{bmatrix}$ $\frac{1}{2}\begin{bmatrix}0\\0\\1\\0\end{bmatrix}$ $\frac{1}{2}\begin{bmatrix}0\\0\\0\\1\end{bmatrix}$ $\frac{1}{2}\begin{bmatrix}1\\0\\1\\0\end{bmatrix}$ $\frac{1}{2}\begin{bmatrix}1\\0\\-1\\0\end{bmatrix}$ $\frac{1}{2}\begin{bmatrix}1\\0\\j\\0\end{bmatrix}$ $\frac{1}{2}\begin{bmatrix}1\\0\\-j\\0\end{bmatrix}$ |
| 8-15 | $\frac{1}{2}\begin{bmatrix}0\\1\\0\\1\end{bmatrix}$ $\frac{1}{2}\begin{bmatrix}0\\1\\0\\-1\end{bmatrix}$ $\frac{1}{2}\begin{bmatrix}0\\1\\0\\j\end{bmatrix}$ $\frac{1}{2}\begin{bmatrix}0\\1\\0\\-j\end{bmatrix}$ $\frac{1}{2}\begin{bmatrix}1\\1\\1\\-1\end{bmatrix}$ $\frac{1}{2}\begin{bmatrix}1\\1\\j\\j\end{bmatrix}$ $\frac{1}{2}\begin{bmatrix}1\\1\\-1\\1\end{bmatrix}$ $\frac{1}{2}\begin{bmatrix}1\\1\\-j\\-j\end{bmatrix}$ |
| 16-23 | $\frac{1}{2}\begin{bmatrix}1\\j\\1\\j\end{bmatrix}$ $\frac{1}{2}\begin{bmatrix}1\\j\\j\\1\end{bmatrix}$ $\frac{1}{2}\begin{bmatrix}1\\j\\-1\\-j\end{bmatrix}$ $\frac{1}{2}\begin{bmatrix}1\\j\\-j\\-1\end{bmatrix}$ $\frac{1}{2}\begin{bmatrix}1\\-1\\1\\1\end{bmatrix}$ $\frac{1}{2}\begin{bmatrix}1\\-1\\j\\-j\end{bmatrix}$ $\frac{1}{2}\begin{bmatrix}1\\-1\\-1\\-1\end{bmatrix}$ $\frac{1}{2}\begin{bmatrix}1\\-1\\-j\\j\end{bmatrix}$ |
| 24-27 | $\frac{1}{2}\begin{bmatrix}1\\-j\\1\\-j\end{bmatrix}$ $\frac{1}{2}\begin{bmatrix}1\\-j\\j\\-1\end{bmatrix}$ $\frac{1}{2}\begin{bmatrix}1\\-j\\-1\\j\end{bmatrix}$ $\frac{1}{2}\begin{bmatrix}1\\-j\\-j\\1\end{bmatrix}$ — — — — |

TABLE

| TPMI index | W (ordered from left to right in increasing order of TPMI index) |
|---|---|
| 0-7 | $\frac{1}{2}\begin{bmatrix}1\\0\\0\\0\end{bmatrix}$ $\frac{1}{2}\begin{bmatrix}0\\1\\0\\0\end{bmatrix}$ $\frac{1}{2}\begin{bmatrix}0\\0\\1\\0\end{bmatrix}$ $\frac{1}{2}\begin{bmatrix}0\\0\\0\\1\end{bmatrix}$ $\frac{1}{2}\begin{bmatrix}1\\0\\1\\0\end{bmatrix}$ $\frac{1}{2}\begin{bmatrix}1\\0\\-1\\0\end{bmatrix}$ $\frac{1}{2}\begin{bmatrix}1\\0\\j\\0\end{bmatrix}$ $\frac{1}{2}\begin{bmatrix}1\\0\\-j\\0\end{bmatrix}$ |
| 8-15 | $\frac{1}{2}\begin{bmatrix}0\\1\\0\\1\end{bmatrix}$ $\frac{1}{2}\begin{bmatrix}0\\1\\0\\-1\end{bmatrix}$ $\frac{1}{2}\begin{bmatrix}0\\1\\0\\j\end{bmatrix}$ $\frac{1}{2}\begin{bmatrix}0\\1\\0\\-j\end{bmatrix}$ $\frac{1}{2}\begin{bmatrix}1\\1\\1\\1\end{bmatrix}$ $\frac{1}{2}\begin{bmatrix}1\\1\\j\\j\end{bmatrix}$ $\frac{1}{2}\begin{bmatrix}1\\1\\-1\\-1\end{bmatrix}$ $\frac{1}{2}\begin{bmatrix}1\\1\\-1\\-1\end{bmatrix}$ |
| 16-23 | $\frac{1}{2}\begin{bmatrix}1\\j\\1\\j\end{bmatrix}$ $\frac{1}{2}\begin{bmatrix}1\\j\\j\\1\end{bmatrix}$ $\frac{1}{2}\begin{bmatrix}1\\j\\-1\\-j\end{bmatrix}$ $\frac{1}{2}\begin{bmatrix}1\\j\\-j\\-1\end{bmatrix}$ $\frac{1}{2}\begin{bmatrix}1\\-1\\1\\-1\end{bmatrix}$ $\frac{1}{2}\begin{bmatrix}1\\-1\\j\\-j\end{bmatrix}$ $\frac{1}{2}\begin{bmatrix}1\\-1\\-1\\1\end{bmatrix}$ $\frac{1}{2}\begin{bmatrix}1\\-1\\-j\\j\end{bmatrix}$ |
| 24-27 | $\frac{1}{2}\begin{bmatrix}1\\-j\\1\\-j\end{bmatrix}$ $\frac{1}{2}\begin{bmatrix}1\\-j\\j\\1\end{bmatrix}$ $\frac{1}{2}\begin{bmatrix}1\\-j\\-1\\j\end{bmatrix}$ $\frac{1}{2}\begin{bmatrix}1\\-j\\-j\\-1\end{bmatrix}$ — — — — | the second code book is determined by the following table,

TABLE

| TPMI index | W (ordered from left to right in increasing order of TPMI index) | | | |
|---|---|---|---|---|
| 0-3 | $\frac{1}{2}\begin{bmatrix}1 & 0\\0 & 1\\0 & 0\\0 & 0\end{bmatrix}$ | $\frac{1}{2}\begin{bmatrix}1 & 0\\0 & 0\\0 & 1\\0 & 0\end{bmatrix}$ | $\frac{1}{2}\begin{bmatrix}1 & 0\\0 & 0\\0 & 1\\0 & 1\end{bmatrix}$ | $\frac{1}{2}\begin{bmatrix}0 & 0\\1 & 0\\0 & 1\\0 & 0\end{bmatrix}$ |
| 4-7 | $\frac{1}{2}\begin{bmatrix}0 & 0\\1 & 0\\0 & 0\\0 & 1\end{bmatrix}$ | $\frac{1}{2}\begin{bmatrix}0 & 0\\0 & 0\\1 & 0\\0 & 1\end{bmatrix}$ | $\frac{1}{2}\begin{bmatrix}1 & 0\\0 & 1\\1 & 0\\0 & -j\end{bmatrix}$ | $\frac{1}{2}\begin{bmatrix}1 & 0\\0 & 1\\1 & 0\\0 & j\end{bmatrix}$ |
| 8-11 | $\frac{1}{2}\begin{bmatrix}1 & 0\\0 & 1\\-j & 0\\0 & 1\end{bmatrix}$ | $\frac{1}{2}\begin{bmatrix}1 & 0\\0 & 1\\-j & 0\\0 & -1\end{bmatrix}$ | $\frac{1}{2}\begin{bmatrix}1 & 0\\0 & 1\\-1 & 0\\0 & -j\end{bmatrix}$ | $\frac{1}{2}\begin{bmatrix}1 & 0\\0 & 1\\-1 & 0\\0 & j\end{bmatrix}$ |
| 12-15 | $\frac{1}{2}\begin{bmatrix}1 & 0\\0 & 1\\j & 0\\0 & 1\end{bmatrix}$ | $\frac{1}{2}\begin{bmatrix}1 & 0\\0 & 1\\j & 0\\0 & -1\end{bmatrix}$ | $\frac{1}{2\sqrt{2}}\begin{bmatrix}1 & 1\\1 & 1\\1 & -1\\1 & -1\end{bmatrix}$ | $\frac{1}{2\sqrt{2}}\begin{bmatrix}1 & 1\\1 & 1\\j & -j\\j & -j\end{bmatrix}$ |
| 16-19 | $\frac{1}{2\sqrt{2}}\begin{bmatrix}1 & 1\\j & j\\1 & -1\\j & -j\end{bmatrix}$ | $\frac{1}{2\sqrt{2}}\begin{bmatrix}1 & 1\\j & j\\j & -j\\-1 & 1\end{bmatrix}$ | $\frac{1}{2\sqrt{2}}\begin{bmatrix}1 & 1\\-1 & -1\\1 & -1\\-1 & 1\end{bmatrix}$ | $\frac{1}{2\sqrt{2}}\begin{bmatrix}1 & 1\\-1 & -1\\j & -j\\-j & j\end{bmatrix}$ |
| 20-21 | $\frac{1}{2\sqrt{2}}\begin{bmatrix}1 & 1\\-j & -j\\1 & -1\\-j & j\end{bmatrix}$ | $\frac{1}{2\sqrt{2}}\begin{bmatrix}1 & 1\\-j & -j\\j & -j\\1 & -1\end{bmatrix}$ | — | — | the third code book is determined by the following table, and,

TABLE

| TPMI index | W (ordered from left to right in increasing order of TPMI index) | | | |
|---|---|---|---|---|
| 0-3 | $\frac{1}{2}\begin{bmatrix}1 & 0 & 0\\0 & 1 & 0\\0 & 0 & 1\\0 & 0 & 0\end{bmatrix}$ | $\frac{1}{2}\begin{bmatrix}1 & 0 & 0\\0 & 1 & 0\\1 & 0 & 0\\0 & 0 & 1\end{bmatrix}$ | $\frac{1}{2}\begin{bmatrix}1 & 0 & 0\\0 & 1 & 0\\-1 & 0 & 0\\0 & 0 & 1\end{bmatrix}$ | $\frac{1}{2\sqrt{3}}\begin{bmatrix}1 & 1 & 1\\1 & -1 & 1\\1 & 1 & -1\\1 & -1 & -1\end{bmatrix}$ |
| 4-6 | $\frac{1}{2\sqrt{3}}\begin{bmatrix}1 & 1 & 1\\1 & -1 & 1\\j & j & -j\\j & -j & -j\end{bmatrix}$ | $\frac{1}{2\sqrt{3}}\begin{bmatrix}1 & 1 & 1\\-1 & 1 & -1\\1 & 1 & -1\\-1 & 1 & 1\end{bmatrix}$ | $\frac{1}{2\sqrt{3}}\begin{bmatrix}1 & 1 & 1\\-1 & 1 & -1\\j & j & -j\\-j & j & j\end{bmatrix}$ | — | where, the TPMI index are indexed in ascending power from the left to the right in the table for the precoding matrixes included in each of the first codebook, the second codebook, and the third codebook.

Further, a precoding matrix that is applied to the rank 1 of the precoding matrixes included in the at least one specific precoding matrix is a precoding matrix of which the TPMI index is 13 of precoding matrixes included in the first codebook, a precoding matrix that is applied to the rank 2 of the precoding matrixes included in the at least one specific precoding matrix is a precoding matrix of which the TPMI index is 6 of precoding matrixes included in the second codebook, and a precoding matrix that is applied to the rank 3 of the precoding matrixes included in the at least one specific precoding matrix is a precoding matrix of which the TPMI index is 1 of precoding matrixes included in the third codebook.

Further, the method further includes receiving configuration information about a maximum rank value for the uplink signal transmission from the base station, in which the first precoding set included in the codebook subset is differently configured based on the maximum rank value.

Further, based on that the maximum rank value is 1, the precoding matrix that is applied to the rank 1 of the precoding matrixes included in the at least one specific precoding matrix is a precoding matrix of which the TPMI index is 12 to 15 of the precoding matrixes included in the first codebook.

Further, a UE that transmits an uplink signal, based on a codebook, in a wireless communication system of the present disclosure includes: a transmitter for transmitting a radio signal; a receiver for receiving a radio signal; and a processor functionally connected with the transmitter and the receiver, in which the processor controls the receiver to receive downlink control information (DCI) for determining a precoding matrix, which is applied to the uplink signal transmission, from the base station, and to determine a precoding matrix that is applied to transmission of the uplink signal from a codebook subset related to transmission of the uplink signal, based on the DCI; and controls the transmitter to transmit the uplink signal to the base station, based on the determined precoding matrix, in which, based on that differences of phase values applied to antenna ports for transmitting the uplink signal are changed in all pairs of antenna ports in the UE, the codebook subset includes at least one specific precoding matrix for full power transmission.

Further, a method of receiving an uplink signal, based on a base station codebook, in a wireless communication system of the present disclosure includes: transmitting downlink control information (DCI) for determining a precoding matrix, which is applied to the uplink signal transmission, to the UE; and receiving the uplink signal based on the precoding matrix determined based on the DCI from the UE, in which, based on that differences of phase values applied to antenna ports for transmitting the uplink signal are changed in all pairs of antenna ports in the UE, the codebook subset includes at least one specific precoding matrix for full power transmission.

Further, a base station that receives an uplink signal, based on a codebook, in a wireless communication system of the present disclosure includes: a transmitter for transmitting a radio signal; a receiver for receiving a radio signal; and a processor functionally connected with the transmitter and the receiver, the processor controls the transmitter to transmit downlink control information (DCI) for determining a precoding matrix, which is applied to the uplink signal transmission, to the UE; and controls the receiver to receive the uplink signal based on the precoding matrix determined based on the DCI from the UE, in which, based on that differences of phase values applied to antenna ports for transmitting the uplink signal are changed in all pairs of antenna ports, the codebook subset includes at least one specific precoding matrix for full power transmission.

Further, an apparatus of the present disclosure includes one or more memories and one or more processor functionally connected with the one or more memories, in which the one or more processors control the apparatus to receive downlink control information (DCI) for determining a precoding matrix, which is applied to the uplink signal transmission, from the base station; to determine a precoding matrix that is applied to transmission of the uplink signal from a codebook subset related to transmission of the uplink signal, based on the DCI; and to transmit the uplink signal to the base station, based on the determined precoding matrix, in which, based on that differences of phase values applied to antenna ports for transmitting the uplink signal are changed in all pairs of antenna ports, the codebook subset includes at least one specific precoding matrix for full power transmission.

Further, the present disclosure provides a non-temporal CRM (Computer Readable Medium) that stores one or more commands, in which one or more commands that can be executed by one or more processors make a UE to receive downlink control information (DCI) for determining a precoding matrix, which is applied to the uplink signal transmission, from the base station; to determine a precoding matrix that is applied to transmission of the uplink signal from a codebook subset related to transmission of the uplink signal, based on the DCI and to transmit the uplink signal to the base station, based on the determined precoding matrix, in which, based on that differences of phase values applied to antenna ports for transmitting the uplink signal are changed in all pairs of antenna ports, the codebook subset includes at least one specific precoding matrix for full power transmission.

In the present disclosure, there is an effect that the uplink signal can be transmitted based on the codebook in the wireless communication system.

Furthermore, in the present disclosure, there is an effect that the uplink signal can be transmitted based on the codebook subset supporting the transmission based on the full power transmission.

Furthermore, in the present disclosure, there is an effect that the non-coherent UE can transmit the uplink signal based on the codebook subset supporting the transmission based on the full power transmission.

Furthermore, in the present disclosure, there is an effect that the partial-coherent UE can transmit the uplink signal based on the codebook subset supporting the transmission based on the full power transmission.

Advantages which can be obtained in the present disclosure are not limited to the aforementioned advantages and other unmentioned advantages will be clearly understood by those skilled in the art from the following description.

The method for transmitting the uplink data with high reliability n the wireless communication system of the present disclosure is described based on an example in which the method is applied to the 3GPP NR system, but may be applied to various wireless communication systems in addition to the 3GPP NR system.

BRIEF DESCRIPTION OF THE DRAWINGS

The accompanying drawings, which are included as part of the detailed description in order to provide a thorough understanding of the present disclosure, provide embodiments of the present disclosure and together with the description, describe the technical features of the present disclosure.

DESCRIPTION OF EXEMPLARY EMBODIMENTS

Figure 1:
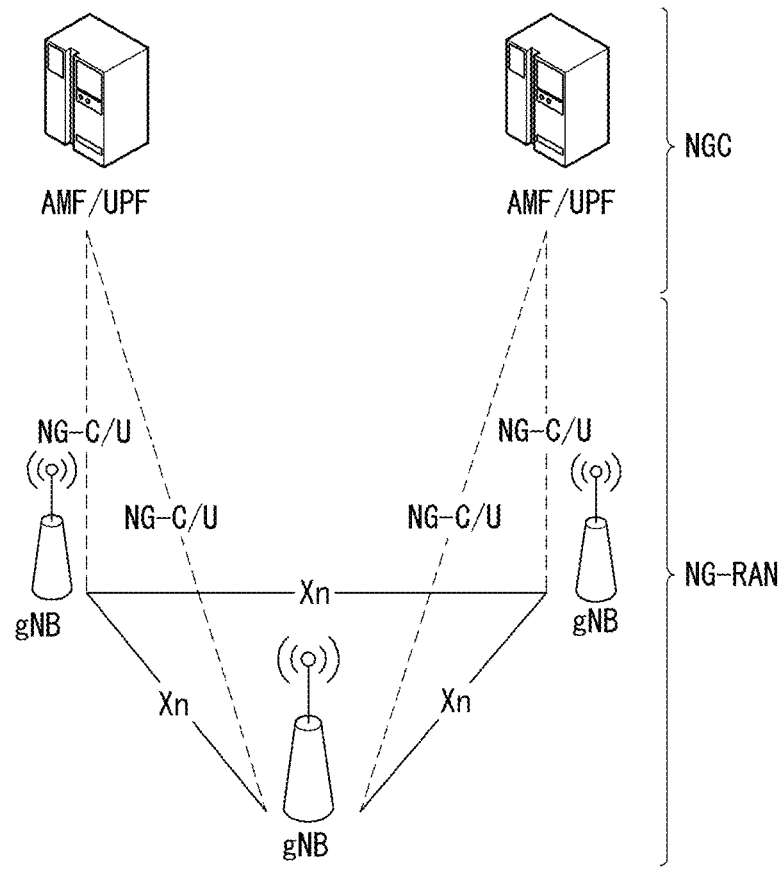
FIG. 1 is a diagram illustrating an example of an overall system structure of NR to which a method proposed in the present disclosure may be applied.

Hereinafter, preferred embodiments of the present disclosure will be described in detail with reference to the accompanying drawings. The detailed description, which will be given below with reference to the accompanying drawings, is intended to explain exemplary embodiments of the present disclosure and is not intended to represent the only embodiments in which the present disclosure may be practiced. The following detailed description includes specific details in order to provide a thorough understanding of the present disclosure. However, those skilled in the art appreciate that the present disclosure may be practiced without these specific details.

In some instances, well-known structures and devices may be omitted or shown in a block diagram form centering on the core functions of the structures and devices in order to avoid obscuring the concepts of the present disclosure.

Hereinafter, downlink (DL) means communication from a base station to a terminal and uplink (UL) means communication from the terminal to the base station. In the downlink, a transmitter may be part of the base station, and a receiver may be part of the terminal. In the uplink, the transmitter may be part of the terminal and the receiver may be part of the base station. The base station may be expressed as a first communication device and the terminal may be expressed as a second communication device. A base station (BS) may be replaced with terms including a fixed station, a Node B, an evolved-NodeB (eNB), a Next Generation NodeB (gNB), a base transceiver system (BTS), an access point (AP), a network (5G network), an AI system, a road side unit (RSU), a vehicle, a robot, an Unmanned Aerial Vehicle (UAV), an Augmented Reality (AR) device, a Virtual Reality (VR) device, and the like. Further, the terminal may be fixed or mobile and may be replaced with terms including a User Equipment (UE), a Mobile Station (MS), a user terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, and a Device-to-Device (D2D) device, the vehicle, the robot, an AI module, the Unmanned Aerial Vehicle (UAV), the Augmented Reality (AR) device, the Virtual Reality (VR) device, and the like.

The following technology may be used in various wireless access systems including CDMA, FDMA, TDMA, OFDMA, SC-FDMA, and the like. The CDMA may be implemented as radio technology such as Universal Terrestrial Radio Access (UTRA) or CDMA2000. The TDMA may be implemented as radio technology such as global system for mobile communications (GSM)/general packet radio service (GPRS)/enhanced data rates for GSM evolution (EDGE). The OFDMA may be implemented as radio technology such as Institute of IEEE 802.11 (Wi-Fi), IEEE 802.16 (WiMAX), IEEE 802.20, Evolved UTRA (E-UTRA), or the like. The UTRA is part of Universal Mobile Telecommunications System (UMTS). 3rd Generation Partnership Project (3GPP) Long Term Evolution (LTE) is a part of Evolved UMTS (E-UMTS) using the E-UTRA and LTE-Advanced (A)/LTE-A pro is an evolved version of the 3GPP LTE. 3GPP New Radio (NR) or New Radio Access Technology is an evolved version of the 3GPP LTE/LTE-A/LTE-A pro.

For clarity of description, the present disclosure is described based on the 3GPP communication system (e.g., LTE-A or NR), but the technical spirit of the present disclosure are not limited thereto. LTE means technology after 3GPP TS 36.xxx Release 8. In detail, LTE technology after 3GPP TS 36.xxx Release 10 is referred to as the LTE-A and LTE technology after 3GPP TS 36.xxx Release 13 is referred to as the LTE-A pro. The 3GPP NR means technology after TS 38.xxx Release 15. The LTE/NR may be referred to as a 3GPP system. "xxx" means a standard document detail number. The LTE/NR may be collectively referred to as the 3GPP system. Matters disclosed in a standard document published before the present disclosure may refer to a background art, terms, abbreviations, etc., used for describing the present disclosure. For example, the following documents may be referred to.

3GPP LTE
36.211: Physical channels and modulation
36.212: Multiplexing and channel coding
36.213: Physical layer procedures
36.300: Overall description
36.331: Radio Resource Control (RRC)
3GPP NR
38.211: Physical channels and modulation
38.212: Multiplexing and channel coding
38.213: Physical layer procedures for control
38.214: Physical layer procedures for data
38.300: NR and NG-RAN Overall Description
36.331: Radio Resource Control (RRC) protocol specification Definition and Abbreviations BM: beam management
CQI: channel quality indicator
CRI: CSI-RS (channel state information—reference signal) resource indicator
CSI: channel state information
CSI-IM: channel state information—interference measurement
CSI-RS: channel state information—reference signal
DMRS: demodulation reference signal
FDM: frequency division multiplexing
FFT: fast Fourier transform
IFDMA: interleaved frequency division multiple access
IFFT: inverse fast Fourier transform
L1-RSRP: Layer 1 reference signal received power
L1-RSRQ: Layer 1 reference signal received quality
MAC: medium access control
NZP: non-zero power
OFDM: orthogonal frequency division multiplexing
PDCCH: physical downlink control channel
PDSCH: physical downlink shared channel
PMI: precoding matrix indicator
RE: resource element
RI: Rank indicator
RRC: radio resource control
RSSI: received signal strength indicator
Rx: Reception
QCL: quasi co-location
SINR: signal to interference and noise ratio
SSB (or SS/PBCH block): synchronization signal block (including primary synchronization signal, secondary synchronization signal and physical broadcast channel)
TDM: time division multiplexing
TRP: transmission and reception point
TRS: tracking reference signal
Tx: transmission
UE: user equipment
ZP: zero power
NR Radio access As more and more communication devices require larger communication capacity, there is a need for improved mobile broadband communication compared to the existing radio access technology (RAT). Further, massive machine type communications (MTCs), which provide various services anytime and anywhere by connecting many devices and objects, are one of the major issues to be considered in the next generation communication. In addition, a communication system design considering a service/UE sensitive to reliability and latency is being discussed. As such, the introduction of next-generation radio access technology considering enhanced mobile broadband communication (eMBB), massive MTC (mMTC), ultra-reliable and low latency communication (URLLC) is discussed, and in the present disclosure, the technology is called NR for convenience. The NR is an expression representing an example of 5G radio access technology (RAT).

In a New RAT system including NR uses an OFDM transmission scheme or a similar transmission scheme thereto. The new RAT system may follow OFDM parameters different from OFDM parameters of LTE. Alternatively, the new RAT system may follow numerology of conventional LTE/LTE-A as it is or have a larger system bandwidth (e.g., 100 MHz). Alternatively, one cell may support a plurality of numerologies. In other words, UEs that operate with different numerologies may coexist in one cell.

The numerology corresponds to one subcarrier spacing in a frequency domain. Different numerology may be defined by scaling reference subcarrier spacing to an integer N.

Three major requirement areas of 5G include (1) an Enhanced Mobile Broadband (eMBB) area, (2) a Massive Machine Type Communication (mMTC) area, and (3) an Ultra-reliable and Low Latency Communications (URLLC) area.

Some use cases may require multiple areas for optimization and other use cases may only focus on only one key performance indicator (KPI). 5G is to support the various use cases in a flexible and reliable method.

eMBB far surpasses basic mobile Internet access and covers media and entertainment applications in rich interactive work, cloud or augmented reality. Data is one of the key drivers of 5G and may not be able to see dedicated voice services for the first time in the 5G era. In 5G, the voice is expected to be processed as an application program simply by using data connection provided by a communication system. Main reasons for an increased traffic volume are an increase in content size and an increase in number of applications requiring a high data rate. A streaming service (audio and video), an interactive video, and mobile Internet connection will be more widely used as more devices are connected to the Internet. A lot of application programs require always-on connectivity in order to push real-time information and notification to a user. Cloud storages and applications are growing rapidly in mobile communication platforms, which may be applied to both work and entertainment. In addition, the cloud storage is a special use case of drives a growth of an uplink data transmission rate. 5G is also used in remote work of the cloud and requires a lower end-to-end latency so as to maintain an excellent user experience when a tactile interface is used. The entertainment, for example, a cloud game and video streaming are another key factor for increasing a demand for a mobile broadband capability. The entertainment is required in a smart phone and a tablet anywhere including a high mobility environment such as a train, a vehicle, and an airplane. Another use case is augmented reality and information retrieval for the entertainment. Here, the augmented reality requires a very low latency and an instantaneous data amount.

Further, one of 5G use cases most expected relates to a function to smoothly connect an embedded sensor in all fields, that is, mMTC. By 2020, the number of potential IoT devices is expected to reach 20.4 billion. Industry IoT is one of the areas where 5G plays a key role in enabling smart cities, asset tracking, smart utilities, agriculture, and security infrastructures.

URLLC includes new services that will change the industry through ultra reliable/usable links with low latency such as remote control of key infrastructure and self-driving vehicles. Levels of reliability and latency are required for smart grid control, industrial automation, robotics, and drone control and adjustment.

Next, multiple use cases will be described in more detail.

5G may complement fiber-to-the-home (FTTH) and cable-based broadband (or DOCSIS) as a means of providing streams rated as gigabits per second at hundreds of megabits per second. Such a fast speed is required to deliver TVs with resolutions of 4K and above (6K, 8K, and above) as well as virtual reality and the augmented reality. The Virtual Reality (VR) and Augmented Reality (AR) applications include mostly immersive sports games. A specific application program may require a special network configuration. For example, in the case of a VR game, game companies may need to integrate a core server with an edge network server of a network operator in order to minimize latency.

Automotive is expected to become an important new power for 5G, with many use cases for mobile communications to vehicles. For example, entertainment for passengers demands simultaneous high capacity and high mobility mobile broadband. The reason is that future users will continue to expect high-quality connections regardless of locations and speeds thereof. Another utilization example of an automotive field is an augmented-reality dashboard. This identifies an object in the dark over what a driver is seeing through a front window, and overlaps and displays information that tells the driver regarding a distance and a motion of the object. In the future, a wireless module enables communication between vehicles, information exchange between the vehicle and a supported infrastructure, and information exchange between the vehicle and other connected devices (e.g., devices carried by a pedestrian). A safety system guides an alternative course of an action in order for the driver to drive safer driving, thereby reducing the risk of accidents. A next step will be a remotely controlled or self-driven vehicle. This requires very reliable and very fast communication between different self-driven vehicles and between the automatic and the infrastructure. In the future, the self-driven vehicle will perform all driving activities and the driver will focus only on traffic which the vehicle itself may not identify. Technical requirements of the self-driven vehicle require ultra-low latency and ultra-high-speed reliability so as to increase a traffic safety to a level not achievable by humans.

Smart cities and smart homes, referred to as smart societies, will be embedded into high-density wireless sensor networks. A distributed network of intelligent sensors will identify conditions for cost and energy-efficient maintenance of a city or house. A similar configuration may be performed for each home. Temperature sensors, windows and heating controllers, burglar alarms, and home appliances are all wirelessly connected. Many of the sensors typically have low data rate, low power, and low cost. However, for example, real-time HD video may be required for specific types of devices for monitoring.

As consumption and distribution of energy including heat or gas is highly dispersed, automated control of distributed sensor networks is required. A smart grid interconnects the sensors using digital information and communication technologies to collect information and act based on the information. The information may include vendor and consumer behaviors, allowing the smart grid to improve the distribution of fuels, such as electricity, in an efficiency, reliability, economics, and sustainability of production and in an automated way. The smart grid may be regarded as another sensor network with low latency.

A health sector has many application programs that may benefit from mobile communications. Communication systems may support telemedicine to provide clinical care in remote locations. This may help to reduce barriers to a distance and improve an access to health services that are not continuously available in distant rural areas. This is also used to save lives in critical care and emergency situations. Wireless communication based wireless sensor networks may provide remote monitoring and sensors for parameters such as heart rate and blood pressure.

Wireless and mobile communications are becoming increasingly important in industrial application fields. Wires are high in installation and maintenance cost. Thus, a possibility of replacing cables with reconfigurable wireless links is an attractive opportunity in many industries. However, achieving this requires that wireless connections operate with similar delay, reliability, and capacity as cables, and that their management is simplified. Low latency and very low error probabilities are new requirements that need to be connected to 5G Logistics and freight tracking are important use cases of mobile communications that enable tracking of inventory and packages anywhere using location based information systems. Use cases of logistics and freight tracking typically require low data rates, but require a large range and reliable location information.

Overview of System

FIG. 1 is a view illustrating an example overall NR system structure to which a method as proposed in the disclosure may apply.

Referring to FIG. 1, an NG-RAN is constituted of gNBs to provide a control plane (RRC) protocol end for user equipment (UE) and NG-RA user plane (new AS sublayer/PDCP/RLC/MAC/PHY).

The gNBs are mutually connected via an Xn interface.

The gNBs are connected to the NGC via the NG interface.

More specifically, the gNB connects to the access and mobility management function (AMF) via the N2 interface and connects to the user plane function (UPF) via the N3 interface.

New RAT (NR) Numerology and Frame Structure

In the NR system, a number of numerologies may be supported. Here, the numerology may be defined by the subcarrier spacing and cyclic prefix (CP) overhead. At this time, multiple subcarrier spacings may be derived by scaling the basic subcarrier spacing by integer N (or, μ). Further, although it is assumed that a very low subcarrier spacing is not used at a very high carrier frequency, the numerology used may be selected independently from the frequency band.

Further, in the NR system, various frame structures according to multiple numerologies may be supported.

Hereinafter, an orthogonal frequency division multiplexing (OFDM) numerology and frame structure that may be considered in the NR system is described.

The multiple OFDM numerologies supported in the NR system may be defined as shown in Table 1.

TABLE 1

| μ | Δf = $2^μ$ · 15[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

The NR supports multiple numerologies (or subcarrier spacing (SCS)) for supporting various 5G services. For example, when the SCS is 15 kHz, a wide area in traditional cellular bands is supported and when the SCS is 30 kHz/60 kHz, dense-urban, lower latency, and wider carrier bandwidth are supported, and when the SCS is 60 kHz or higher there than, a bandwidth larger than 24.25 GHz is supported in order to overcome phase noise.

An NR frequency band is defined as frequency ranges of two types (FR1 and FR2). FR1 and FR2 may be configured as shown in Table 2 below. Further, FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

In connection with the frame structure in the NR system, the size of various fields in the time domain is expressed as a multiple of time unit $T_s=1/(\Delta f_{max} \cdot N_f)$. Here, $\Delta f_{max}=480 \cdot 10^3$, and $N_f=4096$. A downlink and uplink transmission is constituted of a radio frame with a period of $T_f=(\Delta f_{max} N_f/100) \cdot T_s=10$ ms. Here, the radio frame is constituted of 10 subframes each of which has a period of $T_{sf}=(\Delta f_{max} N_f/1000) \cdot T_s=1$ ms In this case, one set of frames for uplink and one set of frames for downlink may exist.

Figure 2:
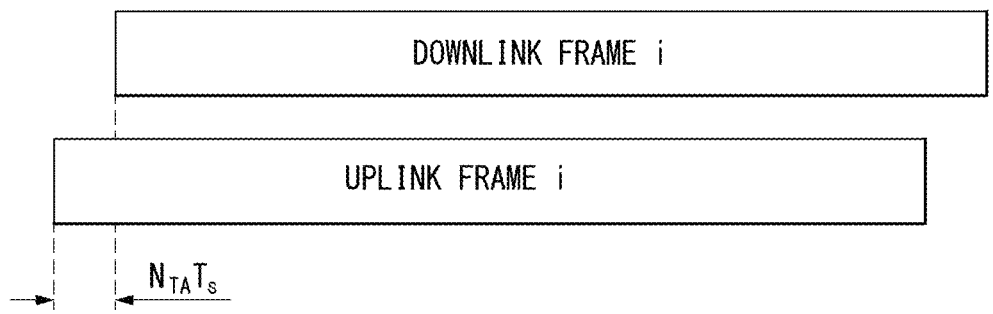
FIG. 2 illustrates a relationship between an uplink frame and a downlink frame in a wireless communication system to which a method proposed in the present disclosure may be applied.

FIG. 2 illustrates the relationship between an uplink frame and downlink frame in a wireless communication system to which a method as proposed in the disclosure may apply.

As shown in FIG. 2, transmission of uplink frame number i from the user equipment (UE) should begin $T_{TA}=N_{TA}T_s$ earlier than the start of the downlink frame by the UE.

For numerology μ, slots are numbered in ascending order of $n_s^\mu \in \{0, \ldots, N_{subframe}^{slots,\mu}-1\}$ in the subframe and in ascending order of $n_{s,f}^\mu \in \{0, \ldots, N_{frame}^{slots,\mu}-1\}$ in the radio frame. One slot includes consecutive OFDM symbols of $N_{symb}^\mu$, and $N_{symb}^\mu$ is determined according to the used numerology and slot configuration. In the subframe, the start of slot $n_s^\mu$ is temporally aligned with the start of $n_s^\mu N_{symb}^\mu$.

All UEs are not simultaneously capable of transmission and reception, and this means that all OFDM symbols of the downlink slot or uplink slot may not be used.

Table 3 shows the number of OFDM symbols for each slot ($N_{symb}^{slot}$), the number of slots for each radio frame ($N_{slot}^{frame,\mu}$), and the number of slots for each subframe ($N_{slot}^{subframe,\mu}$) in a normal CP and Table 4 shows the number of OFDM symbols for each slot, the number of slots for each radio frame, and the number of slots for each subframe in an extended CP.

TABLE 3

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame,\mu}$ | $N_{slot}^{subframe,\mu}$ |
|---|---|---|---|
| 2 | 12 | 40 | 4 |

Figure 3:
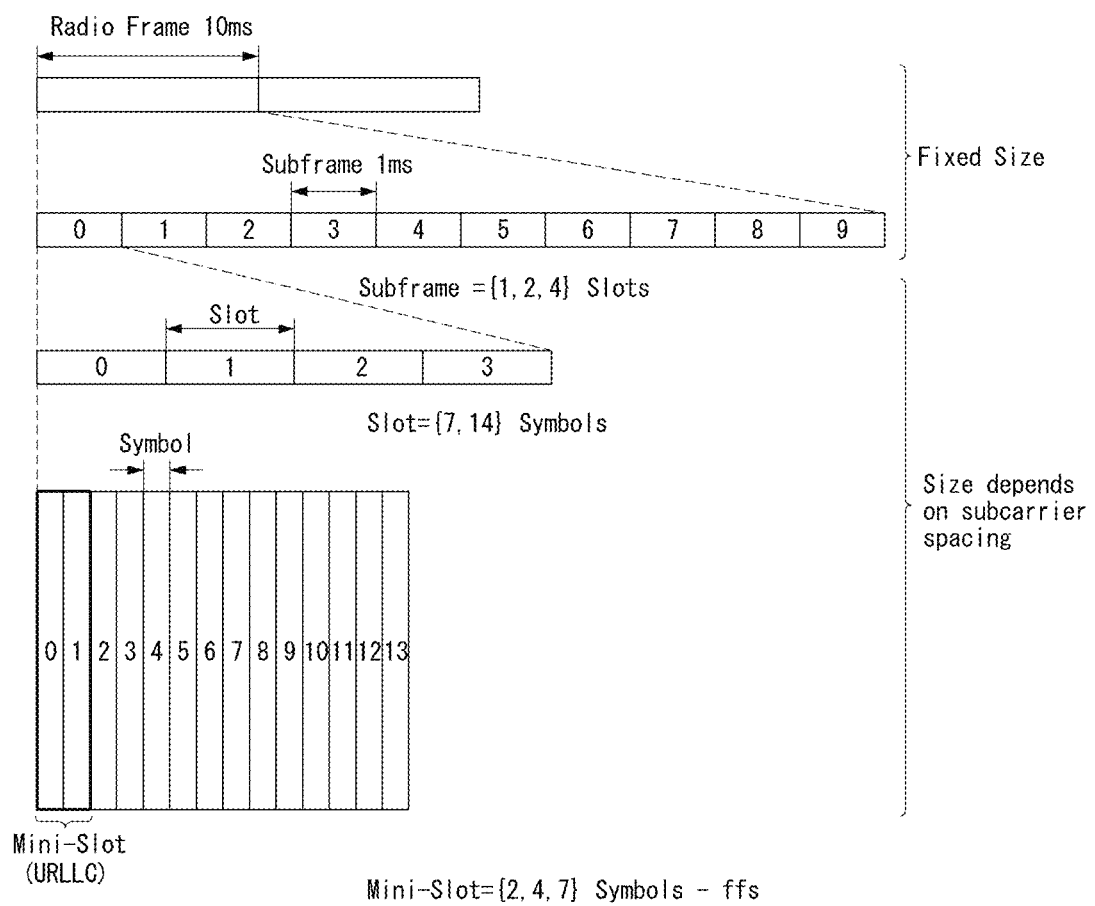
FIG. 3 illustrates an example of a frame structure in an NR system.

FIG. 3 illustrates an example of a frame structure in an NR system. FIG. 3 is just for convenience of the description and does not limit the scope of the present disclosure.

In the case of Table 4, as an example of a case where μ=2, i.e., a case where a subcarrier spacing (SCS) is 60 kHz, one subframe (or frame) may include four slots by referring to Table 3 and as an example, a case of one subframe={1,2,4} slots is illustrated in FIG. 3 and the number of slot(s) which may be included in one subframe may be defined as shown in Table 3.

Further, a mini-slot may be constituted by 2, 4, or 7 symbols and constituted by more or less symbols.

In connection with the physical resource in the NR system, antenna port, resource grid, resource element, resource block, and carrier part may be taken into consideration.

Hereinafter, the physical resources that may be considered in the NR system are described in detail.

First, in connection with antenna port, the antenna port is defined so that the channel carrying a symbol on the antenna port may be inferred from the channel carrying another symbol on the same antenna port. Where the large-scale property of the channel carrying a symbol on one antenna port may be inferred from the channel carrying a symbol on a different antenna port, the two antenna ports may be said to have a QC/QCL (quasi co-located or quasi co-location) relationship. Here, the large-scale properties include one or more of delay spread, Doppler spread, frequency shift, average received power, and received timing.

Figure 4:
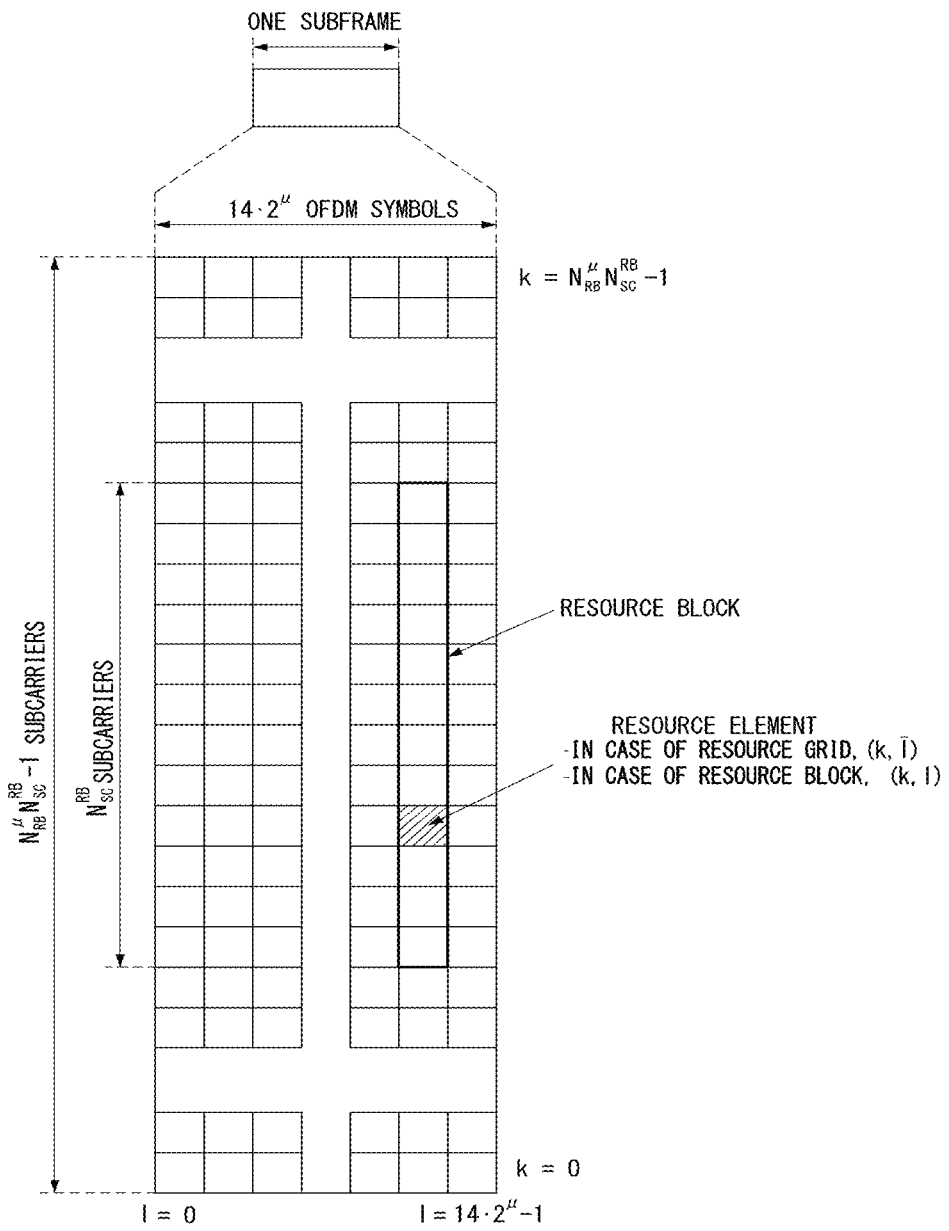
FIG. 4 illustrates an example of a resource grid supported by a wireless communication system to which a method proposed in the present disclosure may be applied.

FIG. 4 illustrates an example resource grid supported in a wireless communication system to which a method as proposed in the disclosure may apply.

Referring to FIG. 4, although an example is described in which the resource grid is constituted of $N_{RB}^\mu N_{sc}^{RB}$ subcarriers in the frequency domain, and one subframe includes 14·2μ, OFDM symbols, embodiments of the disclosure are not limited thereto.

In the NR system, the transmitted signal is described with one or more resource grids constituted of $N_{RB}^\mu N_{sc}^{RB}$ subcarriers and $2^\mu N_{symb}^{(\mu)}$ OFDM symbols. Here, $N_{RB}^\mu \leq N_{RB}^{max,\mu}$. $N_{RB}^{max,\mu}$ refers to the maximum transmission bandwidth, and this may be varied between uplink and downlink as well as numerologies.

In this case, as shown in FIG. 4, one resource grid may be configured per numerology μ and antenna port p.

Figure 5:
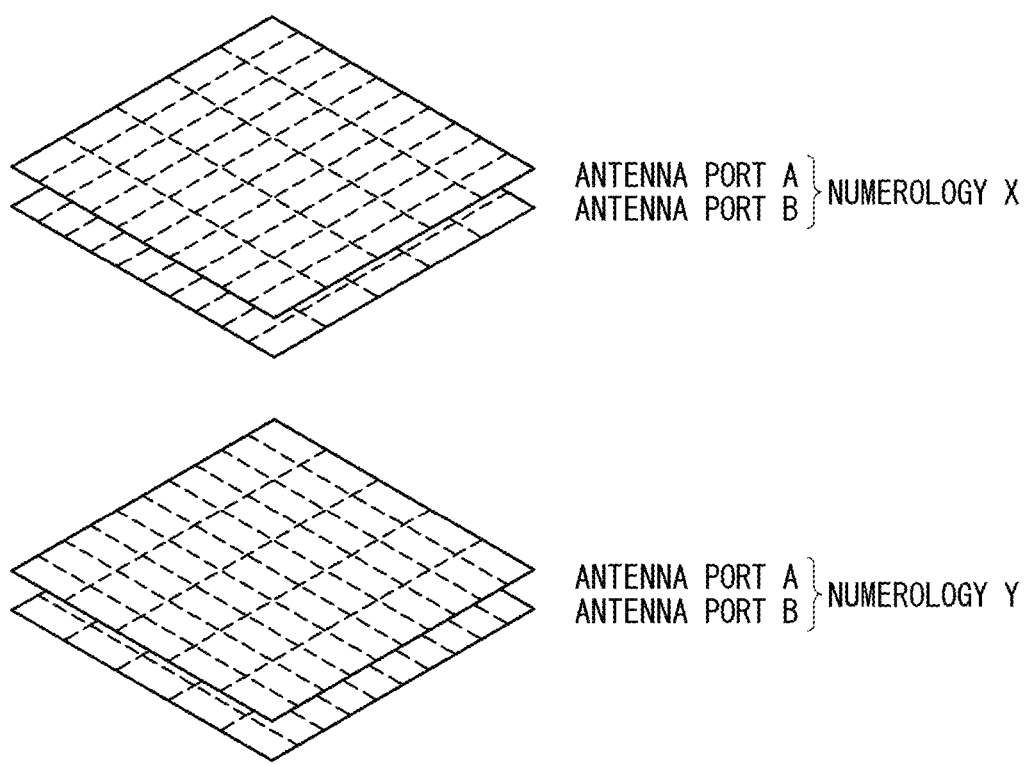
FIG. 5 illustrates examples of a resource grid for each antenna port and numerology to which a method proposed in the present disclosure may be applied.

FIG. 5 illustrates examples of per-antenna port and numerology resource grids to which a method as proposed in the disclosure may apply.

Each element of the resource grid for numerology μ and antenna port p is denoted a resource element and is uniquely identified by index pair (k, l). Here, k=0, . . . , $N_{RB}^{\mu}N_{sc}^{RB}-1$ is the index in the frequency domain, and l=0, . . . , $2^{\mu}N_{symb}^{(\mu)}-1$ denotes the position of symbol in the subframe. Upon denoting the resource element in slot, index pair (k,l) is used. Here, l=0, . . . , $N_{symb}^{\mu}-1$.

For numerology μ and antenna port, resource element (k, l) corresponds to complex value $a_{k,l}^{(p,\mu)}$. Where there is no risk of confusion or where a specific antenna port or numerology is not specified, indexes p and μ may be dropped and, as a result, the complex value may become $a_{k,l}^{(p)}$ or $a_{k,l}$.

The physical resource block is defined with $N_{sc}^{RB}=12$ consecutive subcarriers in the frequency domain.

Point A may serve as a common reference point of a resource block grid and may be acquired as follows.

OffsetToPointA for PCell downlink indicates the frequency offset between the lowest subcarrier of the lowest resource block superposed with the SS/PBCH block used by the UE for initial cell selection and point A, and is expressed by resource block units assuming a 15 kHz subcarrier spacing for FR1 and a 60 kHz subcarrier spacing for FR2; and absoluteFrequencyPointA indicates the frequency-position of point A expressed as in an absolute radio-frequency channel number (ARFCN).

Common resource blocks are numbered upwards from 0 in the frequency domain for a subcarrier spacing setting μ.

A center of subcarrier 0 for common resource block 0 for the subcarrier spacing setting μ coincides with 'point A'. The resource element (k,l) for common resource block number $n_{CRB}^{\mu}$ and the subcarrier spacing setting μ in the frequency domain is given as in Equation 1 below.

$$n_{CRB}^{\mu} = \left\lfloor \frac{k}{N_{sc}^{RB}} \right\rfloor \quad \text{[Equation 1]}$$

Here, k may be relatively defined in point A so that k=0 corresponds to a subcarrier centering on point A. Physical resource blocks are numbered with 0 to $N_{BWP,i}^{size}-1$ in a bandwidth part (BWP) and i represents the number of the BWP. A relationship between the physical resource block $n_{PRB}$ and the common resource block $n_{CRB}$ in BWP i is given by Equation 2 below.

$$n_{CRB}=n_{PRB}+N_{BWP,i}^{start} \quad \text{[Equation 2]}$$

Here, $N_{BWP,i}^{start}$ may be a common resource block in which the BWP relatively starts to common resource block 0.

Synchronization Signal Block (SSB) transmission and related operation

Figure 6:
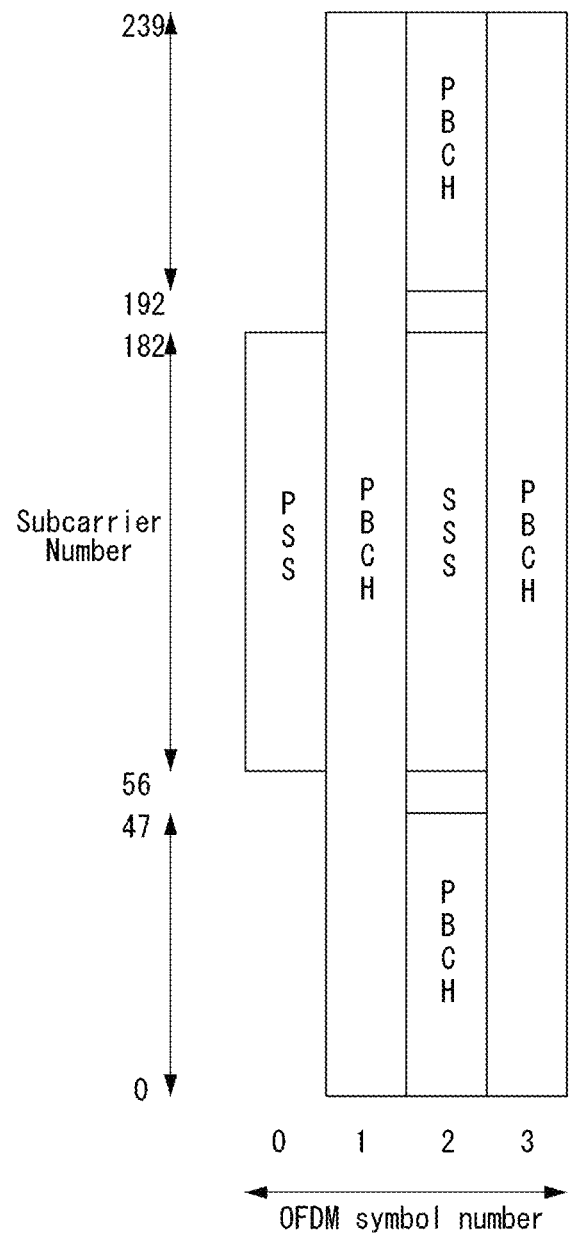
FIG. 6 illustrates an SSB structure.

FIG. 6 illustrates an SSB structure. The UE may perform cell search, system information acquisition, beam alignment for initial access, DL measurement, etc., based on an SSB. The SSB is mixedly used with an SS/Synchronization Signal/Physical Broadcast channel (PBCH) block.

Referring to FIG. 6, the SSB is constituted by PSS, SSS, and PBCH. The SSB is constituted by four continuous OFDM symbols and the PSS, the PBCH, the SSS/PBCH, and the PBCH are transmitted for each OFDM symbol. Each of the PSS and the SSS may be constituted by one OFDM symbol and 127 subcarriers and the PBCH is constituted by 3 OFDM symbols and 576 subcarriers. Polar coding and quadrature phase shift keying (QPSK) are applied to the PBCH. The PBCH is constituted by a data RE and a demodulation reference signal (DMRS) RE for each OFDM symbol. Three DMRS REs exist for each RB, and three data REs exist between DMRS REs.

Cell Search

The cell search refers to a process of acquiring time/frequency synchronization of the cell and detecting a cell identifier (ID) (e.g., physical layer cell ID (PCID)) of the cell by the UE. The PSS is used to detect the cell ID within a cell ID group and the SSS is used to detect the cell ID group. The PBCH is used for SSB (time) index detection and half-frame detection.

A cell search process of the UE may be organized as shown in Table 5 below.

TABLE 5

| | Type of Signals | Operations |
|---|---|---|
| 1st step | PSS | SS/PBCH block (SSB) symbol timing acquisition |
| | | Cell ID detection within a cell ID group (3 hypothesis) |
| 2nd Step | SSS | Cell ID group detection (336 hypothesis) |
| 3rd Step | PBCH DMRS | SSB index and Half frame (HF) index (Slot and frame boundary detection) |
| 4th Step | PBCH | Time information (80 ms, System Frame Number (SFN), SSB index, HF) Remaining Minimum System Information (RMSI) Control resource set (CORESET)/ Search space configuration |
| 5th Step | PDCCH and PDSCH | Cell access information RACH configuration |

There are 336 cell ID groups, and three cell IDs exist for each cell ID group. There may be a total of 1008 cell IDs and the cell ID may be defined by Equation 3.

$$N_{ID}^{cell}=3N_{ID}^{(1)}+N_{ID}^{(2)} \quad \text{[Equation 3]}$$

Here, $N_{ID}^{(1)} \in \{0, 1, \ldots, 335\}$ and $N_{ID}^{(2)} \in \{0,1,2\}$.

Here, NcellID represents a cell ID (e.g., PCID). N(1)ID represents a cell ID group and is provided/acquired through the SSS. N(2)ID represents a cell ID in the cell ID group and is provided/acquired through the PSS.

PSS sequence dPSS(n) may be defined to satisfy Equation 4.

$$d_{PSS}(n)=1-2x(m)$$

$$m=(n+43N_{ID}^{(2)}) \bmod 127$$

$$0 \leq n < 127 \quad \text{[Equation 4]}$$

Here, x(i+7)=(x(i+4)+x(i))mod 2, and
[x(6) x(5) x(4) x(3) x(2) x(1) x(0)]=[1 1 1 0 1 1 0].

SSS sequence dSSS(n) may be defined to satisfy Equation 5.

$$d_{SSS}(n) = [1 - 2x_0((n+m_0) \bmod 127)] \quad \text{[Equation 5]}$$

$$[1 - 2x_1((n+m_1) \bmod 127)]$$

$$m_0 = 15 \left\lfloor \frac{N_{ID}^{(1)}}{112} \right\rfloor + 5N_{ID}^{(2)}$$

$$m_1 = N_{ID}^{(1)} \bmod 112$$

-continued $$0 \le n < 127$$

$$x_0(i+7) = (x_0(i+4) + x_0(i)) \bmod 2$$

Here, $x_1(i+7) = (x_1(i+1) + x_1(i)) \bmod 2$, and $$[x_0(6)\ x_0(5)\ x_0(4)\ x_0(3)\ x_0(2)\ x_0(1)\ x_0(0)] =$$

$$[0\ 0\ 0\ 0\ 0\ 0\ 1]$$

$$[x_1(6)\ x_1(5)\ x_1(4)\ x_1(3)\ x_1(2)\ x_1(1)\ x_0(0)] =$$

$$[0\ 0\ 0\ 0\ 0\ 0\ 1].$$

Figure 7:
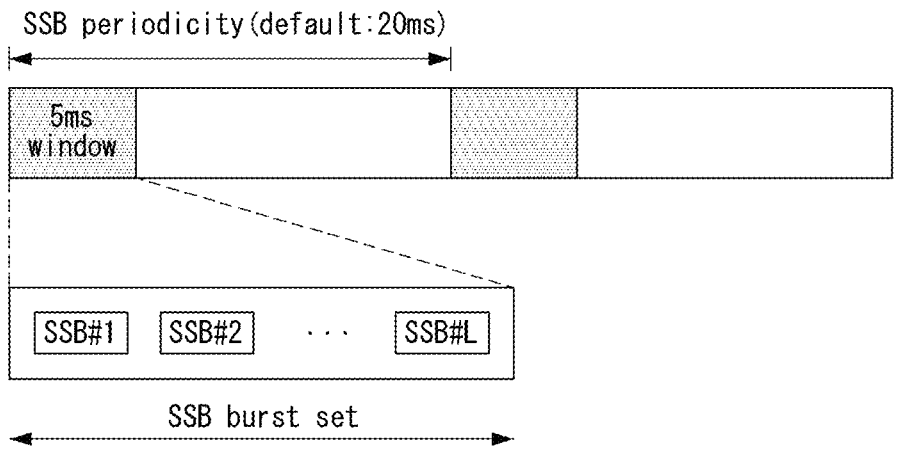
FIG. 7 illustrates SSB transmission.

FIG. 7 illustrates SSB transmission.

The SSB is periodically transmitted according to SSB periodicity. An SSB basic periodicity assumed by the UE in initial cell search is defined as 20 ms. After cell access, the SSB periodicity may be configured by one of {5 ms, 10 ms, 20 ms, 40 ms, 80 ms, 16 0 ms} by the network (e.g., BS). At a beginning part of the SSB periodicity, a set of SSB bursts is configured. The SSB burst set may be configured by a 5-ms time window (i.e., half-frame) and the SSB may be transmitted up to L times within the SS burst set. L which is the maximum number of transmissions of the SSB may be given as follows according to a frequency band of a carrier. One slot includes up to two SSBs.

For frequency range up to 3 GHz, L=4
For frequency range from 3 GHz to 6 GHz, L=8
For frequency range from 6 GHz to 52.6 GHz, L=64

A time position of an SSB candidate in the SS burst set may be defined as follows according to SCS. The time positions of the SSB candidates are indexed from 0 to L−1 in chronological order within the SSB burst set (i.e., half-frame) (SSB index).

Case A—15 kHz SCS: The index of the start symbol of the candidate SSB is given as {2, 8}+14*n. When the carrier frequency is 3 GHz or less, n=0, 1. When the carrier frequency is 3 to 6 GHz, n=0, 1, 2, 3.

Case B—30 kHz SCS: The index of the start symbol of the candidate SSB is given as {4, 8, 16, 20}+28*n. When the carrier frequency is 3 GHz or less, n=0. When the carrier frequency is 3 to 6 GHz, n=0, 1.

Case C—30 kHz SCS: The index of the start symbol of the candidate SSB is given as {2, 8}+14*n. When the carrier frequency is 3 GHz or less, n=0, 1. When the carrier frequency is 3 to 6 GHz, n=0, 1, 2, 3.

Case D—120 kHz SCS: The index of the start symbol of the candidate SSB is given as {4, 8, 16, 20}+28*n. When the carrier frequency is more than 6 GHz, n=0, 1, 2, 3, 5, 6, 7, 8, 10, 11, 12, 13, 15, 16, 17, 18.

Case E—240 kHz SCS: The index of the start symbol of the candidate SSB is given as {8, 12, 16, 20, 32, 36, 40, 44}+56*n. When the carrier frequency is more than 6 GHz, n=0, 1, 2, 3, 5, 6, 7, 8.

Figure 8:
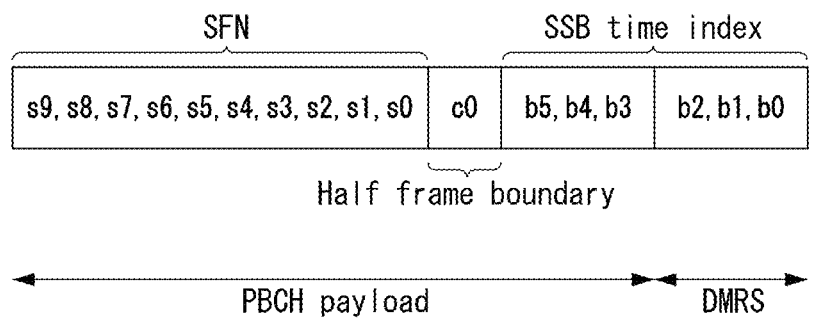
FIG. 8 illustrates that a UE acquires information on DL time synchronization.

FIG. 8 illustrates that a UE acquires information on DL time synchronization.

The UE may acquire DL synchronization by detecting the SSB. The UE may identify the structure of the SSB burst set based on the detected SSB index, and thus detect a symbol/slot/half-frame boundary. The number of the frame/half-frame to which the detected SSB belongs may be identified using SFN information and half-frame indication information.

Specifically, the UE may acquire 10-bit System Frame Number (SFN) information from the PBCH (s0 to s9). 6 bits of the 10-bit SFN information are obtained from a Master Information Block (MIB), and the remaining 4 bits are obtained from a PBCH Transport Block (TB).

Next, the UE may acquire 1-bit half-frame indication information (c0). When a carrier frequency is 3 GHz or less, the half-frame indication information may be implicitly signaled using PBCH DMRS. The PBCH DMRS indicates 3-bit information by using one of eight PBCH DMRS sequences. Accordingly, in the case of L=4, 1 bit which remains after indicating the SSB index among 3 bits which may be indicated by using eight PBCH DMRS sequences may be used for half frame indication.

Last, the UE may acquire the SSB index based on a DMRS sequence and a PBCH payload. SSB candidates are indexed from 0 to L−1 in chronological order within the SSB burst set (i.e., half-frame). In the case of L=8 or 64, Least Significant Bit (LSB) 3 bits of the SSB index may be indicated using eight different PBCH DMRS sequences (b0 to b2). In the case of L=64, Most Significant Bit (MSB) 3 bits of the SSB index are indicated through the PBCH (b3 to b5). In the case of L=2, LSB 2 bits of the SSB index may be indicated using four different PBCH DMRS sequences (b0 and b1). In the case of L=4, 1 bit which remains after indicating the SSB index among 3 bits which may be indicated by using eight PBCH DMRS sequences may be used for the half frame indication (b2).

Physical Channel and General Signal Transmission

Figure 9:
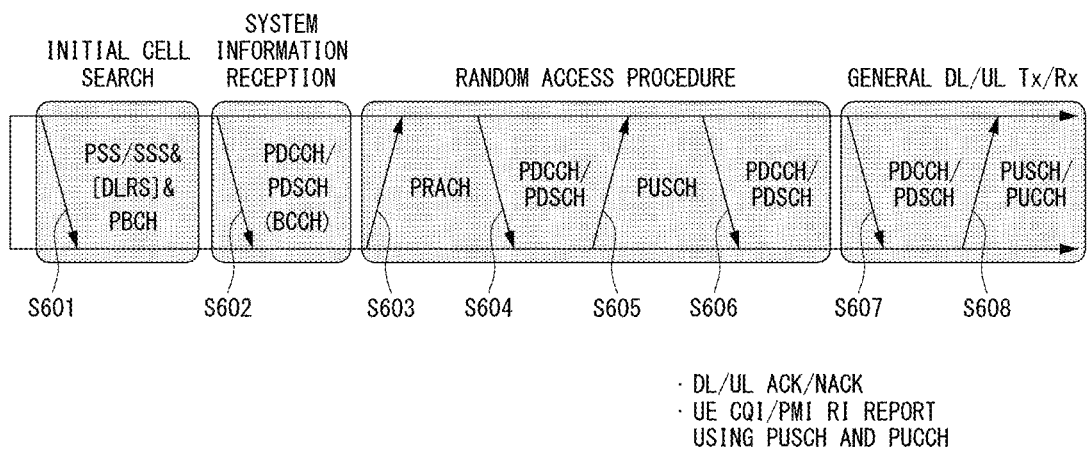
FIG. 9 illustrates physical channels and general signal transmission used in a 3GPP system.

FIG. 9 illustrates physical channels and general signal transmission used in a 3GPP system. In the wireless communication system, the UE receives information from the BS through Downlink (DL) and the UE transmits information from the BS through Uplink (UL). The information which the BS and the UE transmit and receive includes data and various control information and there are various physical channels according to a type/use of the information which the BS and the UE transmit and receive.

When the UE is powered on or newly enters a cell, the UE performs an initial cell search operation such as synchronizing with the BS (S601). To this end, the UE may receive a Primary Synchronization Signal (PSS) and a (Secondary Synchronization Signal (SSS) from the BS and synchronize with the eNB and acquire information such as a cell ID or the like. Thereafter, the UE may receive a Physical Broadcast Channel (PBCH) from the BS and acquire in-cell broadcast information. Meanwhile, the UE receives a Downlink Reference Signal (DL RS) in an initial cell search step to check a downlink channel status.

A UE that completes the initial cell search receives a Physical Downlink Control Channel (PDCCH) and a Physical Downlink Control Channel (PDSCH) according to information loaded on the PDCCH to acquire more specific system information (S602).

Meanwhile, when there is no radio resource first accessing the BS or for signal transmission, the UE may perform a Random Access Procedure (RACH) to the BS (S603 to S606). To this end, the UE may transmit a specific sequence to a preamble through a Physical Random Access Channel (PRACH) (S603 and S605) and receive a response message (Random Access Response (RAR) message) for the preamble through the PDCCH and a corresponding PDSCH. In the case of a contention based RACH, a Contention Resolution Procedure may be additionally performed (S606).

The UE that performs the above-described procedure may then perform PDCCH/PDSCH reception (S607) and Physical Uplink Shared Channel (PUSCH)/Physical Uplink Control Channel (PUCCH) transmission (S608) as a general uplink/downlink signal transmission procedure. In particular, the UE may receive Downlink Control Information (DCI) through the PDCCH. Here, the DCI may include control information such as resource allocation information for the UE and formats may be differently applied according to a use purpose.

Meanwhile, the control information which the UE transmits to the BS through the uplink or the UE receives from the eNB may include a downlink/uplink ACK/NACK signal, a Channel Quality Indicator (CQI), a Precoding Matrix Index (PMI), a Rank Indicator (RI), and the like. The UE may transmit the control information such as the CQI/PMI/RI, etc., through the PUSCH and/or PUCCH.

Table 6 shows an example of a DCI format in the NR system.

TABLE 6

| DCI format | Usage |
| --- | --- |
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |

Referring to Table 6, DCI format 0_0 is used for scheduling of the PUSCH in one cell.

Information included in DCI format 0_0 is CRC-scrambled and transmitted by C-RNTI, CS-RNTI, or MCS-C-RNTI. In addition, DCI format 0_1 is used for reserving the PUSCH in one cell. Information included in DCI format 0_1 is CRC-scrambled and transmitted by C-RNTI, CS-RNTI, SP-CSI-RNTI, or MCS-C-RNTI. DCI format 1_0 is used for scheduling of the PDSCH in one DL cell. Information included in DCI format 1_0 is CRC-scrambled and transmitted by C-RNTI, CS-RNTI, or MCS-C-RNTI. DCI format 1_1 is used for scheduling of the PDSCH in one cell. Information included in DCI format 1_1 is CRC-scrambled and transmitted by C-RNTI, CS-RNTI, or MCS-C-RNTI. DCI format 2_1 is used to inform PRB(s) and OFDM symbol(s) of which the UE may assume not intending transmission.

The following information included in DCI format 2_1 is CRC-scrambled and transmitted by INT-RNTI.

preemption indication 1, preemption indication 2, . . . , preemption indication N.

In the present disclosure, proposed are a signaling scheme and a UE/BS behavior for indicating/supporting a padding technique applied when a dimension size of information related to a spatial domain/frequency domain/time domain used for an implementation reason is smaller than a size of a DFT vector when configuring the codebook using the DFT vector in relation to CSI acquisition/reporting.

In the present disclosure, '/' may mean that all of the contents distinguished by/(and) or include only some of the distinguished contents (or).

Hereinafter, downlink (DL) means communication from a base station to a terminal and uplink (UL) means communication from the terminal to the base station. In the downlink, a transmitter may be part of the base station, and a receiver may be part of the terminal. In the uplink, the transmitter may be part of the terminal and the receiver may be part of the base station. The base station may be expressed as a first communication device and the terminal may be expressed as a second communication device. A base station (BS) may be replaced with terms including a fixed station, a Node B, an evolved-NodeB (eNB), a Next Generation NodeB (gNB), a base transceiver system (BTS), an access point (AP), a network (5G network), an artificial intelligence (AI) system/module, a road side unit (RSU), a robot, an Unmanned Aerial Vehicle (UAV), an Augmented Reality (AR) device, a Virtual Reality (VR) device, and the like. Further, the terminal may be fixed or mobile and may be replaced with terms including a User Equipment (UE), a Mobile Station (MS), a user terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, and a Device-to-Device (D2D) device, the vehicle, the road side unit (RSU), the robot, the artificial intelligence (AI) module, the Unmanned Aerial Vehicle (UAV), the Augmented Reality (AR) device, the Virtual Reality (VR) device, and the like.

Beam Management (BM)

A BM procedure as layer 1 (L1)/layer 2 (L2) procedures for acquiring and maintaining a set of base station (e.g., gNB, TRP, etc.) and/or terminal (e.g., UE) beams which may be used for downlink (DL) and uplink (UL) transmission/reception may include the following procedures and terms.

Beam measurement: Operation of measuring characteristics of a received beamforming signal by the BS or UE.

Beam determination: Operation of selecting a transmit (Tx) beam/receive (Rx) beam of the BS or UE by the BS or UE.

Beam sweeping: Operation of covering a spatial region using the transmit and/or receive beam for a time interval by a predetermined scheme.

Beam report: Operation in which the UE reports information of a beamformed signal based on beam measurement.

The BM procedure may be divided into (1) a DL BM procedure using a synchronization signal (SS)/physical broadcast channel (PBCH) Block or CSI-RS and (2) a UL BM procedure using a sounding reference signal (SRS).

Further, each BM procedure may include Tx beam sweeping for determining the Tx beam and Rx beam sweeping for determining the Rx beam.

Downlink Beam Management (DL BM)

Figure 10:
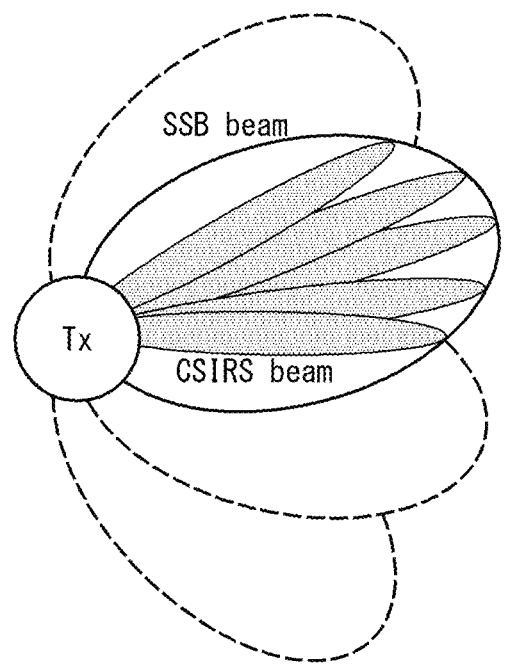
FIG. 10 is a diagram illustrating an example of a beam used for beam management.

FIG. 10 is a diagram illustrating an example of a beam used for beam management.

The DL BM procedure may include (1) transmission of beamformed DL reference signals (RSs) (e.g., CIS-RS or SS Block (SSB)) of the eNB and (2) beam reporting of the UE.

Here, the beam reporting a preferred DL RS identifier (ID)(s) and L1-Reference

Signal Received Power (RSRP).

The DL RS ID may be an SSB Resource Indicator (SSBRI) or a CSI-RS Resource Indicator (CRI).

As illustrated in FIG. 10, an SSB beam and a CSI-RS beam may be used for the beam management. A measurement metric is an L1-RSRP for each resource/block. The SSB may be sued for coarse beam management and the CSI-RS may be sued for fine beam management. The SSB may be used for both the Tx beam sweeping and the Rx beam sweeping.

The Rx beam sweeping using the SSB may be performed while the UE changes the Rx beam for the same SSBRI across multiple SSB bursts. Here, one SS burst includes one or more SSBs and one SS burst set includes one or more SSB bursts.

DL BM using SSB

Figure 11:
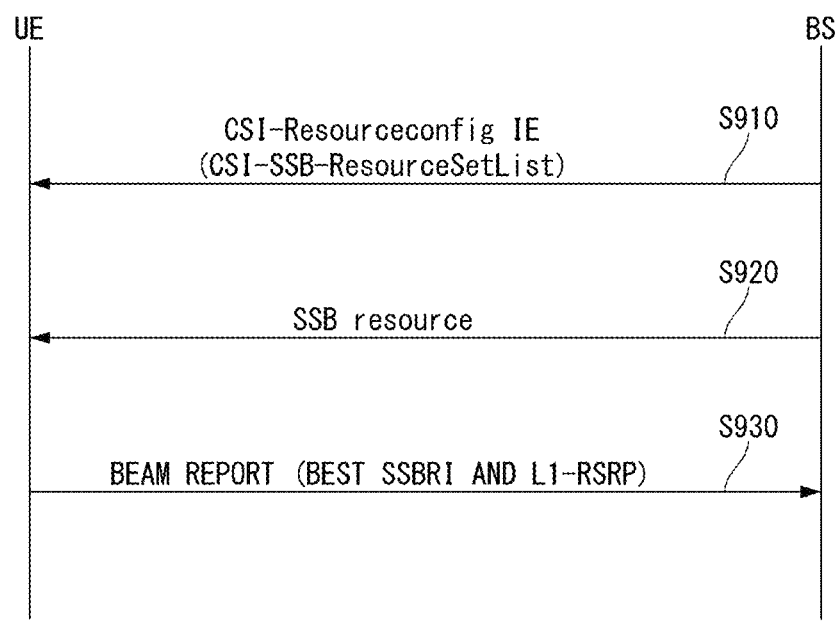
FIG. 11 is a flowchart showing an example of a downlink beam management procedure.

FIG. 11 is a flowchart showing an example of a downlink beam management procedure.

A configuration for beam report using the SSB is performed during a CSI/beam configuration in an RRC connected state (or RRC connected mode).

The UE receives from the BS CSI-ResourceConfig IE including CSI-SSB-ResourceSetList including SSB resources used for the BM (S910).

Table 7 shows an example of CSI-ResourceConfig IE and as shown in Table A, a BM configuration using the SSB is not separately defined and the SSB is configured like the CSI-RS resource.

TABLE 7

```
-- ASN1START
-- TAG-CSI-RESOURCECONFIG-START
CSI-ResourceConfig ::=             SEQUENCE {
    csi-ResourceConfigId           CSI-ResourceConfigId,
    csi-RS-ResourceSetList         CHOICE {
        nzp-CSI-RS-SSB
        SEQUENCE {
            nzp-CSI-RS-ResourceSetList         SEQUENCE
(SIZE (1..maxNrofNZP-CSI-RS-ResourceSetsPerConfig)) OF NZP-
CSI-RS-ResourceSetId OPTIONAL,
            csi-SSB-ResourceSetList
        SEQUENCE (SIZE (1..maxNrofCSI-SSB-ResourceSetsPerConfig))
OF CSI-SSB-ResourceSetId OPTIONAL
        },
        csi-IM-ResourceSetList             SEQUENCE (SIZE
(1..maxNrofCSI-IM-ResourceSetsPerConfig)) OF CSI-IM-ResourceSetId
    },
    bwp-Id                         BWP-Id,
    resourceType                   ENUMERATED
{ aperiodic, semiPersistent, periodic },
    ...
}
-- TAG-CSI-RESOURCECONFIGTOADDMOD-STOP
-- ASN1STOP
```

In Table 7, csi-SSB-ResourceSetList parameter represents a list of SSB resources used for beam management and reporting in one resource set. Here, SSB resource set may be configured as {SSBx1, SSBx2, SSBx3, SSBx4, . . . }. The SSB index may be defined as 0 to 63.

The UE receives, from the BS, the SSB resource based on the CSI-SSB-ResourceSetList (S920).

When CSI-RS reportConfig associated with reporting of SSBRI and L1-RSRP is configured, the UE (beam) reports to the BS best SSBRI and L1-RSRP corresponding thereto (S930).

In other words, when reportQuantity of the CSI-RS reportConfig IE is configured as 'ssb-Index-RSRP', the UE reports to the BS best SSBRI and L1-RSRP corresponding thereto.

In addition, when the CSI-RS resource is configured in the same OFDM symbol(s) as SSB (SS/PBCH Block) and 'QCL-TypeD' is applicable, the UE may assume that the CSI-RS and the SSB are quasi co-located from the viewpoint of 'QCL-TypeD'.

Here, the QCL TypeD may mean that antenna ports are QCL from the viewpoint of a spatial Rx parameter. When the UE receives a plurality of DL antenna ports having a QCL Type D relationship, the same Rx beam may be applied. Further, the UE does not expect that the CSI-RS is configured in an RE overlapped with the RE of the SSB.

DL BM using CSI-RS

In respect to a CSI-RS usage, i) when a repetition parameter is configured in a specific CSI-RS resource set and TRS_info is not configured, the CSI-RS is used for the beam management. ii) When the repetition parameter is not configured and TRS_info is configured, the CSI-RS is used for a tracking reference signal (TRS). iii) When the repetition parameter is not configured and TRS_info is not configured, the CSI-RS is used for CSI acquisition.

The repetition parameter may be configured only for CSI-RS resource sets associated with CSI-ReportConfig having a report of L1 RSRP or 'No Report (or None)'.

When the UE is configured with CSI-ReportConfig in which reportQuantity is configured as 'cri-RSRP' or 'none' and CSI-ResourceConfig (higher layer parameter resourcesForChannelMeasurement) for channel measurement includes not higher layer parameter 'trs-Info' but NZP-CSI-RS-ResourceSet in which higher layer parameter 'repetition' is configured, the UE may be configured only with the same number of port (1-port or 2-port) having higher layer parameter 'nrofPorts' for all CSI-RS resources in NZP-CSI-RS-ResourceSet.

When (higher layer parameter) repetition is configured to 'ON', (higher layer parameter) repetition is associated with the Rx beam sweeping procedure of the UE. In this case, when the UE is configured with NZP-CSI-RS-ResourceSet, the UE may assume that at least one CSI-RS resource in NZP-CSI-RS-ResourceSet is transmitted to the same downlink spatial domain transmission filter. In other words, at least one CSI-RS resource in NZP-CSI-RS-ResourceSet is transmitted through the same Tx beam. Here, at least one CSI-RS resource in NZP-CSI-RS-ResourceSet may be transmitted to different OFDM symbols.

Further, the UE does not expect that different periodicities are received at periodicityAndOffset in all CSI-RS resources in NZP-CSI-RS-Resourceset.

On the contrary, when Repetition is configured to 'OFF', the Repetition is associated with the Tx beam sweeping procedure of the BS. In this case, when repetition is configured to 'OFF', the UE does not assume that at least one CSI-RS resource in NZP-CSI-RS-ResourceSet is transmitted to the same downlink spatial domain transmission filter. In other words, at least one CSI-RS resource in NZP-CSI-RS-ResourceSet is transmitted through different Tx beams.

Figure 12:
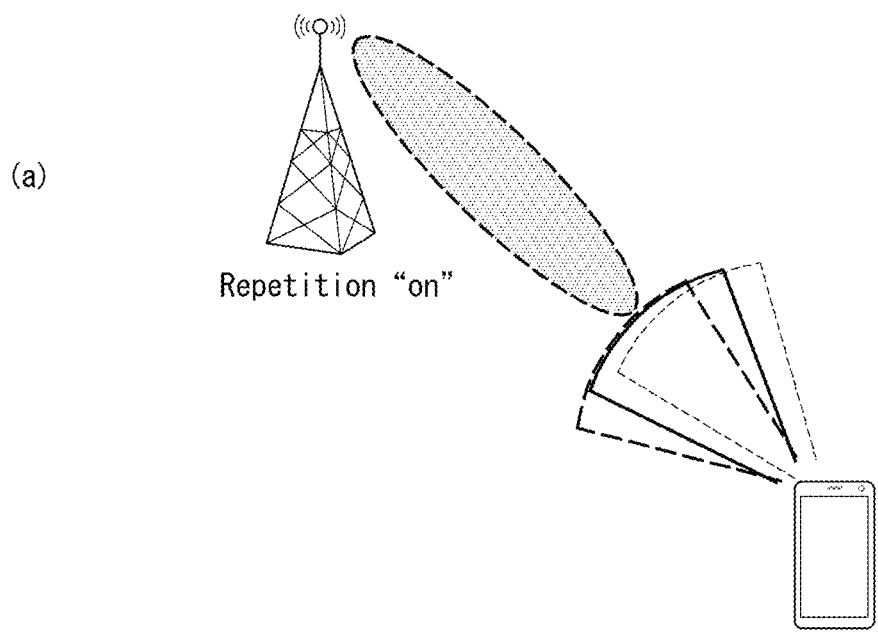
FIG. 12 illustrates an example of a downlink beam management procedure using a channel status information reference signal.
Figure 12:
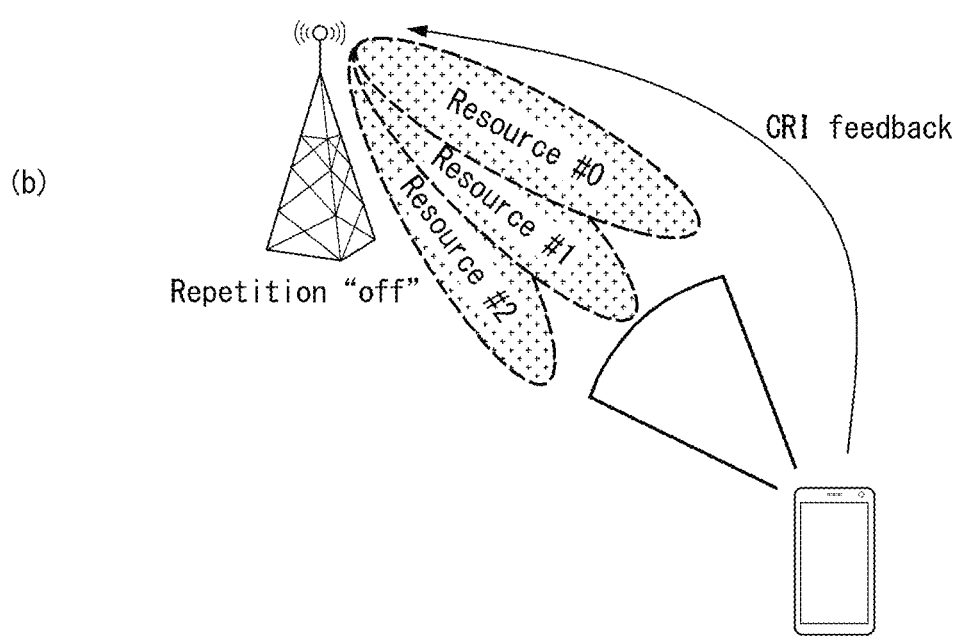

FIG. 12 illustrates an example of a downlink beam management procedure using a Channel State Information-Reference Signal (CSI-RS).

FIG. 12(a) illustrates an Rx beam determination (or refinement) procedure of the UE and FIG. 12(b) illustrates a Tx beam sweeping procedure of the BS. Further, FIG. 12(a) illustrates a case where the repetition parameter is configured to 'ON' and FIG. 12(b) illustrates a case where the repetition parameter is configured to 'OFF'.

Figure 13:
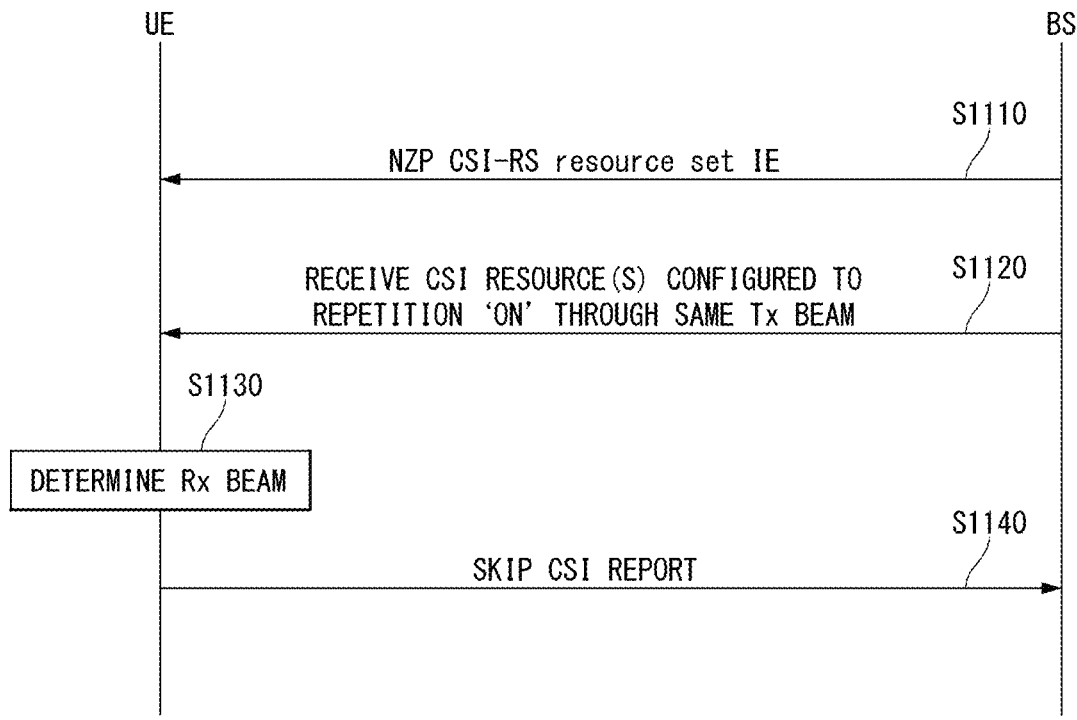
FIG. 13 is a flowchart showing an example of a receive beam determination process of a UE.

Referring to FIGS. 12(a) and 13, an Rx beam determination process of the UE will be described.

FIG. 13 is a flowchart showing an example of a receive beam determination process of a UE.

The UE receives, from the BS, NZP CSI-RS resource set IE including higher layer parameter repetition through RRC signaling (S1110). Here, the repetition parameter is configured to 'ON'.

The UE repeatedly receives a resource(s) in CSI-RS resource set configured as repetition 'ON' in different OFDM symbols through the same Tx beam (or DL spatial domain transmission filter) of the BS (S1120).

The UE determines the Rx beam thereof (S1130).

The UE skips CSI report (S1140). In this case, reportQuantity of CSI report config may be configured as 'No report (or None)'.

In other words, the UE may skip the CSI report when repetition 'ON' is configured.

Referring to FIGS. 10(b) and 12, a Tx beam determination process of the BS will be described.

Figure 14:
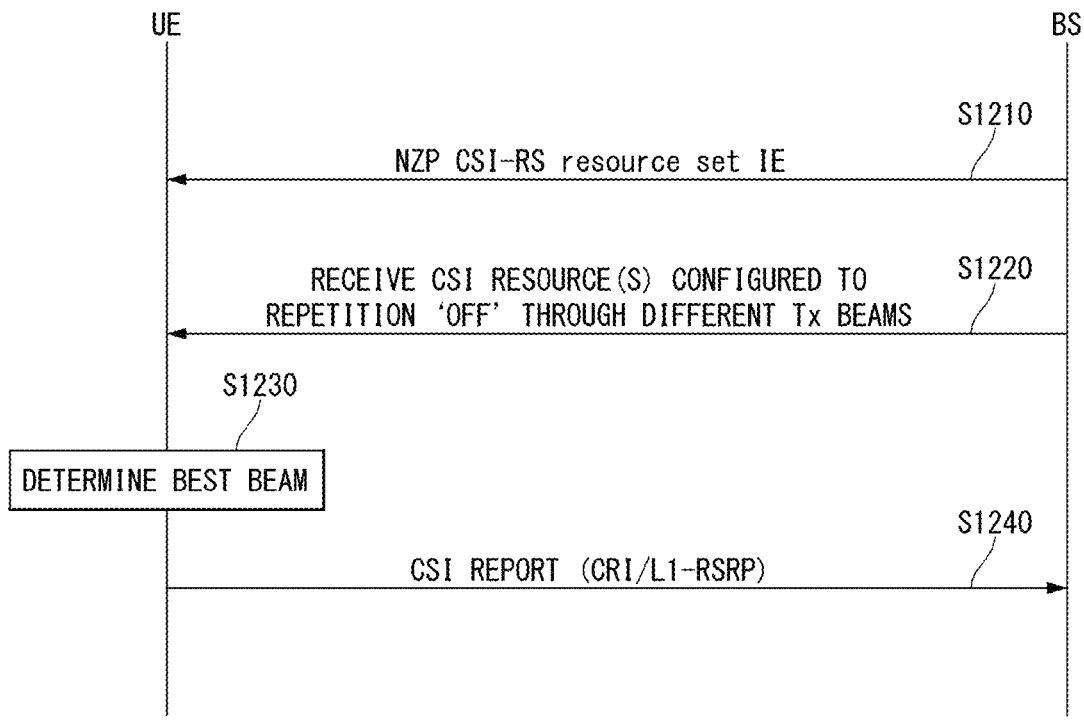
FIG. 14 is a flowchart showing an example of a transmit beam determination process of a BS.

FIG. 14 is a flowchart showing an example of a transmit beam determination process of a BS.

The UE receives, from the BS, NZP CSI-RS resource set IE including higher layer parameter repetition through RRC signaling (S1210). Here, the repetition parameter is configured to 'OFF' and associated with the Tx beam sweeping procedure of the BS.

The UE receives a resource(s) in CSI-RS resource set configured as repetition 'OFF' through different Tx beams (DL spatial domain transmission filters) of the eNB (S1220).

The UE selects (or determines) a best beam (S1230).

The UE reports to the BS an ID for the selected beam and related quality information (e.g., L1-RSRP) (S1240). In this case, reportQuantity of CSI report config may be configured as 'CRI+L1-RSRP'.

In other words, when the CSI-RS is transmitted for the BM, the UE reports to the BS the CRI and L1-RSRP therefor.

Figure 15:
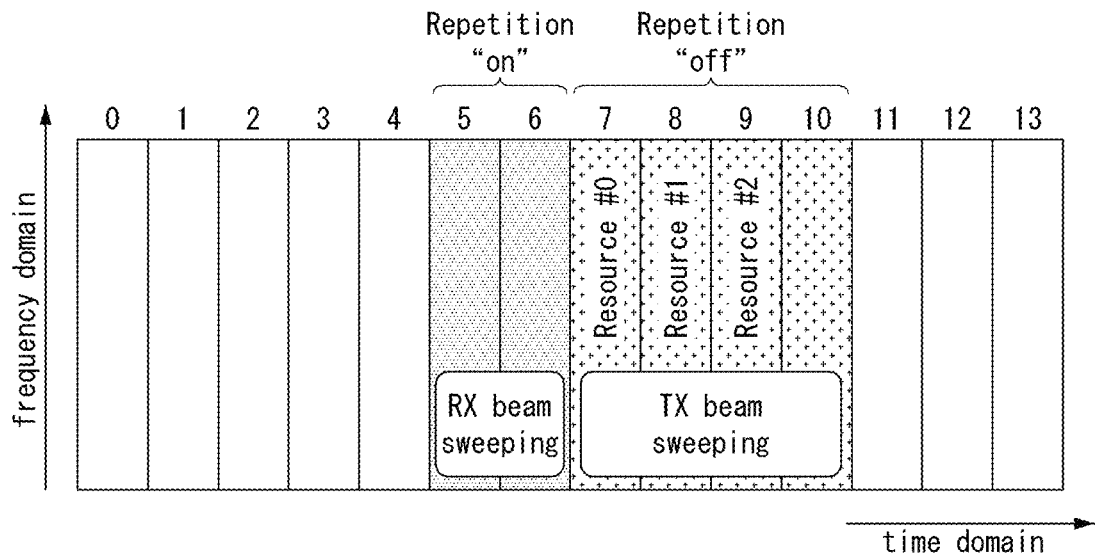
FIG. 15 illustrates an example of resource allocation in time and frequency domains related to a DL BM procedure using a CSI-RS.

FIG. 15 illustrates an example of resource allocation in time and frequency domains related to a DL BM procedure using a CSI-RS.

Specifically, it can be seen that when repetition 'ON' is configured in the CSI-RS resource set, a plurality of CSI-RS resources is repeatedly used by applying the same Tx beam and when repetition 'OFF' is configured in the CSI-RS resource set, different CSI-RS resources are transmitted by different Tx beams.

DL BM related beam indication

The UE may be RRC-configured with a list for a maximum of M candidate Transmission Configuration Indication (TCI) states at least for a purpose of Quasi Co-location (QCL) indication. Here, the M may be 64.

Each TCI state may be configured as one RS set. One of DL RS types including

SSB, P-CSI RS, SP-CSI RS, A-CSI RS, and the like may be at least referred to for an ID of each DL RS for a purpose of spatial QCL (QCL Type D) in the RS set.

Initialization/update of the ID of the DL RS(s) in the RS set used for the purpose of the spatial QCL may be at least performed through explicit signaling.

Table 8 shows an example of TCI-State IE.

The TCI-State IE is associated with a quasi co-location (QCL) type corresponding to one or two DL reference signals (RSs).

TABLE 8

| | |
|---|---|
| -- ASN1START | |
| -- TAG-TCI-STATE-START | |
| TCI-State ::= | SEQUENCE { |
| tci-StateId | TCI-StateId, |
| qcl-Type1 | QCL-Info, |
| qcl-Type2 | QCL-Info |
| | OPTIONAL, -- Need R |
| ... | |
| } | |
| QCL-Info ::= | SEQUENCE { |
| cell | |
| ServCellIndex | |
| | OPTIONAL, -- Need R |
| bwp-Id | BWP-Id |
| | OPTIONAL, -- Cond CSI-RS- |
| Indicated | |
| referenceSignal | CHOICE { |
| csi-rs | |
| NZP-CSI-RS-ResourceId, | |
| ssb | |
| SSB-Index | |
| }, | |
| qcl-Type | |
| ENUMERATED {typeA, typeB, typeC, typeD}, | |
| ... | |

TABLE 8-continued

| |
|---|
| } |
| -- TAG-TCI-STATE-STOP |
| -- ASN1STOP |

In Table 8, bwp-Id parameter represents DL BWP in which the RS is located, cell parameter represents a carrier in which the RS is located, and reference signal parameter represents a reference antenna port(s) which becomes a source of quasi co-location for the corresponding target antenna port(s) or a reference signaling including the same. The target antenna port(s) may be CSI-RS, PDCCH DMRS, or PDSCH DMRS. As an example, corresponding TCI state ID may be indicated for NZP CSI-RS resource configuration information in order to indicate QCL reference RS information for NZP CSI-RS. As another example, the TCI state ID may be indicated for each CORESET configuration in order to indicate QCL reference information for a PDCCH DMRS antenna port(s). As yet another example, the TCI state ID may be indicated through DCI in order to indicate QCL reference information for a PDSCH DMRS antenna port(s).

Quasi-Co Location (QCL)

The antenna port is defined so that a channel in which the symbol on the antenna port is transported may be inferred from a channel in which different symbols on the same antenna port are transported. When a property of a channel in which a symbol on one antenna port is transported may be interred from a channel in which symbols on different antenna ports are transported, two antenna ports may have a quasi co-located or quasi co-location (QC/QCL) relationship.

Here, the channel property includes at least one of a delay spread, a Doppler spread, a frequency/Doppler shift, average received power, received timing/average delay, and a spatial Rx parameter. Here, the spatial Rx parameter means a spatial (receive) channel property parameter such as angle of arrival.

The UE may be configured as a list of up to M TCI-State configurations in higher layer parameter PDSCH-Config in order to decode the PDSCH according to detected PDCCH having an intended DCI for the corresponding UE and a given serving cell. The M depends on a UE capability.

Each TCI-State includes a parameter for configuring a quasi co-location relationship between one or two DL reference signals and a DM-RS port of the PDSCH.

The quasi co-location relationship is configured as higher layer parameter qcl-Type1 for a first DL RS and qcl-Type2 (when configured) for a second DL RS. Two DL RSs are not the same as each other in terms of QCL type regardless of whether two DL RS are DL RSs having the same reference or DL RSs having different references.

A quasi co-location type corresponding to each DL RS may be given by higher layer parameter qcl-Type of QCL-Info and may take one of the following values.

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

For example, when a target antenna port is specific NZP CSI-RS, corresponding NZP CSI-RS antenna ports may be indicated/configured to be QCL with specific TRS from the viewpoint of QCL-Type A and specific SSB from the viewpoint of QCL-Type D. The UE that receives the indication/configuration may receive the corresponding NZP CSI-RS by using a Doppler delay value measured in QCL-TypeA TRS and apply an Rx beam used for receiving QCL-TypeD SSB to reception of the corresponding NZP CSI-RS.

The UE may receive an activation command by MAC CE signaling used for mapping up to eight TCI states to codepoint of DCI field "Transmission Configuration Indication'.

UL BM

In the case of UL BM, beam reciprocity (or beam correspondence) between the Tx beam and the Rx beam may be established or not established according to UE implementation. If the reciprocity between the Tx beam and the Tx beam is established in both the BS and the UE, a UL beam pair may be matched through a DL beam pair. However, when the reciprocity between the Tx beam and the Rx beam is not established even in any one of the BS and the UE, a UL beam pair determination process is required apart form DL beam pair determination.

Further, even when the BS and the UE maintain beam correspondence, the BS may use a UL BM procedure in order to determine a DL Tx beam without requesting report of a preferred beam by the UE.

The UL BM may be performed through beamformed UL SRS transmission and whether to apply UL BM of the SRS resource set is configured by a (higher layer parameter) usage. When the usage is configured as 'BeamManagement (BM)', only one SRS resource may be transmitted to each of a plurality of SRS resource sets at a given time instant.

The UE may be configured with one or more Sounding Reference Symbol (SRS) resource sets configured by (higher layer parameter) SRS-ResourceSet (through higher layer signaling, RRC signaling, etc.). For each SRS resource set, the UE may be configured with K (≥1) SRS resources (higher later parameter SRS-resources). Here, K is a natural number and a maximum value of K is indicated by SRS_capability.

Similarly to the DL BM, a UL BM procedure may also be divided into Tx beam sweeping of the UE and Rx beam sweeping of the BS.

Figure 16:
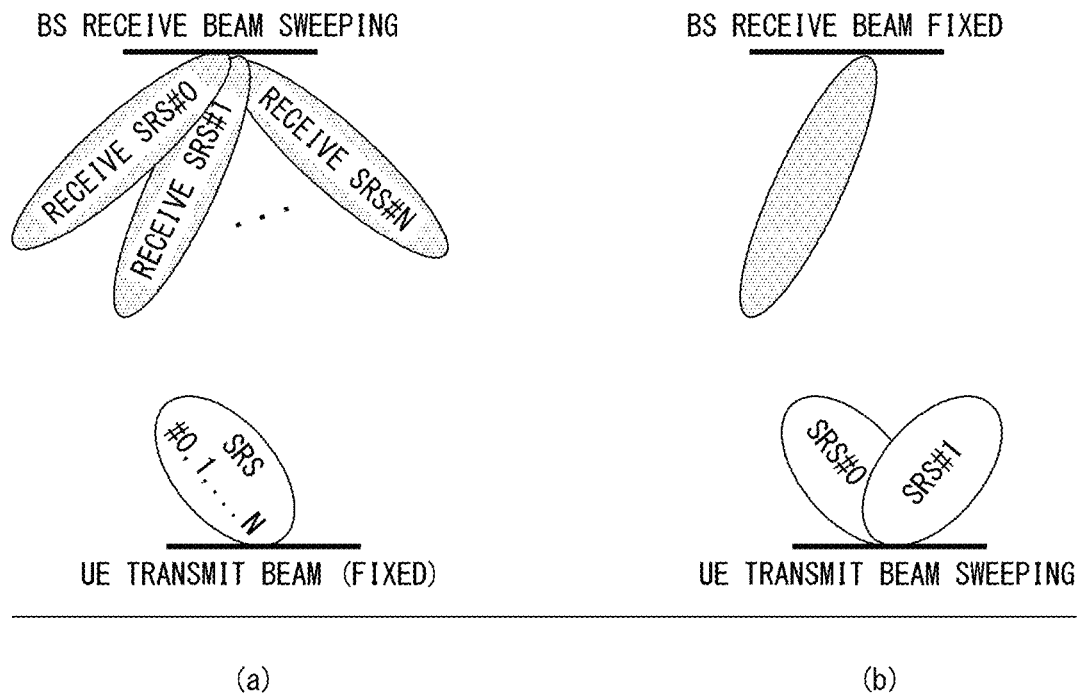
FIG. 16 illustrates an example of an uplink beam management procedure using a Sounding Reference Signal (SRS).

FIG. 16 illustrates an example of an uplink beam management procedure using a Sounding Reference Signal (SRS). FIG. 16(a) illustrates an Rx beam determination procedure of the BS and FIG. 16(b) illustrates a Tx beam sweeping procedure of the UE.

Figure 17:
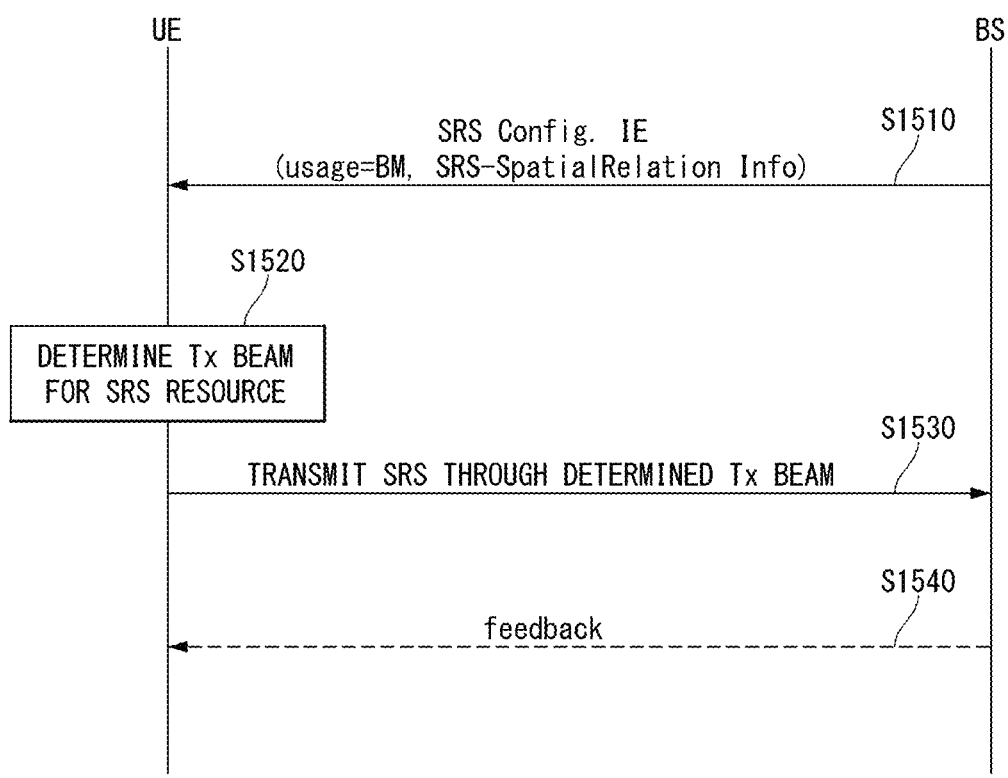
FIG. 17 is a flowchart showing an example of an uplink beam management procedure using the SRS.

FIG. 17 is a flowchart showing an example of an uplink beam management procedure using the SRS.

The UE receives, from the BS, RRC signaling (e.g., SRS-Config IE) including a (higher layer parameter) usage parameter configured as 'beam management' (S1510).

Table 9 shows an example of SRS-Config Information Element (IE) and SRS-Config IE is used for an SRS transmission configuration. SRS-Config IE includes a list of SRS-Resources and a list of SRS-ResourceSets. Each SRS resource set means a set of SRS-resources.

The network may trigger transmission of the SRS resource set by using configured aperiodicSRS-Resource-Trigger (L1 DCI).

TABLE 9

| |
|---|
| -- ASN1START |
| -- TAG-MAC-CELL-GROUP-CONFIG-START |
| SRS-Config ::=                                                                      SEQUENCE |
| { |
|     srs-ResourceSetToReleaseList                                                    SEQUENCE |
| (SIZE(1..maxNrofSRS-ResourceSets)) OF SRS-ResourceSetId |
|         OPTIONAL, -- Need N |
|     srs-ResourceSetToAddModList                                                     SEQUENCE |
| (SIZE(1..maxNrofSRS-ResourceSets)) OF SRS-ResourceSet |
|         OPTIONAL, -- Need N |
|     srs-ResourceToReleaseList                                                       SEQUENCE |
| (SIZE(1..maxNrofSRS-Resources)) OF SRS-ResourceId |
|         OPTIONAL, -- Need N |
|     srs-ResourceToAddModList                                                        SEQUENCE |
| (SIZE(1..maxNrofSRS-Resources)) OF SRS-Resource |
|         OPTIONAL, -- Need N |
|     tpc-Accumulation |
|         ENUMERATED {disabled } |
|                                                                                     OPTIONAL, -- Need S |
|     ... |
| } |
| SRS-ResourceSet ::=                                                                 SEQUENCE { |
|     srs-ResourceSetId                                                               SRS-ResourceSetId, |
|     srs-ResourceIdList                                                              SEQUENCE |
| (SIZE(1..maxNrofSRS-ResourcesPerSet)) OF SRS-ResourceId                              OPTIONAL, |
|         -- Cond Setup |
|     resourceType                                                                    CHOICE { |
|         aperiodic |
|         SEQUENCE { |
|             aperiodicSRS-ResourceTrigger                                            INTEGER |
| (1..maxNrofSRS-TriggerStates-1), |
|             csi-RS |
|             NZP-CSI-RS-ResourceId |
|                                                                                     OPTIONAL, -- Cond NonCodebook |
|             slotOffset |
|             INTEGER (1..32) |
|                                                                                     OPTIONAL, -- Need S |
|         ... |
|         }, |
|         semi-persistent |

TABLE 9-continued

```
SEQUENCE {
    associatedCSI-RS
NZP-CSI-RS -ResourceId
                                        OPTIONAL, -- Cond NonCodebook
    ...
    },
    periodic
SEQUENCE {
    associatedCSI-RS
NZP-CSI-RS -ResourceId
                                        OPTIONAL, -- Cond NonCodebook
    ...
    }
},
usage
ENUMERATED {beamManagement, codebook, nonCodebook,
antennaSwitching},
alpha
Alpha
                                                              OPTIONAL, -- Need
S
p0
INTEGER (-202..24)
                                                              OPTIONAL, -- Cond Setup
pathlossReferenceRS                                           CHOICE {
    ssb-Index
SSB-Index,
    csi-RS-Index
NZP-CSI-RS-ResourceId
SRS-SpatialRelationInfo ::=                                   SEQUENCE {
    servingCellId                                             ServCellIndex
                                                                  OPTIONAL,
-- Need S
    referenceSignal                                           CHOICE {
        ssb-Index
SSB-Index,
        csi-RS-Index                                          NZP-CSI-
RS-ResourceId,
        srs
    SEQUENCE {
        resourceId
SRS-ResourceId,
        uplinkBWP
BWP-Id
    }
    }
}
SRS-ResourceId ::=                                            INTEGER
(0..maxNrofSRS-Resources-1)
```

In Table 9, usage represents a higher layer parameter indicating whether the SRS resource set is used for the beam management or whether the SRS resource set is used for codebook based or non-codebook based transmission. The usage parameter corresponds to L1 parameter 'SRS-SetUse'. 'spatialRelationInfo' is a parameter representing a configuration of a spatial relation between a reference RS and a target SRS. Here, the reference RS may become SSB, CSI-RS, or SRS corresponding to L1 parameter 'SRS-SpatialRelationInfo'. The usage is configured for each SRS resource set.

The UE determines a Tx beam for an SRS resource to be transmitted based on SRS-SpatialRelation Info included in the SRS-Config IE (S1520). Here, SRS-SpatialRelation Info is configured for each SRS resource and represents a beam which is the same as the beam used in the SSB, the CSI-RS, or the SRS is to be applied for each SRS resource. Further, SRS-SpatialRelationInfo may be configured or not configured in each SRS resource.

If SRS-SpatialRelationInfo is configured in the SRS resource, SRS-SpatialRelationInfo is transmitted by applying the beam which is the same as the beam used in the SSB, the CSI-RS, or the SRS. However, if SRS-SpatialRelationInfo is not configured in the SRS resource, the UE arbitrarily determines the Tx beam and transmits the SRS through the determined Tx beam (S1530).

More specifically, for P-SRS in which 'SRS-ResourceConfigType' is configured as 'periodic':

i) When SRS-SpatialRelationInfo is configured as 'SSB/PBCH', the UE transmits the corresponding SRS resource by applying a spatial domain transmission filter which is the same as a spatial domain Rx filter used for receiving the SSB/PBCH (or generated from the corresponding filter); or ii) When SRS-SpatialRelationInfo is configured as 'CSI-RS', the UE transmits the SRS resource by applying the same spatial domain transmission filter used for receiving periodic CSI-RS or SP CSI-RS; or iii) When SRS-SpatialRelationInfo is configured as 'SRS', the UE transmits the SRS resource by applying the same spatial domain transmission filter used for transmitting the periodic CSI-RS.

Even when 'SRS-ResourceConfigType' is configured as 'SP-SRS' or 'AP-SRS', beam determination and transmission operations may be applied similarly thereto.

Additionally, the UE may receive or not receive a feedback for the SRS from the BS like three following cases (S1540).

i) When Spatial_Relation_Info is configured for all SRS resources in the SRS resource set, the UE transmits the SRS with the beam indicated by the BS. For example, when all Spatial_Relation_Info indicates the same SSB, CRI, or SRI, the UE repeatedly transmits the SRS with the same beam. This case as a usage of selecting the Rx beam by the BS corresponds to FIG. 16(a).

ii) Spatial_Relation_Info may not be configured for all SRS resources in the SRS resource set. In this case, the UE may transmit the SRS while arbitrarily changing the SRS beam. In other words, this case as a usage of sweeping the Tx beam by the UE corresponds to FIG. 16(b).

iii) Spatial_Relation_Info may be configured only for some SRS resources in the SRS resource set. In this case, the SRS may be transmitted with the beam configured for the configured SRS resource and the UE may arbitrarily transmit the SRS by applying the Tx beam to an SRS resource in which Spatial_Relation_Info is not configured.

Channel State Information (CSI) Related Procedure

Figure 18:
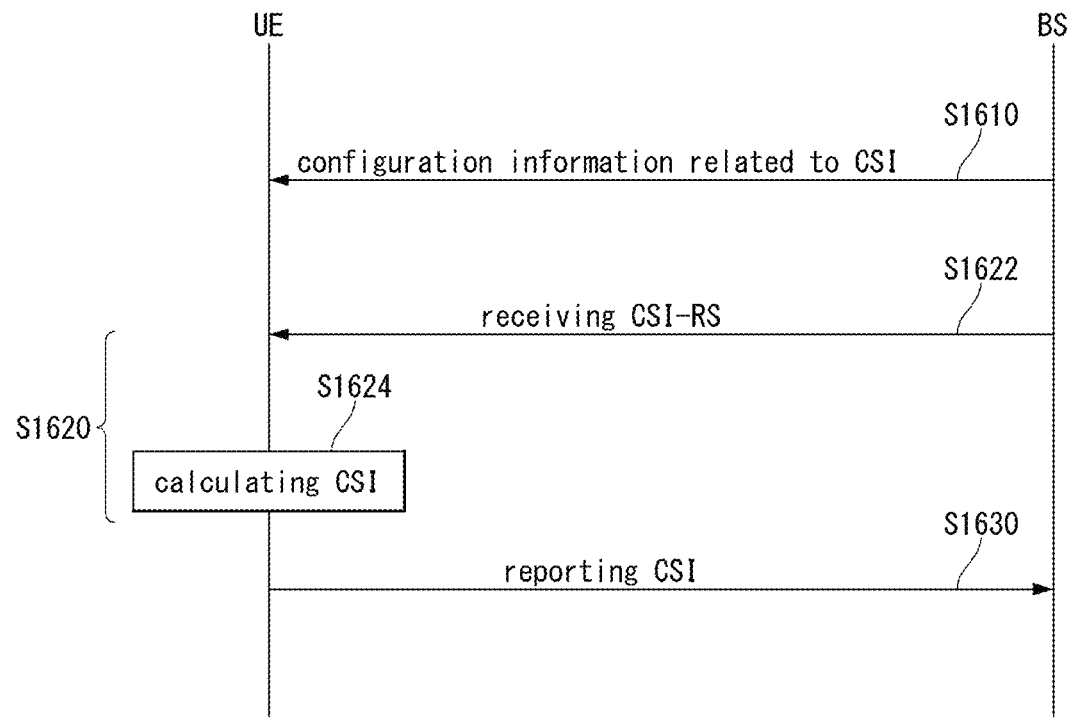
FIG. 18 is a flowchart showing an example of a CSI related procedure to which a method proposed in the present disclosure may be applied.

FIG. 18 is a flowchart showing an example of a CSI related procedure to which a method proposed in the present disclosure may be applied.

In a New Radio (NR) system, a channel state information-reference signal (CSI-RS) is used for time and/or frequency tracking, CSI computation, layer 1 (L1)-reference signal received power (RSRP) computation, and mobility.

The expression of 'A and/or B' used in the present disclosure may be construed as the same meaning as 'including at least one of A and B'.

The CSI computation is related to CSI acquisition and L1-RSRP computation is related to beam management (BM).

Channel state information (CSI) collectively refers to information that may indicate the quality of a radio channel (or referred to as a link) formed between the UE and the antenna port.

In order to perform one of usages of the CSI-RS, a terminal (e.g., user equipment (UE)) receives, from a base station (e.g., general Node B or gNB), configuration information related to the CSI through radio resource control (RRC) signaling (S1610).

The configuration information related to the CSI may include at least one of CSI-interference management (IM) resource related information, CSI measurement configuration related information, CSI resource configuration related information, CSI-RS resource related information, or CSI report configuration related information.

The CSI-IM resource related information may include CSI-IM resource information, CSI-IM resource set information, and the like.

The CSI-IM resource set is identified by a CSI-IM resource set identifier (ID) and one resource set includes at least one CSI-IM resource.

Each CSI-IM resource is identified by a CSI-IM resource ID.

The CSI resource configuration related information defines a group including at least one of a non zero power (NZP) CSI-RS resource set, a CSI-IM resource set, or a CSI-SSB resource set.

In other words, the CSI resource configuration related information may include a CSI-RS resource set list and the CSI-RS resource set list may include at least one of a NZP CSI-RS resource set list, a CSI-IM resource set list, or a CSI-SSB resource set list.

The CSI resource configuration related information may be expressed as CSI-ResourceConfig IE.

The CSI-RS resource set is identified by a CSI-RS resource set ID and one resource set includes at least one CSI-RS resource.

Each CSI-RS resource is identified by a CSI-RS resource ID.

As shown in Table 10, parameters (e.g., a BM related 'repetition' parameter and a tracking related 'trs-Info' parameter) representing the usage may be configured for each NZP CSI-RS resource set.

Table 10 shows an example of NZP CSI-RS resource set IE.

TABLE 10

| -- ASN1START | |
|---|---|
| -- TAG-NZP-CSI-RS-RESOURCESET-START | |
| NZP-CSI-RS-ResourceSet ::= | SEQUENCE { |
| nzp-CSI-ResourceSetId | NZP-CSI-RS-ResourceSetId, |
| nzp-CSI-RS-Resources | SEQUENCE (SIZE |
| (1..maxNrofNZP-CSI-RS-ResourcesPerSet)) OF NZP-CSI-RS-ResourceId, | |
| repetition | |
| ENUMERATED { on, off } | |
| | OPTIONAL, |
| aperiodicTriggeringOffset | INTEGER(0..4) |
| | OPTIONAL, -- Need S |
| trs-Info | ENUMERATED |
| {true} | |
| | OPTIONAL, -- Need R |
| ... | |
| } | |
| -- TAG-NZP-CSI-RS-RESOURCESET-STOP | |
| -- ASN1STOP | |

In Table 10, repetition parameter as a parameter representing whether the same beam is repeatedly transmitted indicates whether the repetition is 'ON' or 'OFF' for each NZP CSI-RS resource set.

The Tx beam used in the present disclosure may be construed as the same meaning as the spatial domain transmission filter and the Rx beam may be construed as the same meaning as the spatial domain reception filter.

For example, when the repetition parameter of Table 10 is configured to 'OFF', the UE does not assume that the NZP CSI-RS resource(s) in the resource set are transmitted with the same spatial domain transmission filter and the same Nrofports in all symbols.

In addition, the repetition parameter corresponding to the higher layer parameter corresponds to 'CSI-RS-ResourceRep' of L1 parameter.

The CSI report configuration related information includes a reportConfigType parameter representing a time domain behavior and a reportQuantity parameter representing a CSI related quantity for reporting.

The time domain behavior may be periodic, aperiodic, or semi-persistent.

In addition, the CSI report configuration related information may be expressed as CSI-ReportConfig IE and Table 11 below shows an example of CSI-ReportConfig IE.

TABLE 11

```
-- ASN1START
-- TAG-CSI-RESOURCECONFIG-START
CSI-ReportConfig :: =                                    SEQUENCE {
    reportConfigId                                       CSI-
ReportConfigId,
    carrier
    ServCellIndex                                        OPTIONAL, -- Need S
    resourcesForChannelMeasurement                       CSI-
ResourceConfigId,
    csi-IM-ResourcesForInterference                      CSI-ResourceConfigId
    OPTIONAL, -- Need R
    nzp-CSI-RS-ResourcesForInterference                  CSI-ResourceConfigId
    OPTIONAL, -- Need R
    reportConfigType                                     CHOICE {
        periodic
        SEQUENCE {
            reportSlotConfig
         CSI-ReportPeriodicityAndOffset,
             pucch-CSI-ResourceList
        SEQUENCE (SIZE (1..maxNrofBWPs)) OF PUCCH-CSI-Resource
        },
        semiPersistentOnPUCCH
        SEQUENCE {
            reportSlotConfig
         CSI-ReportPeriodicityAndOffset,
             pucch-CSI-ResourceList
        SEQUENCE (SIZE (1..maxNrofBWPs)) OF PUCCH-CSI-Resource
        },
        semiPersistentOnPUSCH
        SEQUENCE {
            reportSlotConfig
        ENUMERATED {sl5, sl10, sl20, sl40, sl80, sl160, sl320 },
            reportSlotOffsetList                         SEQUENCE
    (SIZE (1.. maxNrofUL-Allocations)) OF INTEGER(0..32),
            p0alpha
          P0-PUSCH-AlphaSetId
        },
        aperiodic
        SEQUENCE {
    reportSlotOffsetList                                 SEQUENCE
    (SIZE (1..maxNrofUL-Allocations)) OF INTEGER(0..32)
        }
    },
    reportQuantity                                       CHOICE {
        none
    NULL,
        cri-RI-PMI-CQI
    NULL,
        cri-RI-i1
    NULL,
        cri-RI-i1-CQI
    SEQUENCE {
        pdsch-BundleSizeForCSI
    ENUMERATED {n2, n4 }                                 OPTIONAL
    },
        cri-RI-CQI
    NULL,
        cri-RSRP
    NULL,
```

TABLE 11-continued

```
    ssb-Index-RSRP
NULL,
    cri-RI-LI-PMI-CQI
NULL
},
```

In addition, the UE measures CSI based on configuration information related to the CSI (S1620).

The CSI measurement may include (1) a CSI-RS reception process (S1622) and (2) a process of computing the CSI through the received CSI-RS (S1624).

A sequence for the CSI-RS is generated by Equation 6 below and an initialization value of pseudo-random sequence C(i) is defined by Equation 6.

$$r(m) = \frac{1}{\sqrt{2}}(1 - 2 \cdot c(2m)) + j\frac{1}{\sqrt{2}}(1 - 2 \cdot c(2m+1))$$ [Equation 6]

$$c_{init} = (2^{10}(N_{symb}^{slot}n_{s,f}^{\mu} + l + 1)(2n_{ID} + 1) + n_{ID}) \bmod 2^{31}$$ [Equation 7]

In Equations 6 and 7, $n_{s,f}^{\mu}$ represents a slot number in a radio frame and pseudo-random sequence generator is initialized to $C_{int}$ at a start of each OFDM symbol which is $n_{s,f}^{\mu}$.

In addition, l represents an OFDM symbol number in the slot and $n_{ID}$ is the same as higher-layer parameter scramblingID.

In addition, for the CSI-RS, resource element (RE) mapping is configured time and frequency domains by higher layer parameter CSI-RS-ResourceMapping.

Table 12 shows an example of CSI-RS-ResourceMapping IE.

TABLE 12

```
-- ASN1START
-- TAG-CSI-RS-RESOURCEMAPPING-START
CSI-RS-ResourceMapping ::=                SEQUENCE {
    frequencyDomainAllocation             CHOICE {
        row1                              BIT
STRING (SIZE (4)),
        row2                              BIT
STRING (SIZE (12)),
        row4                              BIT
STRING (SIZE (3)),
        other                             BIT
STRING (SIZE (6))
    },
    nrofPorts
    ENUMERATED {p1,p2,p4,p8,p12,p16,p24,p32},
    firstOFDMSymbolInTimeDomain           INTEGER (0..13),
    firstOFDMSymbo1InTimeDomain2          INTEGER (2..12)
                                          OPTIONAL, -- Need R
    cdm-Type
    ENUMERATED {noCDM, fd-CDM2, cdm4-FD2-TD2, cdm8-FD2-TD4},
    density                               CHOICE {
        dot5
    ENUMERATED {evenPRBs, oddPRBs},
        one
NULL,
        three
NULL,
        spare
NULL
    },
    freqBand                              CSI-
FrequencyOccupation,
    ...
}
```

In Table 12, a density (D) represents a density of the CSI-RS resource measured in RE/port/physical resource block (PRB) and nrofPorts represents the number of antenna ports.

Further, the UE reports the measured CSI to the BS (S12030).

Here, when a quantity of CSI-ReportConfig of Table 12 is configured to 'none (or No report)', the UE may skip the report.

However, even when the quantity is configured to 'none (or No report)', the UE may report the measured CSI to the BS.

The case where the quantity is configured to 'none (or No report)' is a case of triggering aperiodic TRS or a case where repetition is configured.

Here, only in a case where the repetition is configured to 'ON', the UE may be defined to skip the report.

In summary, in the case where the repetition is configured to 'ON' and 'OFF', 'No report', 'SSB Resource Indicator (SSBRI) and L1-RSRP', and 'CSI-RS Resource Indicator (CRI) and L1-RSRP' may be all available as the CSI report.

Alternatively, in the case where the repetition is 'OFF', CSI report of 'SSBRI and L1-RSRP' or 'CRI and L1-RSRP' may be defined to be transmitted and in the case where the repetition is 'ON', 'No report', 'SSBRI and L1-RSRP', or 'CRI and L1-RSRP' may be defined to be transmitted.

CSI Measurement and Reporting Procedure

The NR system supports more flexible and dynamic CSI measurement and reporting.

The CSI measurement may include a procedure of acquiring the CSI by receiving the CSI-RS and computing the received CSI-RS.

As time domain behaviors of the CSI measurement and reporting, aperiodic/semi-persistent/periodic channel measurement (CM) and interference measurement (IM) are supported.

A 4 port NZP CSI-RS RE pattern is used for configuring the CSI-IM.

CSI-IM based IMR of the NR has a similar design to the CSI-IM of the LTE and is configured independently of ZP CSI-RS resources for PDSCH rate matching.

In addition, in ZP CSI-RS based IMR, each port emulates an interference layer having (a preferable channel and) precoded NZP CSI-RS.

This is for intra-cell interference measurement with respect to a multi-user case and primarily targets MU interference.

The BS transmits the precoded NZP CSI-RS to the UE on each port of the configured NZP CSI-RS based IMR.

The UE assumes a channel/interference layer for each port and measures interference.

In respect to the channel, when there is no PMI and RI feedback, multiple resources are configured in a set and the base station or the network indicates a subset of NZP CSI-RS resources through the DCI with respect to channel/interference measurement.

Resource setting and resource setting configuration will be described in more detail.

Resource Setting

Each CSI resource setting 'CSI-ResourceConfig' includes a configuration for S≥1 CSI resource set (given by higher layer parameter csi-RS-ResourceSetList).

Here, the CSI resource setting corresponds to the CSI-RS-resourcesetlist.

Here, S represents the number of configured CSI-RS resource sets.

Here, the configuration for S≥1 CSI resource set includes each CSI resource set including CSI-RS resources (constituted by NZP CSI-RS or CSI IM) and an SS/PBCH block (SSB) resource used for L1-RSRP computation.

Each CSI resource setting is positioned in a DL bandwidth part (BWP) identified by a higher layer parameter bwp-id.

In addition, all CSI resource settings linked to CSI reporting setting have the same DL BWP.

A time domain behavior of the CSI-RS resource within the CSI resource setting included in CSI-ResourceConfig IE is indicated by higher layer parameter resourceType and may be configured to be aperiodic, periodic, or semi-persistent.

The number S of configured CSI-RS resource sets is limited to '1' with respect to periodic and semi-persistent CSI resource settings.

Periodicity and slot offset which are configured are given in numerology of associated DL BWP as given by bwp-id with respect to the periodic and semi-persistent CSI resource settings.

When the UE is configured as multiple CSI-ResourceConfigs including the same NZP CSI-RS resource ID, the same time domain behavior is configured with respect to CSI-ResourceConfig.

When the UE is configured as multiple CSI-ResourceConfigs including the same CSI-IM resource ID, the same time domain behavior is configured with respect to CSI-ResourceConfig.

Next, one or more CSI resource settings for channel measurement (CM) and interference measurement (IM) are configured through higher layer signaling.

CSI-IM resource for interference measurement.

NZP CSI-RS resource for interference measurement.

NZP CSI-RS resource for channel measurement.

That is, channel measurement resource (CMR) may be NZP CSI-RS and interference measurement resource (IMR) may be NZP CSI-RS for CSI-IM and IM.

Here, CSI-IM (or ZP CSI-RS for IM) is primarily used for inter-cell interference measurement.

In addition, NZP CSI-RS for IM is primarily used for intra-cell interference measurement from multi-users.

The UE may assume CSI-RS resource(s) for channel measurement and CSI-IM/NZP CSI-RS resource(s) for interference measurement configured for one CSI reporting are 'QCL-TypeD' for each resource.

Resource Setting Configuration

As described, the resource setting may mean a resource set list.

In each trigger state configured by using higher layer parameter CSI-AperiodicTriggerState with respect to aperiodic CSI, each CSI-ReportConfig is associated with one or multiple CSI-ReportConfigs linked to the periodic, semi-persistent, or aperiodic resource setting.

One reporting setting may be connected with a maximum of three resource settings.

When one resource setting is configured, the resource setting (given by higher layer parameter resourcesForChannelMeasurement) is used for channel measurement for L1-RSRP computation.

When two resource settings are configured, a first resource setting (given by higher layer parameter resourcesForChannelMeasurement) is used for channel measurement and a second resource setting (given by csi-IM-ResourcesForInterference or nzp-CSI-RS-ResourcesForInterference) is used for interference measurement performed on CSI-IM or NZP CSI-RS.

When three resource settings are configured, a first resource setting (given by resourcesForChannelMeasurement) is for channel measurement, a second resource setting (given by csi-IM-ResourcesForInterference) is for CSI-IM based interference measurement, and a third resource setting (given by nzp-CSI-RS-ResourcesForInterference) is for NZP CSI-RS based interference measurement.

Each CSI-ReportConfig is linked to periodic or semi-persistent resource setting with respect to semi-persistent or periodic CSI.

When one resource setting (given by resourcesForChannelMeasurement) is configured, the resource setting is for channel measurement for L1-RSRP computation.

When two resource settings are configured, a first resource setting (given by resourcesForChannelMeasurement) is used for channel measurement and a second resource setting (given by higher layer parameter csi-IM-ResourcesForInterference) is used for interference measurement performed on CSI-IM.

CSI measurement related CSI computation will be described.

When interference measurement is performed on CSI-IM, each CSI-RS resource for channel measurement is associated with the CSI-IM resource for each resource by an order of CSI-RS resources and CSI-IM resources within a corresponding resource set.

The number of CSI-RS resources for channel measurement is equal to the number of CSI-IM resources.

In addition, when the interference measurement is performed in the NZP CSI-RS, the UE does not expect to be configured as one or more NZP CSI-RS resources in the associated resource set within the resource setting for channel measurement.

A UE in which Higher layer parameter nzp-CSI-RS-ResourcesForInterference is configured does not expect that 18 or more NZP CSI-RS ports will be configured in the NZP CSI-RS resource set.

For CSI measurement, the UE assumes the followings.
Each NZP CSI-RS port configured for interference measurement corresponds to an interference transport layer.
In all interference transport layers of the NZP CSI-RS port for interference measurement, an energy per resource element (EPRE) ratio is considered.
Different interference signals on RE(s) of the NZP CSI-RS resource for channel measurement, the NZP CSI-RS resource for interference measurement, or CSI-IM resource for interference measurement.

A CSI reporting procedure will be described in more detail.

For CSI reporting, time and frequency resources which may be used by the UE are controlled by the BS.

The channel state information (CSI) may include at least one of a channel quality indicator (CQI), a precoding matrix indicator (PMI), a CSI-RS resource indicator (CRI), an SS/PBCH block resource indicator (SSBRI), a layer indicator (LI), a rank indicator (RI), and L1-RSRP.

For the CQI, PMI, CRI, SSBRI, LI, RI, and L1-RSRP, the UE is configured by a higher layer as N≥1 CSI-ReportConfig reporting setting, M≥1 CSI-ResourceConfig resource setting, and a list (provided by aperiodicTriggerStateList and semiPersistentOnPUSCH) of one or two trigger states.

In the aperiodicTriggerStateList, each trigger state includes the channel and an associated CSI-ReportConfigs list optionally indicating resource set IDs for interference.

In the semiPersistentOnPUSCH-TriggerStateList, each trigger state includes one associated CSI-ReportConfig.

In addition, the time domain behavior of CSI reporting supports periodic, semi-persistent, and aperiodic.

Hereinafter, each of periodic, semi-persistent (SP), and aperiodic CSI reporting will be described.

The periodic CSI reporting is performed on short PUCCH and long PUCCH.

The periodicity and slot offset of the periodic CSI reporting may be configured as RRC and refer to the CSI-ReportConfig IE.

Next, SP CSI reporting is performed on short PUCCH, long PUCCH, or PUSCH.

In the case of SP CSI on the short/long PUCCH, the periodicity and the slot offset are configured as the RRC and the CSI reporting to separate MAC CE is activated/deactivated.

In the case of the SP CSI on the PUSCH, the periodicity of the SP CSI reporting is configured through the RRC, but the slot offset is not configured through the RRC and the SP CSI reporting is activated/deactivated by DCI (format 0_1).

An initial CSI reporting timing follows a PUSCH time domain allocation value indicated in the DCI and a subsequent CSI reporting timing follows a periodicity configured through the RRC.

Separated RNTI (SP-CSI C-RNTI) is used with respect to the SP CSI reporting on the PUSCH.

DCI format 0_1 may include a CSI request field and may activate/deactivate a specific configured SP-CSI trigger state.

In addition, the SP CSI reporting has the same or similar activation/deactivation as a mechanism having data transmission on SPS PUSCH.

Next, the aperiodic CSI reporting is performed on the PUSCH and is triggered by the DCI.

In the case of AP CSI having AP CSI-RS, an AP CSI-RS timing is configured by the RRC.

Here, a timing for the AP CSI reporting is dynamically controlled by the DCI.

The NR does not adopt a scheme (for example, transmitting RI, WB PMI/CQI, and
SB PMI/CQI in order) of dividing and reporting the CSI in multiple reporting instances applied to PUCCH based CSI reporting in the LTE.

Instead, the NR restricts specific CSI reporting not to be configured in the short/long PUCCH and a CSI omission rule is defined.

In addition, in relation with the AP CSI reporting timing, a PUSCH symbol/slot location is dynamically indicated by the DCI. In addition, candidate slot offsets are configured by the RRC.

For the CSI reporting, slot offset(Y) is configured for each reporting setting.

For UL-SCH, slot offset K2 is configured separately.

Two CSI latency classes (low latency class and high latency class) are defined in terms of CSI computation complexity.

The low latency CSI is a WB CSI that includes up to 4 ports Type-I codebook or up to 4-ports non-PMI feedback CSI.

The high latency CSI refers to CSI other than the low latency CSI.

For a normal UE, (Z, Z') is defined in a unit of OFDM symbols.

Z represents a minimum CSI processing time from the reception of the aperiodic CSI triggering DCI to the execution of the CSI reporting.

Z' represents a minimum CSI processing time from the reception of the CSI-RS for channel/interference to the execution of the CSI reporting.

Additionally, the UE reports the number of CSIs which may be simultaneously calculated.

Hereinafter, Table 13 shows a CSI reporting configuration defined in TS38.214.

TABLE 13

5.2.1.4 Reporting configurations
The UE shall calculate CSI parameters (if reported) assuming the following dependencies between CSI parameters (if reported)
LI shall be calculated conditioned on the reported CQI, PMI, RI and CRI
CQI shall be calculated conditioned on the reported PMI, RI and CRI
PMI shall be calculated conditioned on the reported RI and CRI
RI shall be calculated conditioned on the reported CRI.
The Reporting configuration for CSI can be aperiodic (using PUSCH), periodic (using PUCCH) or semi-persistent (using PUCCH, and DCI activated PUSCH). The CSI-RS Resources can be periodic, semi-persistent, or aperiodic. Table 5.2.1.4-1 shows the supported combinations of CSI Reporting configurations and CSI-RS Resource configurations and how the CSI Reporting is triggered for each CSI-RS Resource configuration. Periodic CSI-RS is configured by higher layers. Semi-persistent CSI-RS is activated and deactivated as described in Subclause 5.2.1.5.2. Aperiodic CSI-RS is configured and triggered/activated as described in Subclause 5.2.1.5.1.
Table 5.2.1.4-1: Triggering/Activation of CSI Reporting for the possible CSI-RS Configurations.

| CSI-RS Configuration | Periodic CSI Reporting | Semi-Persistent CSI Reporting | Aperiodic CSI Reporting |
|---|---|---|---|
| Periodic CSI-RS | No dynamict riggering/activation | For reporting on PUCCH, the UE receives an activation command [10, TS 38.321]; for reporting on PUSCH, the UE receives triggering on DCI | Triggered by DCI; additionally, activation command [10, TS 38.321] possible as defined in Subclause 5.2.1.5.1. |
| Semi-Persistent CSI-RS | Not Supported | For reporting on PUCCH, the UE receives an activation command [10, TS 38.321]; for reporting on PUSCH, the UE receives triggering on DCI | Triggered by DCI; additionally, activation command [10, TS 38.321] possible as defined in Subclause 5.2.1.5.1. |
| Aperiodic CSI-RS | Not Supported | Not Supported | Triggered by DCI; additionally, activation command [10, TS 38.321] possible as defined in Subclause 5.2.1.5.1. |

Further, Table 14 below shows information related to activation/deactivation/trigger by MAC-CE related to Semi-Persistent/Aperiodic CSI reporting defined in TS38.321.

TABLE 14

5.18.2 Activation/Deactivation of Semi-persistent CSI-RS/CSI-IM resource set
The network may activate and deactivate the configured Semi-persistent CSI-RS/CSI-IM resource sets of a Serving Cell by sending the SP CSI-RS/CSI-IM Resource Set Activation/Deactivation MAC CE described in subclause 6.1.3.12. The configured Semi-persistent CSI-RS/CSI-IM resource sets are initially deactivated upon configuration and after a handover.
The MAC entity shall:
if the MAC entity receives an SP CSI-RS/CSI-IM Resource SetActivation/Deactivation MAC CE on a Serving Cell:
2> indicate to lower layers the information regarding the SP CSI-RS/CSI-IM Resource Set Activation/Deactivation MAC CE.
5.18.3 Aperiodic CSI Trigger State subselection
The network may select among the configured aperiodic CSI trigger states of a Serving Cell by sending the Aperiodic CSI Trigger State Subselection MAC CE described in subclause 6.1.3.13.

TABLE 14-continued

The MAC entity shall:
if the MAC entity receives an Aperiodic CSI trigger State Subselection MAC CE on a Serving Cell:
2> indicate to lower layers the information regarding Aperiodic CSI trigger State Subselection MAC CE.

Downlink Transmission/Reception Operation

Figure 19:
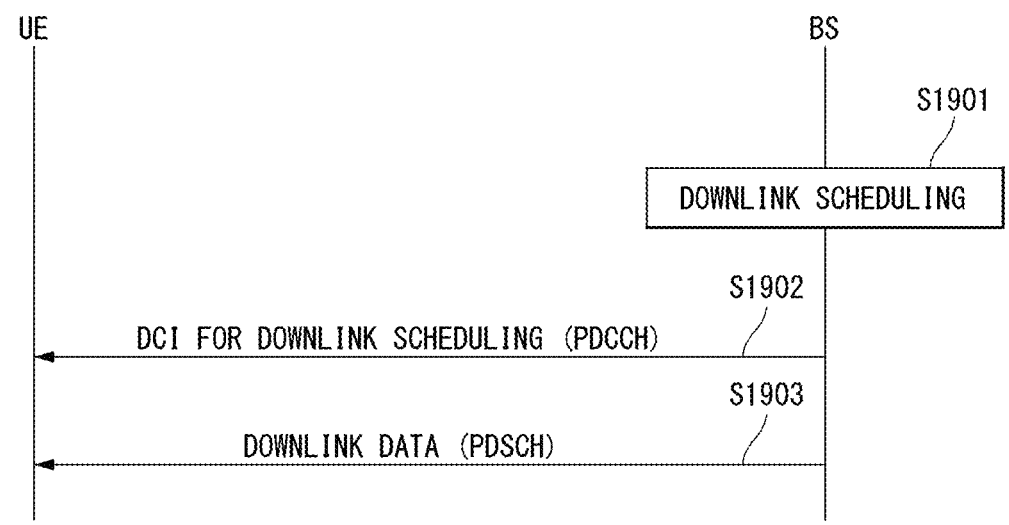
FIG. 19 is a diagram illustrating an example of a downlink transmission/reception operation between a BS and a UE.

FIG. 19 is a diagram illustrating an example of a downlink transmission/reception operation between a BS and a UE.

The BS schedules downlink transmission such as a frequency/time resource, a transport layer, a downlink precoder, MCS, etc., (S1901). In particular, the BS may determine a beam for PDSCH transmission to the UE through the above-described operations.

The UE receives Downlink Control Information (DCI) for downlink scheduling (i.e., including scheduling information of the PDSCH) on the PDCCH (S1902).

DCI format 1_0 or 1_1 may be used for the downlink scheduling and in particular, DCI format 1_1 includes the following information:

Identifier for DCI formats, Bandwidth part indicator, Frequency domain resource assignment, Time domain resource assignment, PRB bundling size indicator, Rate matching indicator, ZP CSI-RS trigger, Antenna port(s), Transmission configuration indication (TCI), SRS request, and Demodulation Reference Signal (DMRS) sequence initialization.

In particular, according to each state indicated in an antenna port(s) field, the number of DMRS ports may be scheduled and Single-user (SU)/Multi-user (MU) transmission scheduling is also available.

Further, a TCI field is configured by 3 bits and a maximum of 8 TCI states are indicated according to a TCI field value to dynamically the QCL for the DMRS.

The UE receives downlink data from the BS on the PDSCH (S1903).

When the UE detects a PDCCH including DCI format 1_0 or 1_1, the UE decodes the PDSCH according to the indication by the corresponding DCI.

Here, when the UE receives a PDSCH scheduled by DCI format 1, a DMRS configuration type may be configured by higher layer parameter 'dmrs-Type' in the UE and the DMRS type is used for receiving the PDSCH. Further, in the UE, the maximum number of front-loaded DMRS symbols for the PDSCH may be configured by higher layer parameter 'maxLength'.

In the case of DMRS configuration type 1, when a single codeword is scheduled and an antenna port mapped to an index of {2, 9, 10, 11, or 30} is designated in the UE or when two codewords are scheduled in the UE, the UE assumes that all remaining orthogonal antenna ports are not associated with PDSCH transmission to another UE.

Alternatively, in the case of DMRS configuration type 2, when a single codeword is scheduled and an antenna port mapped to an index of {2, 10, or 23} is designated in the UE or when two codewords are scheduled in the UE, the UE assumes that all remaining orthogonal antenna ports are not associated with PDSCH transmission to another UE.

When the UE receives the PDSCH, a precoding granularity P' may be assumed as a consecutive resource block in the frequency domain. Here, P' may correspond to one value of {2, 4, and wideband}.

When P' is determined as wideband, the UE does not predict that the PDSCH is scheduled to non-contiguous PRBs and the UE may assume that the same precoding is applied to the allocated resource.

On the contrary, when P' is determined as any one of {2 and 4}, a Precoding Resource Block Group (PRG) is split into P' consecutive PRBs. The number of actually consecutive PRBs in each PRG may be one or more. The UE may assume that the same precoding is applied to consecutive downlink PRBs in the PRG In order to determine a modulation order in the PDSCH, a target code rate, and a transport block size, the UE first reads a 5-bit MCD field in the DCI and determines the modulation order and the target code rate. In addition, the UE reads a redundancy version field in the DCI and determines a redundancy version. In addition, the UE determines the transport block size by using the number of layers before rate matching and the total number of allocated PRBs.

Uplink transmission/reception operation

Figure 20:
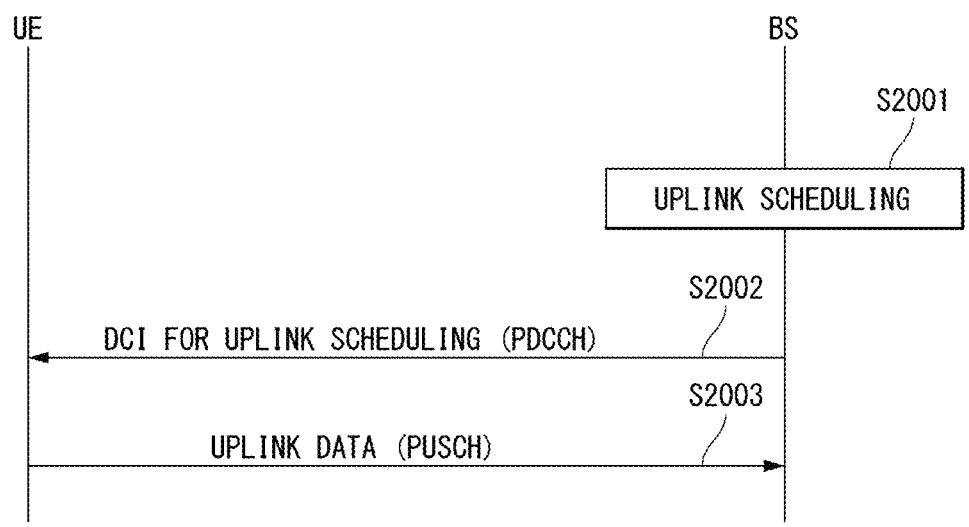
FIG. 20 is a diagram illustrating an example of an uplink transmission/reception operation between a BS and a UE.

FIG. 20 is a diagram illustrating an example of an uplink transmission/reception operation between a BS and a UE.

The BS schedules uplink transmission such as the frequency/time resource, the transport layer, an uplink precoder, the MCS, etc. (S2001). In particular, the BS may determine a beam for PUSCH transmission of the UE through the above-described operations.

The UE receives, from the BS, DCI for downlink scheduling (i.e., including scheduling information of the PUSCH) on the PDCCH (S2002).

DCI format 0_0 or 0_1 may be used for the uplink scheduling and in particular, DCI format 0_1 includes the following information which includes:

Identifier for DCI formats, UL/Supplementary uplink (SUL) indicator, Bandwidth part indicator, Frequency domain resource assignment, Time domain resource assignment, Frequency hopping flag, Modulation and coding scheme (MCS), SRS resource indicator (SRI), Precoding information and number of layers, Antenna port(s), SRS request, DMRS sequence initialization, and Uplink Shared Channel (UL-SCH) indicator In particular, configured SRS resources in an SRS resource set associated with higher layer parameter 'usage' may be indicated by an SRS resource indicator field. Further, 'spatialRelationInfo' may be configured for each SRS resource and a value of 'spatialRelationInfo' may be one of {CRI, SSB, and SRI}.

Two transmission schemes, i.e., codebook based transmission and non-codebook based transmission are supported for PUSCH transmission.

i) When higher layer parameter 'txConfig' is set to 'codebook', the UE is configured to the codebook based transmission. On the contrary, when higher layer parameter 'txConfig' is set to 'nonCodebook', the UE is configured to the non-codebook based transmission. When higher layer parameter 'txConfig' is not configured, the UE does not predict that the PUSCH is scheduled by DCI format 0_1. When the PUSCH is scheduled by DCI format 0_0, the PUSCH transmission is based on a single antenna port.

In the case of the codebook based transmission, the PUSCH may be scheduled by DCI format 0_0 or DCI format 0_1, or semi-statically. When the PUSCH is scheduled by DCI format 0_1, the UE determines a PUSCH transmission precoder based on the SRI, the Transmit Precoding Matrix Indicator (TPMI), and the transmission rank from the DCI as given by the SRS resource indicator field and the Precoding information and number of layers field. The TPMI is used for indicating a precoder to be applied over the antenna port and when multiple SRS resources are configured, the TPMI corresponds to the SRS resource selected by the SRI. Alternatively, when the single SRS resource is configured, the TPMI is used for indicating the precoder to be applied over the antenna port and corresponds to the corresponding single SRS resource. A transmission precoder is selected from an uplink codebook having the same antenna port number as higher layer parameter 'nrofSRS-Ports'. When the UE is configured with the higher layer parameter 'txConfig' set to 'codebook', at least one SRS resource is configured in the UE. An SRI indicated in slot n is associated with most recent transmission of the SRS resource identified by the SRI and here, the SRS resource precedes PDCCH (i.e., slot n) carrying the SRI.

ii) In the case of the non-codebook based transmission, the PUSCH may be scheduled by DCI format 0_0 or DCI format 0_1, or semi-statically. When multiple SRS resources are configured, the UE may determine the PUSCH precoder and the transmission rank based on a wideband SRI and here, the SRI is given by the SRS resource indicator in the DCI or given by higher layer parameter 'srs-ResourceIndicator'. The UE may use one or multiple SRS resources for SRS transmission and here, the number of SRS resources may be configured for simultaneous transmission in the same RB based on the UE capability. Only one SRS port is configured for each SRS resource. Only one SRS resource may be configured to higher layer parameter 'usage' set to 'nonCodebook'. The maximum number of SRS resources which may be configured for non-codebook based uplink transmission is 4. The SRI indicated in slot n is associated with most recent transmission of the SRS resource identified by the SRI and here, the SRS transmission precedes PDCCH (i.e., slot n) carrying the SRI.

The higher layer parameter 'txConfig' may be included in a specific higher layer parameter. The specific higher layer parameter may be 'PUSCH config'. The 'PUSCH config' may be included in PUSCH config information element (IE) and used for configuring specific PUSCH parameters applicable to a BWP specific for the UE. PUSCH config IE may be configured as shown in Table 15 below.

TABLE 15

```
PUSCH-Config information element
-- ASN1START
-- TAG-PUSCH-CONFIG-START
PUSCH-Config ::=                           SEQUENCE {
    dataScramblingIdentityPUSCH                INTEGER (0..1023)
OPTIONAL, -- Need S
    txConfig                                   ENUMERATED {codebook,
nonCodebook}                               OPTIONAL, -- Need S
    dmrs-UplinkForPUSCH-MappingTypeA           SetupRelease { DMRS-
UplinkConfig }                             OPTIONAL, -- Need M
    dmrs-UplinkForPUSCH-MappingTypeB           SetupRelease { DMRS-
UplinkConfig }                             OPTIONAL, -- Need M
    pusch-PowerControl                             PUSCH-PowerControl
OPTIONAL, -- Need M
    frequencyHopping                           ENUMERATED {intraSlot,
interSlot}                                 OPTIONAL, -- Need S
    frequencyHoppingOffsetLists             SEQUENCE (SIZE (1..4)) OF
INTEGER (1.. maxNrofPhysicalResourceBlocks-1)
OPTIONAL, -- Need M
    resourceAllocation                                   ENUMERATED
{ resourceAllocationType0, resourceAllocationType1, dynamicSwitch},
    pusch-TimeDomainAllocationList             SetupRelease { PUSCH-
TimeDomainResourceAllocationList }         OPTIONAL, -- Need M
    pusch-AggregationFactor                    ENUMERATED { n2, n4, n8 }
OPTIONAL, -- Need S
    mcs-Table                                  ENUMERATED {qam256,
qam64LowSE}                                OPTIONAL, -- Need S
    mcs-TableTransformPrecoder                 ENUMERATED {qam256,
qam64LowSE}                                OPTIONAL, -- Need S
    transformPre coder                         ENUMERATED {enabled,
disabled}                                  OPTIONAL, -- Need S
    codebookSubset                                       ENUMERATED
{fullyAndPartialAndNonCoherent, partialAndNonCoherent,nonCoherent}
OPTIONAL, -- Cond codebookBased
    maxRank                                    INTEGER (1..4)
OPTIONAL, -- Cond codebookBased
    rbg-Size                                   ENUMERATED { config2}
OPTIONAL, -- Need S
    uci-OnPUSCH                                    SetupRelease { UCI-
OnPUSCH }                                  OPTIONAL, -- Need M
    tp-pi2BPSK                                 ENUMERATED {enabled }
OPTIONAL, -- Need S
    ...
}
UCI-OnPUSCH ::=                            SEQUENCE {
    betaOffsets                                CHOICE {
        dynamic                                SEQUENCE (SIZE (4)) OF
BetaOffsets,
```

TABLE 15-continued

```
    semiStatic                          BetaOffsets
    }
OPTIONAL, -- Need M
    scaling                             ENUMERATED {f0p5, f0p65,
f0p8, f1 }
}
-- TAG-PUSCH-CONFIG-STOP
-- ASN1STOP
```

Information included in the PUSCH Config field of Table 15 above is shown in Table 16 below.

TABLE 16

PUSCH-Config field descriptions codebookSubset
Subset of PMIs addressed by TPMI, where PMIs are those supported by UEs with maximum coherence capabilities (see TS 38.214 [19], clause 6.1.1.1).
dataScramblingIdentityPUSCH
Identifier used to initalite data scrambling (c_init) for PUSCH. If the field is absent, the UE applies the physical cell ID. (see TS 38.211 [16], clause 6.3.1.1).
dmrs-UplinkForPUSCH-MappingTypeA
DMRS configuration for PUSCH transmissions using PUSCH mapping type A (chosen dynamically via PUSCH-TimeDomainResourceAllocation). Only the fields dmrs-Type, dmrs-AdditionalPosition and maxLength may be set differently for mapping type A and B.
dmrs-UplinkForPUSCH-MappingTypeB
DMRS configuration for PUSCH transmissions using PUSCH mapping type B (chosen dynamically via PUSCH-TimeDomainResourceAllocation). Only the fields dmrs-Type, dmrs-AdditionalPosition and maxLength may be set differently for mapping type A and B.
frequencyHopping
The value intraSlot enables 'Intra-slot frequency hopping' and the value interSlot enables 'Inter-slot frequency hopping'. If the field is absent, frequency hopping is not configured (see TS 38.214 [19], clause 6.3).
frequencyHoppingOffsetLists
Set of frequency hopping offsets used when frequency hopping is enabled for granted transmission (not msg3) and type 2 (see TS 38.214 [19], clause 6.3).
maxRank
Subset of PMIs addressed by TRIs from 1 to ULmaxRank (see TS 38.214 [19], clause 6.1.1.1).
mcs-Table
Indicates which MCS table the UE shall use for PUSCH without transform precoder (see TS 38.214 [19], clause 6.1.4.1). If the field is absent the UE applies the value 64QAM
mcs-TableTransformPrecoder
Indicates which MCS table the UE shall use for PUSCH with transform precoding (see TS 38.214 [19], clause 6.1.4.1) If the field is absent the UE applies the value 64QAM
pusch-AggregationFactor
Number of repetitions for data (see TS 38.214 [19], clause 6.1.2.1). If the field is absent the UE applies the value 1.
pusch-TimeDomainAllocationList
List of time domain allocations for timing of UL assignment to UL data (see TS 38.214 [19], table 6.1.2.1.1-1).
rbg-Size
Selection between configuration 1 and configuration 2 for RBG size for PUSCH. The UE does not apply this field if resourceAllocation is set to resourceAllocationType1. Otherwise, the UE applies the value config1 when the field is absent (see TS 38.214 [19], clause 6.1.2.2.1).
resourceAllocation
Configuration of resource allocation type 0 and resource allocation type 1 for non-fallback DCI (see TS 38.214 [19], clause 6.1.2).
tp-pi2BPSK
Enables pi/2-BPSK modulation with transform precoding if the field is present and disables it otherwise.
transformPrecoder
The UE specific selection of transformer precoder for PUSCH (see TS 38.214 [19], clause 6.1.3). When the field is absent the UE applies the value of the field msg3-transformPrecoder.

TABLE 16-continued

PUSCH-Config field descriptions txConfig
Whether UE uses codebook based or non-codebook based transmission (see TS 38.214 [19], clause 6.1.1). If the field is absent, the UE transmits PUSCH on one antenna port, see TS 38.214 [19], clause 6.1.1.

Further, information included in the UCI-OnPUSCH field of Table 15 above is shown in Table 17 below.

TABLE 17

UCI-OnPUSCH field descriptions betaOffsets
Selection between and configuration of dynamic and semi-static beta-offset. If the field is not configured, the UE applies the value 'semiStatic' (see TS 38.213 [13], clause 9.3).
scaling
Indicates a scaling factor to limit the number of resource elements assigned to UCI on PUSCH. Value f0p5 corresponds to 0.5, value f0p65 corresponds to 0.65, and so on. The value configured herein is applicable for PUSCH with configured grant (see TS 38.212 [17], clause 6.3).

Further, when txConfig is configured to codebook, the codebookBased field of Table 15 above is requisitively present in PUSCHConfig, otherwise the codebookBased field is not present.

Uplink Transmission Codebook

The codeword may be transformed into a bit sequence scrambled by the scrambler. A scramble sequence used for scrambling may be generated based on an initialization value and the initialization value may include ID information of a wireless device, etc. The scrambled bit sequence may be modulated into a modulated symbol sequence by the modulator. A complex modulated symbol sequence may be mapped to one or more transport layers by the layer mapper. Modulated symbols of each transport layer may be mapped to a corresponding antenna port(s) by the precoder. In this case, mapping the modulated symbols of each transport layer to the antenna port(s) corresponds to precoding.

More specifically, the precoding may be performed by the following equation.

$$\begin{bmatrix} z^{(p_0)}(i) \\ \vdots \\ z^{(p_{\rho-1})}(i) \end{bmatrix} = W \begin{bmatrix} y^{(0)}(i) \\ \vdots \\ y^{(\upsilon-1)}(i) \end{bmatrix} \quad [\text{Equation 8}]$$

In the equation, $i=0, 1, \ldots, M_{symb}^{ap}-1$ and $M_{symb}^{ap}=M_{symb}^{layer}$ may be satisfied and $W$ may be the precoding matrix. The precoding matrix may be expressed even as the precoder.

In non-codebook based transmission, the precoding matrix $W$ may be a unit matrix.

In codebook based transmission, the precoding matrix W may be 1 for single layer transmission (W=1). In other cases, i.e., for transmission of 2 layers or more, the precoding matrix W may be acquired based on Tables 18 to 24 below and downlink control information or a higher layer parameter for scheduling uplink transmission.

Further, when higher layer parameter txConfig is not configured, the precoding matrix W may be 1 (W=1).

Table 18 below shows a codebook for the precoding matrix W for single layer transmission using two antenna ports.

TABLE 18

| TPMI index | W (ordered from left to right in increasing order of TPMI index) |
|---|---|
| 0-5 | $\frac{1}{\sqrt{2}}\begin{bmatrix}1\\0\end{bmatrix}$ $\frac{1}{\sqrt{2}}\begin{bmatrix}0\\1\end{bmatrix}$ $\frac{1}{\sqrt{2}}\begin{bmatrix}1\\1\end{bmatrix}$ $\frac{1}{\sqrt{2}}\begin{bmatrix}1\\-1\end{bmatrix}$ $\frac{1}{\sqrt{2}}\begin{bmatrix}1\\j\end{bmatrix}$ $\frac{1}{\sqrt{2}}\begin{bmatrix}1\\-j\end{bmatrix}$ — — |

A transmit precoding matrix indicator (TPMI) index is indexed according to ascending order from a left side to a right side of the table with respect to the precoding matrices included in the codebook of Table 18.

Table 19 shows a codebook for the precoding matrix W for single layer transmission using four antenna ports. In particular, Table 19 relates to a case where a configuration of a higher layer parameter (transform precoder) is set to 'enabled'.

TABLE 19

| TPMI index | W (ordered from left to right in increasing order of TPMI index) |
|---|---|
| 0-7 | $\frac{1}{2}\begin{bmatrix}1\\0\\0\\0\end{bmatrix}$ $\frac{1}{2}\begin{bmatrix}0\\1\\0\\0\end{bmatrix}$ $\frac{1}{2}\begin{bmatrix}0\\0\\1\\0\end{bmatrix}$ $\frac{1}{2}\begin{bmatrix}0\\0\\0\\1\end{bmatrix}$ $\frac{1}{2}\begin{bmatrix}1\\0\\1\\0\end{bmatrix}$ $\frac{1}{2}\begin{bmatrix}1\\0\\-1\\0\end{bmatrix}$ $\frac{1}{2}\begin{bmatrix}1\\0\\j\\0\end{bmatrix}$ $\frac{1}{2}\begin{bmatrix}1\\0\\-j\\0\end{bmatrix}$ |
| 8-15 | $\frac{1}{2}\begin{bmatrix}0\\1\\0\\1\end{bmatrix}$ $\frac{1}{2}\begin{bmatrix}0\\1\\0\\-1\end{bmatrix}$ $\frac{1}{2}\begin{bmatrix}0\\1\\0\\j\end{bmatrix}$ $\frac{1}{2}\begin{bmatrix}0\\1\\0\\-j\end{bmatrix}$ $\frac{1}{2}\begin{bmatrix}1\\1\\1\\-1\end{bmatrix}$ $\frac{1}{2}\begin{bmatrix}1\\1\\j\\j\end{bmatrix}$ $\frac{1}{2}\begin{bmatrix}1\\1\\-1\\1\end{bmatrix}$ $\frac{1}{2}\begin{bmatrix}1\\1\\-j\\-j\end{bmatrix}$ |
| 16-23 | $\frac{1}{2}\begin{bmatrix}1\\j\\1\\j\end{bmatrix}$ $\frac{1}{2}\begin{bmatrix}1\\j\\j\\1\end{bmatrix}$ $\frac{1}{2}\begin{bmatrix}1\\j\\-1\\-j\end{bmatrix}$ $\frac{1}{2}\begin{bmatrix}1\\j\\-j\\-1\end{bmatrix}$ $\frac{1}{2}\begin{bmatrix}1\\-1\\1\\1\end{bmatrix}$ $\frac{1}{2}\begin{bmatrix}1\\-1\\j\\-j\end{bmatrix}$ $\frac{1}{2}\begin{bmatrix}1\\-1\\-1\\-1\end{bmatrix}$ $\frac{1}{2}\begin{bmatrix}1\\-1\\-j\\j\end{bmatrix}$ |
| 24-27 | $\frac{1}{2}\begin{bmatrix}1\\-j\\1\\-j\end{bmatrix}$ $\frac{1}{2}\begin{bmatrix}1\\-j\\j\\-1\end{bmatrix}$ $\frac{1}{2}\begin{bmatrix}1\\-j\\-1\\j\end{bmatrix}$ $\frac{1}{2}\begin{bmatrix}1\\-j\\-j\\1\end{bmatrix}$ — — — — |

The transmit precoding matrix indicator (TPMI) index is indexed according to ascending order from a left side to a right side of the table with respect to the precoding matrices included in the codebook of Table 19.

Table 20 shows a codebook for the precoding matrix W for single layer transmission using four antenna ports. In particular, Table 20 relates to a case where the configuration of the higher layer parameter (transform precoder) is set to 'disabled'.

TABLE 20

| TPMI index | W (ordered from left to right in increasing order of TPMI index) |
|---|---|
| 0-7 | $\frac{1}{2}\begin{bmatrix}1\\0\\0\\0\end{bmatrix}$ $\frac{1}{2}\begin{bmatrix}0\\1\\0\\0\end{bmatrix}$ $\frac{1}{2}\begin{bmatrix}0\\0\\1\\0\end{bmatrix}$ $\frac{1}{2}\begin{bmatrix}0\\0\\0\\1\end{bmatrix}$ $\frac{1}{2}\begin{bmatrix}1\\0\\1\\0\end{bmatrix}$ $\frac{1}{2}\begin{bmatrix}1\\0\\-1\\0\end{bmatrix}$ $\frac{1}{2}\begin{bmatrix}1\\0\\j\\0\end{bmatrix}$ $\frac{1}{2}\begin{bmatrix}1\\0\\-j\\0\end{bmatrix}$ |
| 8-15 | $\frac{1}{2}\begin{bmatrix}0\\1\\0\\1\end{bmatrix}$ $\frac{1}{2}\begin{bmatrix}0\\1\\0\\-1\end{bmatrix}$ $\frac{1}{2}\begin{bmatrix}0\\1\\0\\j\end{bmatrix}$ $\frac{1}{2}\begin{bmatrix}0\\1\\0\\-j\end{bmatrix}$ $\frac{1}{2}\begin{bmatrix}1\\1\\1\\1\end{bmatrix}$ $\frac{1}{2}\begin{bmatrix}1\\1\\j\\j\end{bmatrix}$ $\frac{1}{2}\begin{bmatrix}1\\1\\-1\\-1\end{bmatrix}$ $\frac{1}{2}\begin{bmatrix}1\\1\\-j\\-j\end{bmatrix}$ |
| 16-23 | $\frac{1}{2}\begin{bmatrix}1\\j\\1\\j\end{bmatrix}$ $\frac{1}{2}\begin{bmatrix}1\\j\\j\\-1\end{bmatrix}$ $\frac{1}{2}\begin{bmatrix}1\\j\\-1\\-j\end{bmatrix}$ $\frac{1}{2}\begin{bmatrix}1\\j\\-j\\1\end{bmatrix}$ $\frac{1}{2}\begin{bmatrix}1\\-1\\1\\-1\end{bmatrix}$ $\frac{1}{2}\begin{bmatrix}1\\-1\\j\\-j\end{bmatrix}$ $\frac{1}{2}\begin{bmatrix}1\\-1\\-1\\1\end{bmatrix}$ $\frac{1}{2}\begin{bmatrix}1\\-1\\-j\\j\end{bmatrix}$ |
| 24-27 | $\frac{1}{2}\begin{bmatrix}1\\-j\\1\\-j\end{bmatrix}$ $\frac{1}{2}\begin{bmatrix}1\\-j\\j\\1\end{bmatrix}$ $\frac{1}{2}\begin{bmatrix}1\\-j\\-1\\j\end{bmatrix}$ $\frac{1}{2}\begin{bmatrix}1\\-j\\-j\\-1\end{bmatrix}$ — — — — |

The transmit precoding matrix indicator (TPMI) index is indexed according to ascending order from a left side to a right side of the table with respect to the precoding matrices included in the codebook of Table 20.

Table 21 shows a codebook for precoding matrix W for rank 2 transmission (or 2 layer transmission) using two antenna ports. In particular, Table 21 relates to a case where the configuration of the higher layer parameter (transform precoder) is set to 'disabled'.

TABLE 21

| TPMI index | W (ordered from left to right in increasing order of TPMI index) |
|---|---|
| 0-2 | $\frac{1}{\sqrt{2}}\begin{bmatrix}1 & 0\\0 & 1\end{bmatrix}$ $\quad$ $\frac{1}{2}\begin{bmatrix}1 & 1\\1 & -1\end{bmatrix}$ $\quad$ $\frac{1}{2}\begin{bmatrix}1 & 1\\j & -j\end{bmatrix}$ |

The transmit precoding matrix indicator (TPMI) index is indexed according to ascending order from a left side to a right side of the table with respect to the precoding matrices included in the codebook of Table 21.

Table 22 shows a codebook for the precoding matrix W for rank 4 transmission (or 2 layer transmission) using four antenna ports. In particular, Table 22 relates to a case where the configuration of the higher layer parameter (transform precoder) is set to 'disabled'.

TABLE 22

| TPMI index | W (ordered from left to right in increasing order of TPMI index) |
|---|---|
| 0-3 | $\frac{1}{2}\begin{bmatrix}1 & 0\\0 & 1\\0 & 0\\0 & 0\end{bmatrix}$ $\quad$ $\frac{1}{2}\begin{bmatrix}1 & 0\\0 & 0\\0 & 1\\0 & 0\end{bmatrix}$ $\quad$ $\frac{1}{2}\begin{bmatrix}1 & 0\\0 & 0\\0 & 0\\0 & 1\end{bmatrix}$ $\quad$ $\frac{1}{2}\begin{bmatrix}0 & 0\\1 & 0\\0 & 1\\0 & 0\end{bmatrix}$ |
| 4-7 | $\frac{1}{2}\begin{bmatrix}0 & 0\\1 & 0\\0 & 0\\0 & 1\end{bmatrix}$ $\quad$ $\frac{1}{2}\begin{bmatrix}0 & 0\\0 & 0\\1 & 0\\0 & 1\end{bmatrix}$ $\quad$ $\frac{1}{2}\begin{bmatrix}1 & 0\\0 & 1\\1 & 0\\0 & -j\end{bmatrix}$ $\quad$ $\frac{1}{2}\begin{bmatrix}1 & 0\\0 & 1\\1 & 0\\0 & j\end{bmatrix}$ |
| 8-11 | $\frac{1}{2}\begin{bmatrix}1 & 0\\0 & 1\\-j & 0\\0 & 1\end{bmatrix}$ $\quad$ $\frac{1}{2}\begin{bmatrix}1 & 0\\0 & 1\\-j & 0\\0 & -1\end{bmatrix}$ $\quad$ $\frac{1}{2}\begin{bmatrix}1 & 0\\0 & 1\\-1 & 0\\0 & -j\end{bmatrix}$ $\quad$ $\frac{1}{2}\begin{bmatrix}1 & 0\\0 & 1\\-1 & 0\\0 & j\end{bmatrix}$ |
| 12-15 | $\frac{1}{2}\begin{bmatrix}1 & 0\\0 & 1\\j & 0\\0 & 1\end{bmatrix}$ $\quad$ $\frac{1}{2}\begin{bmatrix}1 & 0\\0 & 1\\j & 0\\0 & -1\end{bmatrix}$ $\quad$ $\frac{1}{2\sqrt{2}}\begin{bmatrix}1 & 1\\1 & 1\\1 & -1\\1 & -1\end{bmatrix}$ $\quad$ $\frac{1}{2\sqrt{2}}\begin{bmatrix}1 & 1\\1 & 1\\j & -j\\j & -j\end{bmatrix}$ |
| 16-19 | $\frac{1}{2\sqrt{2}}\begin{bmatrix}1 & 1\\j & j\\1 & -1\\j & -j\end{bmatrix}$ $\quad$ $\frac{1}{2\sqrt{2}}\begin{bmatrix}1 & 1\\j & j\\j & -j\\-1 & 1\end{bmatrix}$ $\quad$ $\frac{1}{2\sqrt{2}}\begin{bmatrix}1 & 1\\-1 & -1\\1 & -1\\-1 & 1\end{bmatrix}$ $\quad$ $\frac{1}{2\sqrt{2}}\begin{bmatrix}1 & 1\\-1 & -1\\j & -j\\-j & j\end{bmatrix}$ |
| 20-21 | $\frac{1}{2\sqrt{2}}\begin{bmatrix}1 & 1\\-j & -j\\1 & -1\\-j & j\end{bmatrix}$ $\quad$ $\frac{1}{2\sqrt{2}}\begin{bmatrix}1 & 1\\-j & -j\\j & -j\\1 & -1\end{bmatrix}$ $\quad$ — $\quad$ — |

The transmit precoding matrix indicator (TPMI) index is indexed according to ascending order from a left side to a right side of the table with respect to the precoding matrices included in the codebook of Table 22.

Table 23 shows a codebook for precoding matrix W for rank 3 transmission (or 3 layer transmission) using four antenna ports. In particular, Table 23 relates to a case where the configuration of the higher layer parameter (transform precoder) is set to 'disabled'.

TABLE 23

| TPMI index | W (ordered from left to right in increasing order of TPMI index) | | | |
|---|---|---|---|---|
| 0-3 | $\frac{1}{2}\begin{bmatrix} 1 & 0 & 0 \\ 0 & 1 & 0 \\ 0 & 0 & 1 \\ 0 & 0 & 0 \end{bmatrix}$ | $\frac{1}{2}\begin{bmatrix} 1 & 0 & 0 \\ 0 & 1 & 0 \\ 1 & 0 & 0 \\ 0 & 0 & 1 \end{bmatrix}$ | $\frac{1}{2}\begin{bmatrix} 1 & 0 & 0 \\ 0 & 1 & 0 \\ -1 & 0 & 0 \\ 0 & 0 & 1 \end{bmatrix}$ | $\frac{1}{2\sqrt{3}}\begin{bmatrix} 1 & 1 & 1 \\ 1 & -1 & 1 \\ 1 & 1 & -1 \\ 1 & -1 & -1 \end{bmatrix}$ |
| 4-6 | $\frac{1}{2\sqrt{3}}\begin{bmatrix} 1 & 1 & 1 \\ 1 & -1 & 1 \\ j & j & -j \\ j & -j & -j \end{bmatrix}$ | $\frac{1}{2\sqrt{3}}\begin{bmatrix} 1 & 1 & 1 \\ -1 & 1 & -1 \\ 1 & 1 & -1 \\ -1 & 1 & 1 \end{bmatrix}$ | $\frac{1}{2\sqrt{3}}\begin{bmatrix} 1 & 1 & 1 \\ -1 & 1 & -1 \\ j & j & -j \\ -j & j & j \end{bmatrix}$ | — |

The transmit precoding matrix indicator (TPMI) index is indexed according to ascending order from a left side to a right side of the table with respect to the precoding matrices included in the codebook of Table 23.

Table 24 shows a codebook for precoding matrix W for rank 4 transmission (or 4 layer transmission) using four antenna ports. In particular, Table 24 relates to a case where the configuration of the higher layer parameter (transform precoder) is set to 'disabled'.

TABLE 24

| TPMI index | W (ordered from left to right in increasing order of TPMI index) | | | |
|---|---|---|---|---|
| 0-3 | $\frac{1}{2}\begin{bmatrix} 1 & 0 & 0 & 0 \\ 0 & 1 & 0 & 0 \\ 0 & 0 & 1 & 0 \\ 0 & 0 & 0 & 1 \end{bmatrix}$ | $\frac{1}{2\sqrt{2}}\begin{bmatrix} 1 & 1 & 0 & 0 \\ 0 & 0 & 1 & 1 \\ 1 & -1 & 0 & 0 \\ 0 & 0 & 1 & -1 \end{bmatrix}$ | $\frac{1}{2\sqrt{2}}\begin{bmatrix} 1 & 1 & 0 & 0 \\ 0 & 0 & 1 & 1 \\ j & -j & 0 & 0 \\ 0 & 0 & j & -j \end{bmatrix}$ | $\frac{1}{4}\begin{bmatrix} 1 & 1 & 1 & 1 \\ 1 & -1 & 1 & -1 \\ 1 & 1 & -1 & -1 \\ 1 & -1 & -1 & 1 \end{bmatrix}$ |
| 4 | $\frac{1}{2}\begin{bmatrix} 1 & 1 & 1 & 1 \\ 1 & -1 & 1 & -1 \\ j & j & -j & -j \\ j & -j & -j & j \end{bmatrix}$ | — | — | — |

The transmit precoding matrix indicator (TPMI) index is indexed according to ascending order from a left side to a right side of the table with respect to the precoding matrices included in the codebook of Table 23.

Downlink control information for codebook based uplink transmission

Downlink control information (DCI) of format 0_1 may be used for scheduling a physical uplink shared channel (PUSCH) in one cell. Further, the downlink control information of format 0_1 may be used for codebook based uplink transmission.

DCI format 0_1 having CRC scrambled to C-RNTI, CS-RNTI, SP-CSI-RNTI, or MCS-C-RNTI may include the following information.

Identifier for DCI formats—has a size of 1 bit

The field may be continuously configured to 0 in order to indicate the UL DCI format.

Carrier indicator—has a size of 0 or 3 bits

UL/SUL indicator—has a size of 0 bit or 1 bit

Bandwidth part indicator—has a size of 0, 1 or 2 bits

Frequency domain resource assignment

Time domain resource assignment—has a size of 0, 1, 2, 3, or 4 bits

Frequency hopping flag—has a size of 0 or 1 bit

Modulation and coding scheme—has a size of 5 bits

New data indicator)—has a size of 1 bit

Redundancy version—has a size of 2 bits

HARQ process number—has a size of 4 bits

Command for TPC scheduled PUSCH—has a size of 2 bits

SRS resource indicator

Precoding information and number of layers

The size of the field 'precoding information and number of layers' may be differently configured based on higher layer parameters and the number of antenna ports used for the uplink transmission by the UE. The higher layer parameters may include 'txConfig', 'transform precoder', 'maxRank', and 'codebooksubset'. Here, the 'maxRank' may be used to configure a maximum transmission rank which the UE may use for the uplink transmission. Further, information included in the 'codebooksubset' may be determined based on capability information related to a phase difference maintenance capability between antenna ports of the UE, which the UE reports to the BS, and the BS may transmit the 'codebooksubset' to the UE through a higher layer signaling. The UE may determine a codebook subset for the uplink transmission based on the 'codebooksubset' received from the BS.

Antenna ports—have a size of 2 to 5 bits

Table 25 below shows an example of the bandwidth part indicator included in the DCI format 0_1.

TABLE 25

| Value of BWP indicator field 2 bits | Bandwidth part |
|---|---|
| 00 | Configured BWP with BWP-Id = 1 |
| 01 | Configured BWP with BWP-Id = 2 |
| 10 | Configured BWP with BWP-Id = 3 |
| 11 | Configured BWP with BWP-Id = 4 |

Table 26 below shows an example of a codebook subset configuration for codebook based uplink transmission of the UE. In particular, Table 26 below relates to a case where the UE uses four antenna ports for the uplink transmission, is configured with the higher layer parameter 'maxRank' having a value of 2, 3, or 4 from the BS, and is configured with 'transform precoder' which is the higher layer parameter configured to disabled. In this case, a value of the precoding and number of layers field included in the DCI format 0_1 may be mapped to one of the indexes in Table 26 below based on the value of 'codebookSubset' which is the higher layer parameter configured from the BS by the UE.

TABLE 26

| Bit field mapped to index | codebookSubset = fullyAndPartialAndNonCoherent | Bit field mapped to index | codebookSubset = partialAndNonCoherent | Bit field mapped to index | codebookSubset = nonCoherent |
|---|---|---|---|---|---|
| 0 | 1 layer: TPMI = 0 | 0 | 1 layer: TPMI = 0 | 0 | 1 layer: TPMI = 0 |
| 1 | 1 layer: TPMI = 1 | 1 | 1 layer: TPMI = 1 | 1 | 1 layer: TPMI = 1 |
| ... | ... | ... | ... | ... | ... |
| 3 | 1 layer: TPMI = 3 | 3 | 1 layer: TPMI = 3 | 3 | 1 layer: TPMI = 3 |
| 4 | 2 layers: TPMI = 0 | 4 | 2 layers: TPMI = 0 | 4 | 2 layers: TPMI = 0 |
| ... | ... | ... | ... | ... | ... |
| 9 | 2 layers: TPMI = 5 | 9 | 2 layers: TPMI = 5 | 9 | 2 layers: TPMI = 5 |
| 10 | 3 layers: TPMI = 0 | 10 | 3 layers: TPMI = 0 | 10 | 3 layers: TPMI = 0 |
| 11 | 4 layers: TPMI = 0 | 11 | 4 layers: TPMI = 0 | 11 | 4 layers: TPMI = 0 |
| 12 | 1 layer: TPMI = 4 | 12 | 1 layer: TPMI = 4 | 12-15 | reserved |
| ... | ... | ... | ... | | |
| 19 | 1 layer: TPMI = 11 | 19 | 1 layer: TPMI = 11 | | |
| 20 | 2 layers: TPMI = 6 | 20 | 2 layers: TPMI = 6 | | |
| ... | ... | ... | ... | | |
| 27 | 2 layers: TPMI = 13 | 27 | 2 layers: TPMI = 13 | | |
| 28 | 3 layers: TPMI = 1 | 28 | 3 layers: TPMI = 1 | | |
| 29 | 3 layers: TPMI = 2 | 29 | 3 layers: TPMI = 2 | | |
| 30 | 4 layers: TPMI = 1 | 30 | 4 layers: TPMI = 1 | | |
| 31 | 4 layers: TPMI = 2 | 31 | 4 layers: TPMI = 2 | | |
| 32 | 1 layers: TPMI = 12 | | | | |
| ... | ... | | | | |
| 47 | 1 layers: TPMI = 27 | | | | |
| 48 | 2 layers: TPMI = 14 | | | | |
| ... | ... | | | | |
| 55 | 2 layers: TPMI = 21 | | | | |
| 56 | 3 layers: TPMI = 3 | | | | |
| ... | ... | | | | |
| 59 | 3 layers: TPMI = 6 | | | | |
| 60 | 4 layers: TPMI = 3 | | | | |
| 61 | 4 layers: TPMI = 4 | | | | |
| 62-63 | reserved | | | | |

Table 27 below shows an example of a codebook subset configuration for codebook based uplink transmission of the UE. In particular, Table 27 below relates to a case where the UE uses four antenna ports for the uplink transmission, is configured with the higher layer parameter 'maxRank' having the value of 1 from the BS, and is configured with 'transform precoder' which is the higher layer parameter configured to enabled or disabled. In this case, a value of the precoding and number of layers field included in the DCI format 0_1 may be mapped to one of the indexes in Table 27 below based on the value of 'codebookSubset' which is the higher layer parameter configured from the BS by the UE.

TABLE 27

| Bit field mapped to index | codebookSubset = fullyAndPartialAndNonCoherent | Bit field mapped to index | codebookSubset = partialAndNonCoherent | Bit field mapped to index | codebookSubset = nonCoherent |
|---|---|---|---|---|---|
| 0 | 1 layer: TPMI = 0 | 0 | 1 layer: TPMI = 0 | 0 | 1 layer: TPMI = 0 |
| 1 | 1 layer: TPMI = 1 | 1 | 1 layer: TPMI = 1 | 1 | 1 layer: TPMI = 1 |
| ... | ... | ... | ... | ... | ... |
| 3 | 1 layer: TPMI = 3 | 3 | 1 layer: TPMI = 3 | 3 | 1 layer: TPMI = 3 |
| 4 | 1 layer: TPMI = 4 | 4 | 1 layer: TPMI = 4 | | |
| ... | ... | ... | ... | | |
| 11 | 1 layer: TPMI = 11 | 11 | 1 layer: TPMI = 11 | | |
| 12 | 1 layers: TPMI = 12 | 12-15 | reserved | | |
| ... | ... | | | | |
| 27 | 1 layers: TPMI = 27 | | | | |
| 28-31 | reserved | | | | |

Table 28 below shows an example of a codebook subset configuration for codebook based uplink transmission of the UE. In particular, Table 28 below relates to a case where the UE uses two antenna ports for the uplink transmission and is configured with the higher layer parameter 'maxRank' having the value of 2 from the BS. In this case, a value of the precoding and number of layers field included in the DCI format 0_1 may be mapped to one of the indexes in Table 28 below based on the value of 'codebookSubset' which is the higher layer parameter configured from the BS by the UE.

TABLE 28

| Bit field mapped to index | codebookSubset = fullyAndPartialAndNonCoherent | Bit field mapped to index | codebookSubset = nonCoherent |
|---|---|---|---|
| 0 | 1 layer: TPMI = 0 | 0 | 1 layer: TPMI = 0 |
| 1 | 1 layer: TPMI = 1 | 1 | 1 layer: TPMI = 1 |
| 2 | 2 layers: TPMI = 0 | 2 | 2 layers: TPMI = 0 |
| 3 | 1 layer: TPMI = 2 | 3 | reserved |
| 4 | 1 layer: TPMI = 3 | | |
| 5 | 1 layer: TPMI = 4 | | |
| 6 | 1 layer: TPMI = 5 | | |
| 7 | 2 layers: TPMI = 1 | | |
| 8 | 2 layers: TPMI = 2 | | |
| 9-15 | reserved | | |

Table 29 below shows an example of a codebook subset configuration for codebook based uplink transmission of the UE. In particular, Table 29 below relates to a case where the UE uses two antenna ports for the uplink transmission, is configured with the higher layer parameter 'maxRank' having the value of 1 from the BS, and is configured with 'transform precoder' which is the higher layer parameter configured to disabled. In this case, a value of the precoding and number of layers field included in the DCI format 0_1 may be mapped to one of the indexes in Table 29 below based on the value of 'codebookSubset' which is the higher layer parameter configured from the BS by the UE.

TABLE 29

| Bit field mapped to index | codebookSubset = fullyAndPartialAndNonCoherent | Bit field mapped to index | codebookSubset = nonCoherent |
|---|---|---|---|
| 0 | 1 layer: TPMI = 0 | 0 | 1 layer: TPMI = 0 |
| 1 | 1 layer: TPMI = 1 | 1 | 1 layer: TPMI = 1 |
| 2 | 1 layer: TPMI = 2 | | |
| 3 | 1 layer: TPMI = 3 | | |
| 4 | 1 layer: TPMI = 4 | | |
| 5 | 1 layer: TPMI = 5 | | |
| 6-7 | reserved | | |

Uplink Power Control

In the wireless communication system, transmission power of the terminal (e.g., user equipment (UE) and/or a mobile device may be required to increase or decrease according to a situation. As such, controlling the transmission power of the UE and/or the mobile device may be referred to as uplink power control. As an example, a transmission power control scheme may be applied to satisfy a requirement (e.g., Signal-to-Noise Ratio (SNR), Bit Error Ratio (BER), Block Error Ratio (BLER), etc.) in a BS (e.g., gNB, eNB, etc.).

The power control described above may be performed by an open-loop power control scheme and a closed-loop power control scheme.

Specifically, the open-loop power control scheme means a scheme of controlling the transmission power without a feedback from a transmitting device (e.g., the BS, etc.) to a receiving device (e.g., UE, etc.) and/or a feedback from the receiving device to the transmitting device. As an example, the UE may receive a specific channel/signal (pilot channel/signal) from the BS and estimate a strength of reception power by using the received pilot channel/signal. Thereafter, the UE may control the transmission power by using the estimated strength of the reception power.

In contrast, the closed-loop power control scheme means a scheme of controlling the transmission power based on the feedback from the transmitting device to the receiving device and/or the feedback from the receiving device to the transmitting device. As an example, the BS receives the specific channel/signal (pilot channel/signal) from the UE and determines an optimum power level of the UE based on a power level, SNR, BER, BLER, etc., measured by the received specific channel signal (pilot channel/signal). The BS may transfer information (i.e., feedback) on the determined optimum power level to the UE through a control channel and the corresponding UE may control the transmission power by using the feedback provided by the BS.

Hereinafter, a power control scheme for cases where the UE and/or the mobile device performs uplink transmission to the BS in the wireless communication system will be described in detail.

Specifically, hereinafter, power control schemes for uplink data channel (e.g., Physical Uplink Shared Channel (PUSCH)) transmission will be described. In this case, a transmission occasion (i.e., transmission time unit) (i) for PUSCH may be defined by slot index n_s in a frame of a system frame number (SFN), a first symbol S in the slot, the number L of consecutive symbols, etc.

Power Control of Uplink Data Channel

Hereinafter, for convenience of description, the power control scheme will be described based on the case where the UE performs PUSCH transmission. The corresponding scheme may be extensively applied to another uplink data channel supported in the wireless communication system, of course.

In PUSCH transmission in an active uplink UL bandwidth part (UL BWP) of carrier f of serving cell c, the UE may calculate a liner power value of the transmission power determined by Equation 9 below. Thereafter, the corresponding UE may control the transmission power by considering the calculated linear power value, the number of antenna ports, and/or the number of SRS ports. The UE may scale a linear value with a ratio of the number of antenna ports having non-zero PUSCH transmission power to the maximum SRS port number supported in one SRS resource by the UE. The UE equally splits the power across the antenna port in which the UE transmits the PUSCH with non-zero power.

Specifically, when the UE performs PUSCH transmission in activated UL BWP(b) of carrier f of serving cell c by using a parameter set configuration based on index j and a PUSCH power control adjustment state based on index l, the UE may determine PUSCH transmission power $P_{PUSCH,b,f,c}$ (i,j,$q_d$,l) (dBm) in a PUSCH transmission opportunity i based on Equation 9 below.

$$P_{PUSCH,b,f,c}(i, j, q_d, l) =$$ [Equation 9]

-continued
$$\min \begin{Bmatrix} P_{CMAX,f,c}(i), \\ P_{O\_PUSCH,b,f,c}(j) + 10\log_{10}(2^\mu \cdot M_{RB,b,f,c}^{PUSCH}(i)) + \\ \alpha_{b,f,c}(j) \cdot PL_{b,f,c}(q_d) + \Delta_{TF,b,f,c}(i) + f_{b,f,c}(i, l) \end{Bmatrix}$$

[dBm]

In Equation 9, index j may represent an index for an open loop power control parameter (e.g., Po, alpha (α), etc.) and a maximum of 32 parameter sets per cell may be configured. Index q_d may represent an index of a DL RS resource for PathLoss (PL) measurement (e.g., $PL_{b,f,c}(q_d)$) and a maximum of four measurement values per cell may be configured. Index l may represent an index for a closed loop power control process and a maximum of two processes per cell may be configured.

Specifically, Po (e.g., $P_{O\_PUSCH, b,f,c}(j)$) as a parameter broadcasted to some of system information may represent a target reception power at a receiving side. The corresponding Po value may be configured by considering a throughput of the UE, a capacity of the cell, noise, and/or interference. Further, alpha (e.g., $a_{b,f,c}(j)$) may represent a ratio of performing compensation for pathloss. The alpha may be configured to a value of 0 to 1 and full pathloss compensation or fractional pathloss compensation may be performed according to the configured value. In this case, the alpha value may be configured by considering the interference between the UEs and/or a data speed. Further, $P_{CMAX,f,c}(i)$ may represent a configured UE transmit power. As an example, the configured UE transmit power may be construed as a 'configured maximum UE output power' defined in 3GPP TS 38.101-1 and/or TS38.101-2. Further, $M_{RB,b,f,c}^{PUSCH}(i)$ may represent a bandwidth of PUSCH resource assignment expressed as the number of resource blocks (RBs) for a PUSCH transmission opportunity based on a subcarrier spacing II. Further, $f_{b,f,c}(i,l)$ related to the PUSCH power control adjustment state may be configured or indicated based on a TPC command field of DCI (e.g., DCI format 0_0, DCI format 0_1, DCI format 2_2, DCI format2_3, etc.).

In this case, a specific Radio Resource Control (RRC) parameter (e.g., SRI-PUSCHPowerControl-Mapping, etc.) may represent a linkage between the SRS Resource Indicator (SRI) field of downlink control information (DCI) and the indexes j, q_d, and l. In other words, the indexes j, l, and q_d may be associated with a beam, a panel, and/or a spatial domain transmission filter based on specific information. Therefore, PUSCH transmission power control in units of beam, panel, and/or spatial domain transmission filter may be performed.

Parameters and/or information for the PUSCH power control may be individually (i.e., independently) configured for each BWP. In this case, the parameters and/or information may be configured or indicated through a higher layer signaling (e.g., RRC signaling, Medium Access Control-Control Element (MAC-CE), etc.) and/or DCI. As an example, the parameter and/or information for the PUSCH power control may be transferred through RRC signaling PUSCH-ConfigCommon, PUSCH-PowerControl, etc., and PUSCH-ConfigCommon and PUSCH-PowerControl may be configured as shown in Table 30 below.

TABLE 30

| | |
|---|---|
| PUSCH-ConfigCommon ::= | SEQUENCE { |
| groupHoppingEnabledTransformPrecoding | ENUMERATED {enabled } |
| pusch-TimeDomainAllocationList | PUSCH- |
| TimeDomainResourceAllocationList | |
| msg3-DeltaPreamble | INTEGER (-1..6) |

TABLE 30-continued

| | |
|---|---|
| p0-NominalWithGrant | INTEGER (-202..24) |
| ... | |
| } | |
| PUSCH-PowerControl ::= | SEQUENCE { |
| tpc-Accumulation | ENUMERATED {disabled } |
| msg3-Alpha | Alpha |
| p0-NominalWithoutGrant | INTEGER (-202..24) |
| p0-AlphaSets | SEQUENCE (SIZE (1..maxNrofP0-PUSCH-AlphaSets)) OF P0-PUSCH-AlphaSet |
| pathlossReferenceRSToAddModList | SEQUENCE (SIZE (1..maxNrofPUSCH-PathlossReferenceRSs)) OF PUSCH-PathlossReferenceRS |
| pathlossReferenceRSToReleaseList | SEQUENCE (SIZE (1..maxNrofPUSCH-PathlossReferenceRSs)) OF PUSCH-PathlossReferenceRS-Id |
| twoPUSCH-PC-AdjustmentStates | ENUMERATED {twoStates } |
| deltaMCS | ENUMERATED {enabled } |
| sri-PUSCH-MappingToAddModList | SEQUENCE (SIZE (1..maxNrofSRI-PUSCH-Mappings)) OF SRI-PUSCH-PowerControl |
| sri-PUSCH-MappingToReleaseList | SEQUENCE (SIZE (1..maxNrofSRI-PUSCH-Mappings)) OF SRI-PUSCH-PowerControlId |
| } | |

The UE may determine or calculate the PUSCH transmission power through the scheme and transmit the PUSCH by using the determined or calculated PUSCH transmission power.

Hereinafter, the method for transmitting the uplink signal based on the codebook will be described in detail.

In the present disclosure, the UE may be classified into three types based on a capability related to transmission power which the UE may use during the uplink transmission. The classifying scheme based on the capability related to the uplink transmission power of the UE will be described in more detail with reference to FIG. 21.

Figure 21:
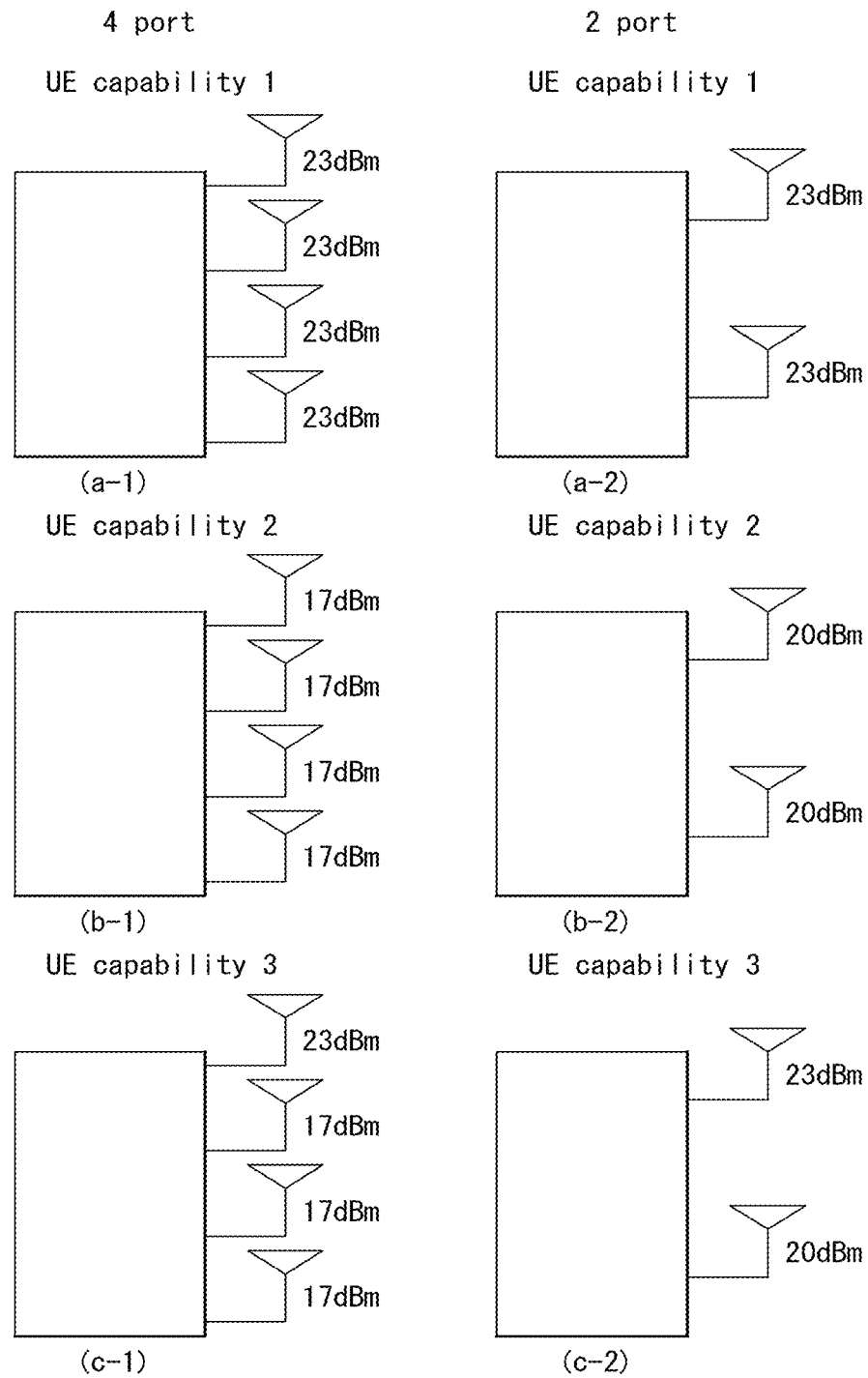
FIG. 21 is a diagram illustrating an example for a configuration scheme of a Tx chain of a UE.

FIG. 21 is a diagram illustrating an example for a configuration scheme of a Tx chain of a UE.

More specifically, FIG. 21 relates to a configuration scheme of the Tx chain of the UE of power class 3 (23 dBm).

FIG. 21(a-1) illustrates an example of power class 3 UE using four antenna ports for the uplink transmission and FIG. 21(a-2) illustrates an example of power class 3 UE using two antenna ports for the uplink transmission. As illustrated in FIGS. 21(a-1) and 21(a-2), a case where all antenna ports which the UE uses for the uplink transmission may achieve the transmission power of 23 dBm is defined as UE capability 1. Here, the antenna ports may be mapped to an antenna element by Tx virtualization, but will be collectively referred to as the antenna port for convenience of description. The UE capability 1 may be expressed as a first capability, a first capability type, etc., and may be variously expressed in a range which is interpreted to be the same or similar thereas, of course.

Further, FIG. 21(b-1) illustrates an example of power class 3 UE using four antenna ports for the uplink transmission and FIG. 21(b-2) illustrates an example of power class 3 UE using two antenna ports for the uplink transmission. As illustrated in FIGS. 21(b-1) and (b-2), a case where 23 dBm may not be achieved with one specific antenna port among the antenna ports which the UE uses for the uplink transmission, i.e., a case where any antenna port may not achieve 23 dBm is defined as UE capability 2. The UE capability 2 may be expressed as a second capability, a second capability type, etc., and may be variously expressed in a range which is interpreted to be the same or similar thereas, of course.

Further, FIG. 21(c-1) illustrates an example of power class 3 UE using four antenna ports for the uplink transmission and FIG. 21(c-2) illustrates an example of power class 3 UE using two antenna ports for the uplink transmission. As illustrated in FIGS. 21(c-1) and (c-2), a case where only one specific antenna port among the antenna ports which the UE uses for the uplink transmission may achieve 23 dBm is defined as UE capability 3. The UE capability 3 may be construed as a combination of UE capability 1 and UE capability 2. The UE capability 3 may be expressed as a third capability, a third capability type, etc., and may be variously expressed in a range which is interpreted to be the same or similar thereas, of course.

The following schemes may be supported for full power transmission for the UE of UE capability 2 and the UE of UE capability 3.

The UE may be configured with one mode of two modes of a full power operation supporting UE capability 2 and UE capability 3 according to the UE capability.

The UE may be configured by the network so as to support the full power transmission.

Mode 1: The UE may be configured with one or more SRS resources of the same number as the number of SRS ports in an SRS resource set in which a higher layer parameter 'usage' is configured to 'codebook'.

In the Mode 1, the BS (gNB) may be configured to use a subset of a transmit precoding matrix indicator combining ports in a layer so as for the UE to perform the full power transmission for the UE.

Further, in the Mode 1, a new codebook subset may be used for a rank value in which the full power transmission in the uplink is not achieved. In this case, the new codebook may include a TPMI included in the codebook subset used when the higher layer parameter 'codebookSubset' is configured to 'fullyAndPartialAndNonCoherent'.

Further, in the Mode 1, a non-antenna selection TPMI precoder may be at least supported.

Further, in the Mode 1, an antenna selection TPMI precoder may be additionally supported.

Mode 2: The UE may be configured with one or more SRS resources of a different number from the number of SRS ports in the SRS resource set in which the higher layer parameter 'usage' is configured to 'codebook'.

In the Mode 2, the UE may transmit the SRS and the PUSCH by the same scheme.

Further, in the Mode 2, the codebooks in Tables 18 to 24 and the codebook subsets in Tables 26 to 29 may be used. Here, the antenna selection precoder may be used in order to enable a full power related power amplifier (PA) so as to perform the full power transmission for UE capability 3.

Further, in the Mode 2, the uplink full power transmission may be achieved for PUSCH transmission according to the indicated SRI and/or TPMI. Here, a set of TPMIs transferring the full power may be signaled for SRS resources of one or more ports by the UE in order to at least support UE capability 3. For example, when the SRI indicating SRSs of multiple ports is transmitted based on an MIMO operation of Rel-15, 1 layer PUSCH may be transmitted with the full power in the same scheme as in a single port SRS for the SRI indicating the SRS resource of one port.

Further, with respect to 4 Tx on a UE side (20+20+17+17 dBm) virtualized by 2 SRS port, a case where the full power transmission is enabled by a precoder [0 1] or [1 0] is not included.

Further, two or three SRS resources may be supported. In addition, with respect to 4 Tx, one or more other TPMIs/TPMI groups may support the full power.

For full power UL transmission of the UE, two modes may be supported/configured. The two modes may be mode 1 and mode 2. In the case of mode 1, the full power uplink transmission is achieved by modifying an uplink codebook subset configurable according to a coherent transmission capability of the UE in Tables 26 to 29. The coherent transmission capability may mean a capability in which the UE constantly maintains a difference between phase values applied to the antenna ports of the UE for the uplink transmission between the antenna ports. The coherent transmission capability may be expressed as a phase difference maintaining capability, a phase coherence maintaining capability, a phase maintaining capability, etc., and variously expressed in a range interpreted to be the same or similar thereas, of course.

The UE may be classified into three types based on a phase value difference maintaining capability between the antenna ports (Tx ports).

First, a UE which may constantly maintain the difference between the phase values applied to the antenna port for all antenna port pairs may be defined as a 'full coherent UE'. A capability of constantly maintaining the difference between the phase values applied to the antenna port for all antenna port pairs may be defined as 'full coherent'. The difference of the phase value may mean a difference on a frequency/time axis.

Second, a UE that may maintain the difference between the phase values applied to the antenna port only for some antenna port pairs and/or some antenna ports among all antenna port pairs may be defined as a 'partial coherent UE'. A capability of maintaining the difference between the phase values applied to the antenna port only for some antenna port pairs among all antenna port pairs may be defined as 'partial coherent'. The difference of the phase value may mean the difference on the frequency/time axis.

Last, a UE which may not maintain the difference between the phase values applied to the antenna port for all antenna port pairs may be defined as a 'non coherent UE'.

That is, in the case of the 'non coherent UE', the difference between the phase values applied to the antenna ports for transmission of the uplink signal may be changed in all antenna port pairs. A capability which may not maintain the difference between the phase values applied to the antenna port for all antenna port pairs may be defined as 'non coherent'. The difference of the phase value may mean the difference on the frequency/time axis.

In the case of the non coherent UE, the UE may be limited to use only a port selection codebook for the uplink signal transmission based on the codebook. Table 31 below shows an example of the codebook for the uplink transmission for rank 1 using two antenna ports.

When the UE is the non-coherent UE and is limited to use only the port selection codebook, the UE may use only a precoding matrix in which the TPMI index is 0 and 1 among precoding matrices included in the codebook of Table 31 below for the uplink transmission. That is, the codebook for the uplink transmission for rank 1 using two antenna ports includes only the precoding matrix in which the TPMI index is 0 and 1.

In this case, in the case of the UE of UE capability 2, since the UE transmits the uplink signal based on power transmittable through only one antenna port, the UE may use only a transmission power of 20 dBm. Accordingly, the UE may not use transmission power of a full power transmission (23 dBm) value for transmitting the uplink signal.

That is, only one antenna port is selected for the uplink signal transmission of the UE based on the precoding matrix in which the TPMI index is 0 and 1. Accordingly, the UE transmits the uplink signal by using only one antenna port and in the example of (b-2) of FIG. 21, since one antenna port may use only the transmission power of 20 dBm, the UE consequently transmits the uplink signal by using only the transmission power of 20 dBm through only one antenna port.

TABLE 31

| TPMI index | W (ordered from left to right in increasing order of TPMI index) |
|---|---|
| 0-5 | $\frac{1}{\sqrt{2}}\begin{bmatrix}1\\0\end{bmatrix}$  $\frac{1}{\sqrt{2}}\begin{bmatrix}0\\1\end{bmatrix}$  $\frac{1}{\sqrt{2}}\begin{bmatrix}1\\1\end{bmatrix}$  $\frac{1}{\sqrt{2}}\begin{bmatrix}1\\-1\end{bmatrix}$  $\frac{1}{\sqrt{2}}\begin{bmatrix}1\\j\end{bmatrix}$  $\frac{1}{\sqrt{2}}\begin{bmatrix}1\\-j\end{bmatrix}$ |

The present disclosure proposes methods for solving a problem that the UE may not perform the uplink transmission based on the full power transmission. More specifically, the present disclosure proposes codebook subset configuring methods capable of facilitating the operation in mode 1 of the UE and increasing uplink transmission performance of the UE.

Hereinafter, a codebook subset configuring method (Proposals 1 and 1-1) for the full power transmission of the non-coherent UE and a codebook subset configuring method (Proposals 2, 2-1, 2-2, and 2-3) for the full power transmission of the partial-coherent UE will be described.

Codebook subset configuring method for full power transmission of non-coherent UE (Proposal 1) In the case of the non-coherent UE, the codebook subset for the full power uplink transmission is configured/applied.

The codebook subset may be a codebook subset used by Rel-16 Mode 1, non-coherent UE.

More specifically, based on the difference between the phase values applied to the antenna ports for the transmission of the uplink signal is not maintained in all antenna port pairs and/or antenna ports, the codebook subset for the uplink signal transmission of the UE may include specific precoding matrices for full power uplink transmission. The specific precoding matrices may be precoding matrices not included in the codebook subset of the case of 'codebookSubset=nonCoherent' of Tables 28 to 29. The UE as the non-coherent UE may perform the full power uplink transmission based on the specific precoding matrices. In this case, the UE may perform the uplink transmission using all antenna ports among the antenna ports for the uplink signal transmission. More specifically, the UE may receive information for determining the transmission power value for the uplink transmission from the BS and determine the uplink transmission power based on the information. In this case, the determined uplink transmission power is divided into a same value and applied across all of the antenna ports for the transmission of the uplink signal. Hereinafter, when the UE performs the full power transmission based on the codebook subset proposed in the present disclosure, the above-described contents may be similarly applied.

Hereinafter, for convenience of description, the precoding matrix may be expressed as TPMI, precoder, codeword, etc.

Table 32 below shows an example of a codebook subset for a case where the UE as the non-coherent UE uses two antenna ports for the uplink transmission and the value of 'maxRank' is 2.

TABLE 32

|  |  | Rel-15, Non-coherent UE | Rel-16 Mode 1, Non-coherent UE |
|---|---|---|---|
| Rank 1 | TPMI index | 0-1 | 0-2 |
| Rank 2 | TPMI index | 0 | 0 |

In Table 32 above, the codebook subset for the case of 'Rel-15, Non-coherent UE' and the codebook subset for the case of 'Rel-16 Mode 1, Non-coherent UE' may be configured based on the codebook of Table 18 and the codebook of Table 21.

The codebook subset for the case of 'Rel-15, Non-coherent UE' is configured to be the same as the codebook subset of a case of 'codebookSubset=nonCoherent' in Table 28. On the contrary, the codebook subset for the case of 'Rel-16 Mode 1, Non-coherent UE' may further include a precoding matrix in which the TPMI index is 2 among the precoding matrices included in the codebook of Table 18 for rank 1.

Table 33 below shows an example of a codebook subset for a case where the UE as the non-coherent UE uses four antenna ports for the uplink transmission and the value of 'maxRank' is 4.

TABLE 33

|  |  | Rel-15, Non-coherent UE | Rel-16 Mode 1, Non-coherent UE |
|---|---|---|---|
| Rank 1 | TPMI index | 0-3 | 0-3, 12 |
| Rank 2 | TPMI index | 0-5 | 0-6 |
| Rank 3 | TPMI index | 0 | 0-1 |
| Rank 4 | TPMI index | 0 | 0 |

In Table 33 above, the codebook subset for the case of 'Rel-15, Non-coherent UE' and the codebook subset for the case of 'Rel-16 Mode 1, Non-coherent UE' may be configured based on at least one codebook of i) one of the codebook of Table 19 or the codebook of Table 20, ii) the codebook of Table 22, iii) the codebook of Table 23, or iv) the codebook of Table 24. When there is no separate description, for the UE that transmits the uplink signal by using four antenna ports, the method for configuring the codebook subset for the case of 'Rel-15, Non-coherent UE' and the codebook subset for the case of 'Rel-16 Mode 1, Non-coherent UE' is the same as the above-described method.

According to Table 33 above, the codebook subset for the case of 'Rel-15, Non-coherent UE' may be configured to be the same as the codebook subset of the case of 'codebookSubset=nonCoherent' in Tables 26 and 27.

On the contrary, the codebook subset for the case of 'Rel-16 Mode 1, Non-coherent UE' may further include a precoding matrix in which the TPMI index is 12 among the precoding matrices included in one codebook of the codebook of Table 19 or 20 for rank 1, further include a precoding matrix in which the TPMI index is 6 among the precoding matrices included in the codebook of Table 22 for rank 2, and further include a precoding matrix in which the TPMI index is 1 among the precoding matrices included in the codebook of Table 23 for rank 3.

The examples of Tables 32 and 33 above are just examples and the method proposed in the present disclosure is not limited thereto.

In the case of the non-coherent UE, since the UE does not have a capability of maintaining a relative phase difference between the antenna ports, there may be no difference in uplink transmission performance even though the full coherent UE selects any TPMI among the TPMIs used for the uplink transmission. That is, regardless of which precoding matrix among the precoding matrices which the full coherent UE uses for the uplink transmission is included in the codebook subset for the uplink transmission of the non-coherent UE, the uplink transmission performance of the UE may be the same. More specifically, when the UE performs the uplink transmission for rank 1 by using two antenna ports, the uplink transmission performance may be the same even though the UE uses any TPMI among TPMIs 2 to 5 used by the full coherent UE.

Accordingly, a principle of the proposal 1 is to add, with respect to a specific rank in which the full power uplink transmission is not supported, one specific TPMI supporting the full power transmission included in the codebook for the specific rank, to the codebook subset for the specific rank. In particular, the proposal 1 may be more preferably applied to the case of the UE of UE capability 2.

As another example of Table 32 above, TPMI 3, 4, or 5 may be added, not TPMI 2 of rank 1 added to the codebook subset.

Further, as another example of Table 33, one specific TPMI among TPMIs 13 to 27 other than TPMI 12 of rank 1 is added to the codebook subset, one specific TPMI among TPMIs 7 to 21 other than TPMI 6 of rank 2 is added to the codebook subset, and one specific TPMI among TPMIs 2 to 6 other than TPMI 1 of rank 3 is added to the codebook subset to configure a new codebook subset.

In particular, in the case of rank 3, referring to Table 23, the transmission power is uneven between layers in TPMI 1. Specifically, since the power of layer 0 is P/2 and the powers of layers 1 and 2 are P/4 (here, P represents the transmission power), the uplink transmission performance of the UE may deteriorate depending on the channel status.

Referring to the codebook for rank 3 of Table 23, it can be seen that the same transmission power is applied in TPMI 3. Accordingly, in order to solve a problem that a different transmission power is applied for each layer in the uplink transmission of rank 3, a codebook subset including both TPMI 1 and TPMI 3 included in the codebook of rank 3 for rank 3 may be configured. Alternatively, a codebook subset including only TPMI 3 may be configured.

Additionally, when the transmission rank of the UE is limited based on an RRC parameter 'maxRank' indicator, the codebook subset may be configured by using even a rank indicated by 'maxRank' in Tables 32 and 33 above. More specifically, when the UE transmitting the uplink signal by using four antenna ports is configured with a 'maxRank' indicator indicating a maximum transmission rank as 2, the codebook subset may be configured as in Table 34 below.

TABLE 34

|  |  | Rel-15, Non-coherent UE | Rel-16 Mode 1, Non-coherent UE |
|---|---|---|---|
| Rank 1 | TPMI index | 0-3 | 0-3, 12 |
| Rank 2 | TPMI index | 0-5 | 0-6 |

As such, the configured codebook subset may include at least one precoding matrix for each rank according to the value of the maximum transmission rank configured based on the maxRank value. In this case, the precoding matrices for each rank may be expressed as a precoding matrix set. In summary, it may be appreciated that the codebook subset is configured in a structure including the precoding matrix set for each rank based on the value of the maximum transmission rank configured based on the maxRank value. The above-described contents may be similarly applied even to the codebook subsets configured based on methods described below.

(Proposal 1-1) Codebook subset based on that maxRank is limited to in uplink transmission of UE in case of non-coherent UE When the UE transmitting the uplink signal by using four antenna ports is configured with the 'maxRank' indicator indicating the maximum transmission rank as 1, the codebook subset may be configured as in Table 35 below.

TABLE 35

|  |  | Rel-15, Non-coherent UE | Rel-16, Mode 1, Non-coherent UE |
|---|---|---|---|
| Rank 1 | TPMI index | 0-3 | 0-3, 12-15 |

When in the case of the UE transmitting the uplink signal by using four antenna ports, the maximum transmission rank is limited to 1 (maxRank=1) or in the case of DFT-s-OFDM (transfer precoding enabled), the UE as the Rel-15, non-coherent UE may be indicated with the TPMI for the uplink transmission based on DCI including a TPMI field having a 2-bit size. That is, the UE as the Rel-15, non-coherent UE may be indicated with the TPMI only by four states (0, 1, 2, and 3).

On the contrary, in the case of the UE as the Rel-16, Mode 1, Non-coherent UE, since a new TPMI is added to the codebook subset for the full power uplink transmission, the size of the TPMI field of the DCI becomes 3 bits (0, 1, 2, 3, and 12). In this case, the proposal proposes a scheme of making maximum use of three remaining states. That is, in Proposal 1, only a single state (TPMI 12) is added and the remaining states are "reserved", but in Proposal 1-1, a scheme of utilizing all of four states (TPMIs 12 to 15) is proposed.

Codebook subset configuring method for full power transmission of partial-coherent UE (Proposal 2) In the case of the partial-coherent UE, the codebook subset for the full power uplink transmission is configured/applied.

The codebook subset may be a codebook subset used by the UE as the Rel-16 Mode 1, partial-coherent UE.

Table 36 below shows an example of a codebook subset for a case where the UE as the partial-coherent UE uses four antenna ports for the uplink signal transmission and the value of 'maxRank' is 4.

TABLE 36

|  |  | Rel-15, Partial-coherent UE | Rel-16, Mode 1, Partial-coherent UE |
|---|---|---|---|
| Rank 1 | TPMI index | 0-11 | 0-15 |
| Rank 2 | TPMI index | 0-13 | 0-13 |
| Rank 3 | TPMI index | 0-2 | 0-2 |
| Rank 4 | TPMI index | 0-2 | 0-2 |

In Table 36 above, the codebook subset for the case of 'Rel-15, partial-coherent UE' and the codebook subset for the case of 'Rel-16 Mode 1, partial-coherent UE' may be configured based on at least one codebook of i) one of the codebook of Table 19 or the codebook of Table 20, ii) the codebook of Table 22, iii) the codebook of Table 23, or iv) the codebook of Table 24. When there is no separate description, for the UE as the partial-coherent UE that transmits the uplink signal by using four antenna ports, the method for configuring the codebook subset for the case of 'Rel-15, Partial-coherent UE' and the codebook subset for the case of 'Rel-16 Mode 1, Partial-coherent UE' is the same as the above-described method.

According to Table 36 above, the codebook subset for the case of 'Rel-15, Partial-coherent UE' may be configured to be the same as the codebook subset of the case of 'codebookSubset=partialAndNonCoherent' in Tables 26 and 27.

On the contrary, the codebook subset for the case of 'Rel-16 Mode 1, Partial-coherent UE' may further include a precoding matrix in which the TPMI index is 12 to 15 among the precoding matrices included in one codebook of the codebook of Table 19 or 20 for rank 1 unlike the case of 'Rel-15, Partial-coherent UE'.

The example of Table 36 above is just an example and the method proposed in the present disclosure is not limited thereto.

In the case of the Partial-coherent UE, the UE partially has a capability of maintaining the relative phase difference between the antenna ports. That is, the phase difference is maintained only for some antenna ports among all antenna ports of the UE.

More specifically, each of antenna ports 0 and 2 (antenna port pair) and/or antenna ports 1 and 3 may have the capability of maintaining the relative phase difference.

Accordingly, in the proposal, it is proposed that the codebook subset includes a specific TPMI group including a relative phase change between the antenna ports. For example, one of four groups of TPMIs 12 to 15/16 to 19/20 to 23/24 to 27 in the codebook of rank 1 may be included in the codebook subset.

In other words, in the proposal, based on that a difference between phase values applied to antenna ports for the transmission of the uplink signal of the UE is maintained in some antenna ports and/or antenna port pairs among all antenna port pairs, the codebook subset may include at least one specific precoding matrix applying different phase values to antenna ports included in all or some of the some antenna ports and/or antenna port pairs.

The at least one specific precoding matrix may be precoding matrices not included in the codebook subset of the case of 'codebookSubset=partialAndNonCoherent' of Tables 26 and 27.

Table 36 above corresponds to an embodiment in which a specific TPMI group includes TPMIs 12 to 15.

As another example, the specific TPMI group may be configured to include TPMIs 12, 17, 22, and 27. As such, based on constituting the specific TPMI group, the difference of the phase value applied to antenna ports respectively included in antenna port pairs ((i) antenna ports 0 and 2 and (ii) antenna ports 1 and 3) may be diversified.

More specifically, referring to Table 19, since TPMI 12 is $$\frac{1}{2}\begin{bmatrix} 1 \\ 1 \\ 1 \\ -1 \end{bmatrix},$$

there is no difference in phase between antenna ports 0 and 2 and there is a phase difference of 180 degrees between antenna ports 1 and 3. Further, since TPMI 17 is $$\frac{1}{2}\begin{bmatrix} 1 \\ j \\ j \\ 1 \end{bmatrix},$$

there is a phase difference of approximately 90 degrees between antenna ports 0 and 2 and there is a phase difference of approximately 90 degrees between antenna ports 1 and 3. Further, since TPMI 22 is $$\frac{1}{2}\begin{bmatrix} 1 \\ -1 \\ -1 \\ -1 \end{bmatrix},$$

there is a phase difference of approximately 180 degrees between antenna ports 0 and 2 and there is no phase difference between antenna ports 1 and 3. Last, since TPMI 27 is $$\frac{1}{2}\begin{bmatrix} 1 \\ -j \\ -j \\ 1 \end{bmatrix},$$

there is a phase difference of approximately 270 degrees between antenna ports 0 and 2 and there is a phase difference of approximately 270 degrees between antenna ports 1 and 3. That is, in the case of TPMIs 11 to 15, the phase difference between the antenna ports respectively included in some antenna port pairs having the phase difference maintaining capability may be equally applied, while when the TPMIs included in the codebook subset is configured as such, the phase difference between the antenna ports included in the antenna ports respectively included in the antenna port pairs may be differently applied.

Since the codebook subset for the case of 'Rel-15, Partial-coherent UE' already supports the full power transmission for ranks 2 to 4, the precoding matrices for ranks 2 to 4 included in the codebook subset may be equally configured in the case of 'Rel-15, Partial-coherent UE' and the case of 'Rel-16, Mode 1, Partial-coherent UE'.

(Proposal 2-1) Codebook subset based on that maxRank is configured to 4 in uplink transmission of UE in case of Partial-coherent UE When the UE as Rel-16, Mode 1, Partial-coherent UE transmits the uplink signal by using four antenna ports and maxRank is configured to 4, the codebook subset may be configured as in Table 37 for the full power uplink transmission.

TABLE 37

| | | Rel-15, Partial-coherent UE | Rel-16, Mode 1, Partial-coherent UE |
|---|---|---|---|
| Rank 1 | TPMI index | 0-11 | 4-15 |
| Rank 2 | TPMI index | 0-13 | 0-13 |
| Rank 3 | TPMI index | 0-2 | 0-2 |
| Rank 4 | TPMI index | 0-2 | 0-2 |

When in the case of the UE transmitting the uplink signal by using four antenna ports, the maximum transmission rank is configured to 4 (maxRank=4) the UE as Rel-15, Partial-coherent UE may be indicated with the TPMI for the uplink transmission based on DCI including a TPMI field having a 5-bit size. That is, since a value acquired by adding all of TPMI state 12 for rank 1, TPMI state 14 for rank 2, TPMI state 3 for rank 3, and TPMI state 3 for rank 3 is 12+14+3+3=32, the UE may be indicated with the TPMI based on the DCI including the TPMI field having the 5-bit size.

On the contrary, referring to Table 36 above, since a value acquired by adding all of TPMI state 16 (TPMIs 12 to 15 are added) for rank 1, TPMI state 14 for rank 2, TPMI state 3 for rank 3, and TPMI state 3 for rank 3 is 16+14+3+3=36, the UE requires the DCI including the TPMI field having a 6-bit size in order to be indicated with the TPMI and the TRI. In this case, since only 36 states among 64 ($2^6$) states are used, 28 states are reserved, and as a result, there may be a problem that the waste of the state is deepened.

In order to solve the problem the state waste, in the proposal, proposed is a method in which when the UE is configured with maxRank=4, only the TPMIs for rank 1 included in the subset include one (e.g., TPMIs 12 to 15) of the groups in which the full power transmission is available is included except for non-coherent codewords (TPMIs 0 to 3).

Additionally, in the proposal, an example of a codebook subset configuration for a case where the maximum transmission rank of the UE transmitting the uplink signal by using four antenna ports is limited to maxRank=1 is shown in Table 38 below.

More specifically, when the maximum transmission rank of the UE is limited to maxRank=1, the codebook subset includes a TPMI which is the same as the TPMI which the UE as Rel-15, Partial-coherent UE uses for rank 1 transmission and may be configured to further include one (e.g., TPMIs 12 to 15) of the groups of the TPMI for rank 1 in which the full power transmission is available. That is, the TPMIs for rank 1 included in the codebook subset may be a TPMI in which the TPMI index is 1 to 15 among the TPMIs included in the codebook for rank 1 transmission using four antenna ports.

TABLE 38

|  |  | Rel-15, Partial-Coherent UE | Rel-16, Mode 1, Partial-coherent UE |
|---|---|---|---|
| Rank 1 | TPMI index | 0-11 | 0-15 |

The principle may be equally applied even to the case of DFT-s-OFDM.

According to the proposal 2-1, the configuration of the precoding matrix set (TPMIs) for rank 1 included in the codebook subset may vary according to maxRank indicated through an RRC signaling. Through such a codebook subset configuration scheme, availability of a payload of the DCI used for indicating the TPMI and/or TRI may be maximized.

(Proposal 2-2) TPMI reduction for ranks 3 and 4 in case of Partial-coherent UE

When the UE as the 'Rel-16 Mode 1, Partial-coherent UE' transmits the uplink signal by using four antenna ports and the maximum transmission rank is configured as maxRank=4, the codebook subset may be configured as in Table 39 for the full power uplink transmission.

TABLE 39

|  |  | Rel-15, Partial-coherent UE | Rel-16, Mode 1, Partial-coherent UE |
|---|---|---|---|
| Rank 1 | TPMI index | 0-11 | 0-15 |
| Rank 2 | TPMI index | 0-13 | 0-13 |
| Rank 3 | TPMI index | 0-2 | 1 |
| Rank 4 | TPMI index | 0-2 | 0 |

According to Table 39 above, the codebook subset for the case of 'Rel-15, Partial-coherent UE' may be configured to be the same as the codebook subset of the case of 'codebookSubset=partialAndNonCoherent' in Tables 26 and 27.

On the contrary, the codebook subset for the case of 'Rel-16 Mode 1, Partial-coherent UE' may further include a precoding matrix in which the TPMI index is 12 to 15 among the precoding matrices included in one codebook of the codebook of Table 19 or 20 for rank 1 unlike the case of 'Rel-15, Partial-coherent UE'. Further, the codebook subset may include only TPMI 1 for rank 3 and include only TPMI 0 for rank 4 unlike the case of 'Rel-15, Partial-coherent UE'.

The proposal is a proposal that reduces the codebook subset for a higher rank (e.g., ranks 3 and 4) and adds TPMI(s) (e.g., TPMIs 12 to 15) for the full power uplink transmission of rank 1. That is, the proposal relates to a method for excluding two TPMIs from the codebook subset in each of ranks 3 and 4 and adding four TPMIs to the codebook subset for rank 1.

In the case of the higher rank, an increase gain of throughput which may be obtained by configuring a codebook size largely is not large. Accordingly, a TPMI for achieving full power is added to rank 1 instead of not configuring the size of the codebook largely, and as a result, there is an effect that a gain by achieving the full power transmission may be further increased.

(Proposal 2-3) In the case of Partial-coherent UE, for the full power uplink transmission, in Tables 26 to 29, the codebook subset for the case of 'codebookSubset=PartialAndNonCoherent' may be used as it is.

The above-described proposed methods (Proposal 1/Proposal 1-1/Proposal 2/Proposal 2-1/Proposal 2-2/Proposal 2-3) are just classified for convenience of description and do not limit the range of the technical spirit of the methods proposed in the present disclosure. For example, the above-described proposed method is individually applied or configured by a combination of one or more proposed methods to be used for codebook based uplink transmission.

Figure 22:
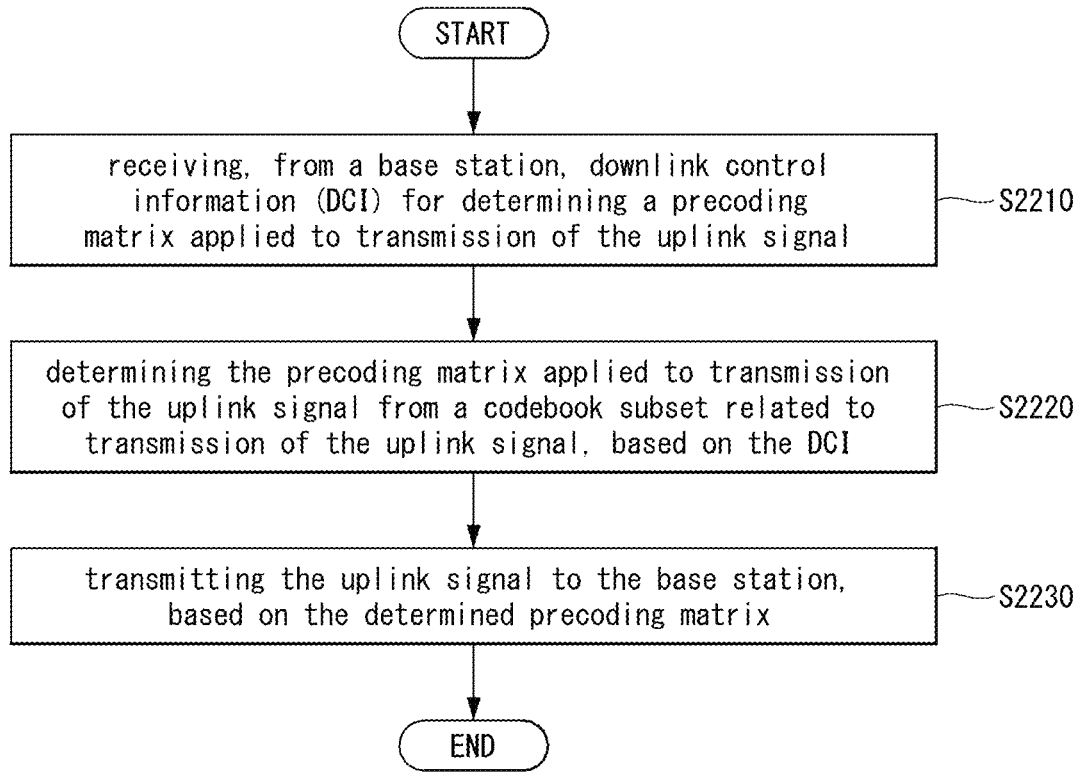
FIG. 22 is a flowchart showing an example an operation implemented in a UE for performing a method in which the UE transmits an uplink signal based on a codebook in a wireless communication system proposed in the present disclosure.

FIG. 22 is a flowchart showing an example of an operation that is implemented in a UE for performing a method in which a UE transmits an uplink signal, based on a codebook, in a wireless communication system proposed in this specification.

In more detail, in order to perform the method in which a UE transmits an uplink signal, based on a codebook, in a wireless communication system, the UE receives downlink control information (DCI) for determining a precoding matrix that is applied to transmission of the uplink signal (S2210).

Next, the UE determines a precoding matrix that is applied to transmission of the uplink signal from a codebook subset related to transmission of the uplink signal, based on the DCI (S2220).

Finally, the UE transmits the uplink signal to the base station, based on the determined precoding matrix (S2230). Here, based on that the differences of phase values applied to antenna ports for transmitting the uplink signal are changed in all pairs of antenna ports, the codebook subset includes at least one specific precoding matrix for full power transmission.

Further, based on that the determined precoding matrix is one precoding matrix of at least one specific precoding matrix, the uplink signal may be transmitted, based on the full power transmission.

Further, based on that the determined precoding matrix is one precoding matrix of at least one specific precoding matrix, the uplink signal may be transmitted through all of the antenna ports for transmitting the uplink signal.

Further, the codebook may include a first codebook for a rank 1 using two antenna ports to transmit the uplink signal and a second codebook for a rank 2 using two antenna ports to transmit the uplink signal. The codebook subset may be configured based on the precoding matrixes included in each of the first codebook and the second codebook. The at least one specific precoding matrix may be included, of a first precoding matrix set for the rank 1 and a second precoding matrix set for the rank 2 that are included in the codebook subset, in the first precoding matrix set.

Further, the precoding matrixes included in each of the first codebook and the second codebook can be indexed by a TPMI (transmit precoding matrix indicator) index.

Further, the first codebook is determined by the following table,

TABLE 40

| TPMI index | W (ordered from left to right in increasing order of TPMI index) |
|---|---|
| 0-5 | $\frac{1}{\sqrt{2}}\begin{bmatrix}1\\0\end{bmatrix}$  $\frac{1}{\sqrt{2}}\begin{bmatrix}0\\1\end{bmatrix}$  $\frac{1}{\sqrt{2}}\begin{bmatrix}1\\1\end{bmatrix}$  $\frac{1}{\sqrt{2}}\begin{bmatrix}1\\-1\end{bmatrix}$  $\frac{1}{\sqrt{2}}\begin{bmatrix}1\\j\end{bmatrix}$  $\frac{1}{\sqrt{2}}\begin{bmatrix}1\\-j\end{bmatrix}$  — — | where, the TPMI index may be indexed in ascending power from the left to the right in the table for the precoding matrixes included in the first codebook.

Further, the at least one specific precoding matrix may be a precoding matrix in which the TPMI index is 2 of the precoding matrixes included in the first codebook.

Further, the codebook may further include (i) a first codebook related to a rank 1 using four antenna ports to transmit the uplink signal, (ii) a second codebook related to a rank 2 using four antennas to transmit the uplink signal, and (iii) a third codebook related to a rank 3 using four antennas to transmit the uplink signal, and (iv) a fourth codebook using four antenna ports to transmit the uplink signal The codebook set may be configured based on precoding matrixes included in each of the first codebook to the fourth codebook.

Here, the at least one specific precoding matrix includes precoding matrixes that are respectively applied to the first rank, the second rank, and the third rank.

There are (i) a first precoding matrix set for the rank 1 included in the codebook set, (ii) a second precoding matrix set for the rank 2, (iii) a third precoding matrix set for the rank 3, and (iv) a fourth precoding matrix set for the rank 4, and the at least one specific precoding matrix may be included in the first precoding matrix set for the rank 1, the second precoding matrix set for the rank 2, and the third precoding matrix set for the rank 3 for each rank.

In this case, the precoding matrixes included in each of the first codebook to the fourth codebook may be indexed by a TPMI index.

Here, the first code book is determined by one of the following tables,

TABLE 41

| TPMI index | W (ordered from left to right in increasing order of TPMI index) |
|---|---|
| 0-7 | $\frac{1}{2}\begin{bmatrix}1\\0\\0\\0\end{bmatrix}$  $\frac{1}{2}\begin{bmatrix}0\\1\\0\\0\end{bmatrix}$  $\frac{1}{2}\begin{bmatrix}0\\0\\1\\0\end{bmatrix}$  $\frac{1}{2}\begin{bmatrix}0\\0\\0\\1\end{bmatrix}$  $\frac{1}{2}\begin{bmatrix}1\\0\\1\\0\end{bmatrix}$  $\frac{1}{2}\begin{bmatrix}1\\0\\-1\\0\end{bmatrix}$  $\frac{1}{2}\begin{bmatrix}1\\0\\j\\0\end{bmatrix}$  $\frac{1}{2}\begin{bmatrix}1\\0\\-j\\0\end{bmatrix}$ |
| 8-15 | $\frac{1}{2}\begin{bmatrix}0\\1\\0\\1\end{bmatrix}$  $\frac{1}{2}\begin{bmatrix}0\\1\\0\\-1\end{bmatrix}$  $\frac{1}{2}\begin{bmatrix}0\\1\\0\\j\end{bmatrix}$  $\frac{1}{2}\begin{bmatrix}0\\1\\0\\-j\end{bmatrix}$  $\frac{1}{2}\begin{bmatrix}1\\1\\1\\-1\end{bmatrix}$  $\frac{1}{2}\begin{bmatrix}1\\1\\j\\j\end{bmatrix}$  $\frac{1}{2}\begin{bmatrix}1\\1\\-1\\1\end{bmatrix}$  $\frac{1}{2}\begin{bmatrix}1\\1\\-j\\-j\end{bmatrix}$ |
| 16-23 | $\frac{1}{2}\begin{bmatrix}1\\j\\1\\j\end{bmatrix}$  $\frac{1}{2}\begin{bmatrix}1\\j\\j\\1\end{bmatrix}$  $\frac{1}{2}\begin{bmatrix}1\\j\\-1\\-j\end{bmatrix}$  $\frac{1}{2}\begin{bmatrix}1\\j\\-j\\-1\end{bmatrix}$  $\frac{1}{2}\begin{bmatrix}1\\-1\\1\\1\end{bmatrix}$  $\frac{1}{2}\begin{bmatrix}1\\-1\\j\\-j\end{bmatrix}$  $\frac{1}{2}\begin{bmatrix}1\\-1\\-1\\-1\end{bmatrix}$  $\frac{1}{2}\begin{bmatrix}1\\-1\\-j\\j\end{bmatrix}$ |
| 24-27 | $\frac{1}{2}\begin{bmatrix}1\\-j\\1\\-j\end{bmatrix}$  $\frac{1}{2}\begin{bmatrix}1\\-j\\j\\-1\end{bmatrix}$  $\frac{1}{2}\begin{bmatrix}1\\-j\\-1\\j\end{bmatrix}$  $\frac{1}{2}\begin{bmatrix}1\\-j\\-j\\1\end{bmatrix}$  —  —  —  — |

TABLE 42

| TPMI index | W (ordered from left to right in increasing order of TPMI index) |
|---|---|
| 0-7 | $\frac{1}{2}\begin{bmatrix}1\\0\\0\\0\end{bmatrix}$ $\frac{1}{2}\begin{bmatrix}0\\1\\0\\0\end{bmatrix}$ $\frac{1}{2}\begin{bmatrix}0\\0\\1\\0\end{bmatrix}$ $\frac{1}{2}\begin{bmatrix}0\\0\\0\\1\end{bmatrix}$ $\frac{1}{2}\begin{bmatrix}1\\0\\1\\0\end{bmatrix}$ $\frac{1}{2}\begin{bmatrix}1\\0\\-1\\0\end{bmatrix}$ $\frac{1}{2}\begin{bmatrix}1\\0\\j\\0\end{bmatrix}$ $\frac{1}{2}\begin{bmatrix}1\\0\\-j\\0\end{bmatrix}$ |
| 8-15 | $\frac{1}{2}\begin{bmatrix}0\\1\\0\\1\end{bmatrix}$ $\frac{1}{2}\begin{bmatrix}0\\1\\0\\-1\end{bmatrix}$ $\frac{1}{2}\begin{bmatrix}0\\1\\0\\j\end{bmatrix}$ $\frac{1}{2}\begin{bmatrix}0\\1\\0\\-j\end{bmatrix}$ $\frac{1}{2}\begin{bmatrix}1\\1\\1\\1\end{bmatrix}$ $\frac{1}{2}\begin{bmatrix}1\\1\\j\\j\end{bmatrix}$ $\frac{1}{2}\begin{bmatrix}1\\1\\-1\\-1\end{bmatrix}$ $\frac{1}{2}\begin{bmatrix}1\\1\\-j\\-j\end{bmatrix}$ |
| 16-23 | $\frac{1}{2}\begin{bmatrix}1\\j\\1\\j\end{bmatrix}$ $\frac{1}{2}\begin{bmatrix}1\\j\\j\\-1\end{bmatrix}$ $\frac{1}{2}\begin{bmatrix}1\\j\\-1\\-j\end{bmatrix}$ $\frac{1}{2}\begin{bmatrix}1\\j\\-j\\1\end{bmatrix}$ $\frac{1}{2}\begin{bmatrix}1\\-1\\1\\-1\end{bmatrix}$ $\frac{1}{2}\begin{bmatrix}1\\-1\\j\\-j\end{bmatrix}$ $\frac{1}{2}\begin{bmatrix}1\\-1\\-1\\1\end{bmatrix}$ $\frac{1}{2}\begin{bmatrix}1\\-1\\-j\\j\end{bmatrix}$ |
| 24-27 | $\frac{1}{2}\begin{bmatrix}1\\-j\\1\\-j\end{bmatrix}$ $\frac{1}{2}\begin{bmatrix}1\\-j\\j\\1\end{bmatrix}$ $\frac{1}{2}\begin{bmatrix}1\\-j\\-1\\j\end{bmatrix}$ $\frac{1}{2}\begin{bmatrix}1\\-j\\-j\\-1\end{bmatrix}$ — — — — | the second code book is determined by the following table,

TABLE 43

| TPMI index | W (ordered from left to right in increasing order of TPMI index) |
|---|---|
| 0-3 | $\frac{1}{2}\begin{bmatrix}1&0\\0&1\\0&0\\0&0\end{bmatrix}$ $\frac{1}{2}\begin{bmatrix}1&0\\0&0\\0&1\\0&0\end{bmatrix}$ $\frac{1}{2}\begin{bmatrix}1&0\\0&0\\0&0\\0&1\end{bmatrix}$ $\frac{1}{2}\begin{bmatrix}0&0\\1&0\\0&1\\0&0\end{bmatrix}$ |
| 4-7 | $\frac{1}{2}\begin{bmatrix}0&0\\1&0\\0&0\\0&1\end{bmatrix}$ $\frac{1}{2}\begin{bmatrix}0&0\\0&0\\1&0\\0&1\end{bmatrix}$ $\frac{1}{2}\begin{bmatrix}1&0\\0&1\\1&0\\0&-j\end{bmatrix}$ $\frac{1}{2}\begin{bmatrix}1&0\\0&1\\1&0\\0&j\end{bmatrix}$ |
| 8-11 | $\frac{1}{2}\begin{bmatrix}1&0\\0&1\\-j&0\\0&1\end{bmatrix}$ $\frac{1}{2}\begin{bmatrix}1&0\\0&1\\-j&0\\0&-1\end{bmatrix}$ $\frac{1}{2}\begin{bmatrix}1&0\\0&1\\-1&0\\0&-j\end{bmatrix}$ $\frac{1}{2}\begin{bmatrix}1&0\\0&1\\-1&0\\0&j\end{bmatrix}$ |
| 12-15 | $\frac{1}{2}\begin{bmatrix}1&0\\0&1\\j&0\\0&1\end{bmatrix}$ $\frac{1}{2}\begin{bmatrix}1&0\\0&1\\j&0\\0&-1\end{bmatrix}$ $\frac{1}{2\sqrt{2}}\begin{bmatrix}1&1\\1&1\\1&-1\\1&-1\end{bmatrix}$ $\frac{1}{2\sqrt{2}}\begin{bmatrix}1&1\\1&1\\j&-j\\j&-j\end{bmatrix}$ |
| 16-19 | $\frac{1}{2\sqrt{2}}\begin{bmatrix}1&1\\j&j\\1&-1\\j&-j\end{bmatrix}$ $\frac{1}{2\sqrt{2}}\begin{bmatrix}1&1\\j&j\\j&-j\\-1&1\end{bmatrix}$ $\frac{1}{2\sqrt{2}}\begin{bmatrix}1&1\\-1&-1\\1&-1\\-1&1\end{bmatrix}$ $\frac{1}{2\sqrt{2}}\begin{bmatrix}1&1\\-1&-1\\j&-j\\-j&j\end{bmatrix}$ |

TABLE 43-continued

| TPMI index | W (ordered from left to right in increasing order of TPMI index) | | | |
|---|---|---|---|---|
| 20-21 | $\frac{1}{2\sqrt{2}}\begin{bmatrix} 1 & 1 \\ -j & -j \\ 1 & -1 \\ -j & j \end{bmatrix}$ | $\frac{1}{2\sqrt{2}}\begin{bmatrix} 1 & 1 \\ -j & -j \\ j & -j \\ 1 & -1 \end{bmatrix}$ | — | — | the third code book is determined by the following table,

TABLE 44

| TPMI index | W (ordered from left to right in increasing order of TPMI index) | | | |
|---|---|---|---|---|
| 0-3 | $\frac{1}{2}\begin{bmatrix} 1 & 0 & 0 \\ 0 & 1 & 0 \\ 0 & 0 & 1 \\ 0 & 0 & 0 \end{bmatrix}$ | $\frac{1}{2}\begin{bmatrix} 1 & 0 & 0 \\ 0 & 1 & 0 \\ 1 & 0 & 0 \\ 0 & 0 & 1 \end{bmatrix}$ | $\frac{1}{2}\begin{bmatrix} 1 & 0 & 0 \\ 0 & 1 & 0 \\ -1 & 0 & 0 \\ 0 & 0 & 1 \end{bmatrix}$ | $\frac{1}{2\sqrt{3}}\begin{bmatrix} 1 & 1 & 1 \\ 1 & -1 & 1 \\ 1 & 1 & -1 \\ 1 & -1 & -1 \end{bmatrix}$ |
| 4-6 | $\frac{1}{2\sqrt{3}}\begin{bmatrix} 1 & 1 & 1 \\ 1 & -1 & 1 \\ j & j & -j \\ j & -j & -j \end{bmatrix}$ | $\frac{1}{2\sqrt{3}}\begin{bmatrix} 1 & 1 & 1 \\ -1 & 1 & -1 \\ 1 & 1 & -1 \\ -1 & 1 & 1 \end{bmatrix}$ | $\frac{1}{2\sqrt{3}}\begin{bmatrix} 1 & 1 & 1 \\ -1 & 1 & -1 \\ j & j & -j \\ -j & j & j \end{bmatrix}$ | — | where, the TPMI index may be indexed in ascending power from the left to the right in the table for the precoding matrixes included in each of the first codebook, the second codebook, and the third codebook.

Here, the precoding matrix that is applied to the rank 1 of the precoding matrixes included in the at least one specific precoding matrix may be a precoding matrix of which the TPMI index is 13 of the precoding matrixes included in the first codebook, the precoding matrix that is applied to the rank 2 of the precoding matrixes included in the at least one specific precoding matrix may be a precoding matrix of which the TPMI index is 6 of the precoding matrixes included in the second codebook, and the precoding matrix that is applied to the rank 3 of the precoding matrixes included in the at least one specific precoding matrix may be a precoding matrix of which the TPMI index is 1 of the precoding matrixes included in the third codebook.

In addition, the UE may determine uplink transmission power for the uplink transmission, based on the DCI. In this case, the DCI may further include information about the optimal power level for uplink transmission and the determined uplink transmission power may be divided and applied into the same values across all the antenna ports for transmission of the uplink signal.

In addition, it is possible to receive configuration information about the maximum rank value for the uplink signal transmission from the base station. In this case, the first precoding matrix set included in the codebook subset may be differently configured, based on the maximum rank value.

Further, based on that the maximum rank value is 1, the precoding matrix that is applied to the rank 1 of the precoding matrixes included in the at least one specific precoding matrix may be a precoding matrix of which the TPMI index is 12 to 15 of the precoding matrixes included in the first codebook.

Further, the UE transmits an uplink signal, based on a codebook in a wireless communication system includes a transmitter for transmitting a radio signal, a receiver for receiving a radio signal, and a processor functionally connected with the transmitter and the receiver. In this case, the processor can control the transmitter and the receiver to perform the operations described with reference to FIG. 22.

Figure 23:
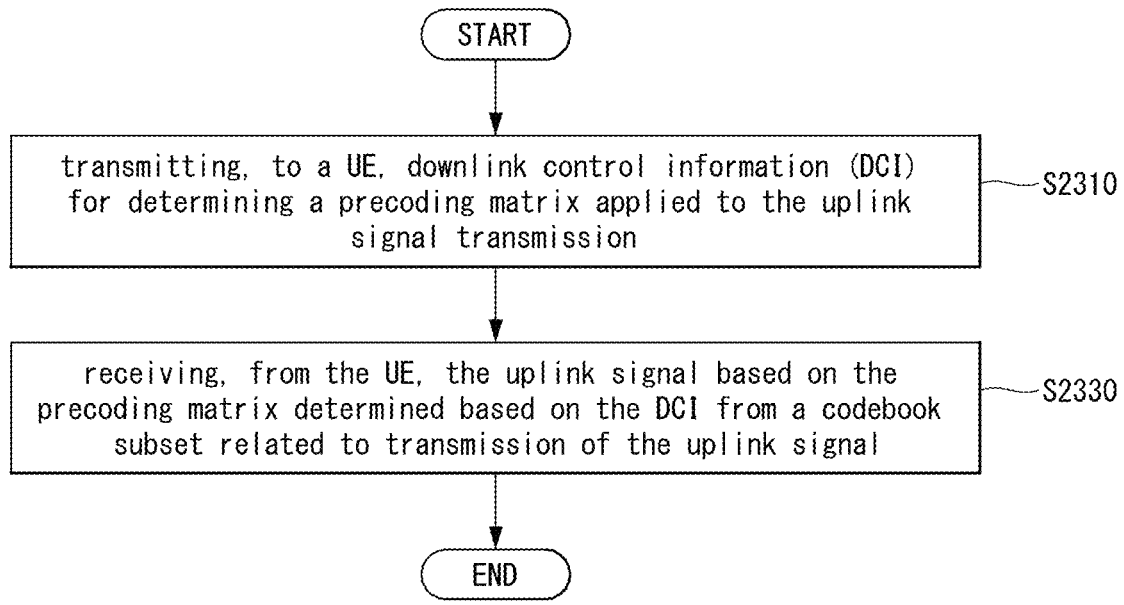
FIG. 23 is a flowchart showing an example an operation implemented in a BS for performing a method in which a UE transmits an uplink signal based on a codebook in a wireless communication system proposed in the present disclosure.

FIG. 23 is a flowchart showing an example of an operation that is implemented in a base station for performing a method in which a UE transmits an uplink signal, based on a codebook, in a wireless communication system proposed in this specification.

In more detail, in order to perform the method of transmitting an uplink signal, based on a codebook, in a wireless communication system, the base station transmits downlink control information (DCI) for determining a precoding matrix that is applied to transmission of the uplink signal to a UE (S2310).

Next, the base station receives the uplink signal based on the precoding matrix determined based on the DCI from the UE (S2320).

ere, based on that the differences of phase values applied to antenna ports for transmitting the uplink signal are changed in all pairs of antenna ports in the UE, the codebook subset includes at least one specific precoding matrix for full power transmission.

Further, the base station receiving an uplink signal, based on a codebook in a wireless communication system includes a transmitter for transmitting a radio signal, a receiver for receiving a radio signal, and a processor functionally connected with the transmitter and the receiver. In this case, the processor can control the transmitter and the receiver to perform the operations described with reference to FIG. 23.

In addition, the apparatus performing the operation described with reference to FIG. 23 may be controlled by the processor. In more detail, in an apparatus including one or more memories and one or more processor functionally connected with the one or more memories, the processors control the apparatus to receive downlink control information (DCI) for determining a precoding matrix, which is applied to transmission of the uplink signal, from a base station.

Next, the processors control the apparatus to determine a precoding matrix that is applied to transmission of the uplink signal from a codebook subset related to transmission of the uplink signal, based on the DCI.

Finally, the processors control the apparatus to transmit the uplink signal to the base station, based on the determined precoding matrix.

Here, based on that the differences of phase values applied to antenna ports for transmitting the uplink signal are changed in all pairs of antenna ports, the codebook subset includes at least one specific precoding matrix for full power transmission.

Further, it is apparent that the processors can control the apparatus to perform the operations described with reference to FIG. 23.

Further, the operation described with reference to FIG. 23 may be performed by a non-temporal computer readable medium (CRM) storing one or more commands. In more detail, the one or more commands that can be executed by the one or more processors make the UE receive downlink control information (DCI) for determining a precoding matrix, which is applied to transmission of the uplink signal, from the base station.

Next, the commands control the UE to determine a precoding matrix that is applied to transmission of the uplink signal from a codebook subset related to transmission of the uplink signal, based on the DCI.

Finally, the commands make the UE transmit the uplink signal to the base station, based on the determined precoding matrix.

Here, based on that the differences of phase values applied to antenna ports for transmitting the uplink signal are changed in all pairs of antenna ports, the codebook subset includes at least one specific precoding matrix for full power transmission.

Signal transmission/reception procedure example applied to present disclosure

Figure 24:
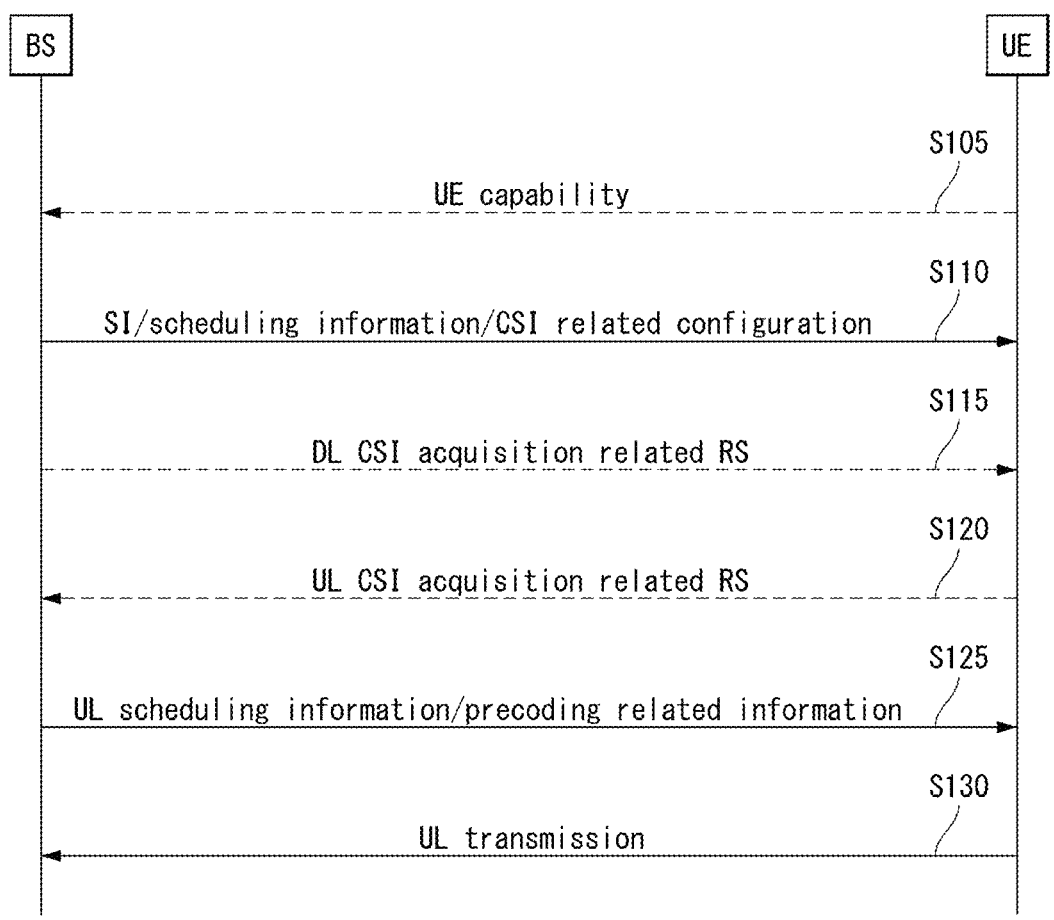
FIG. 24 is a diagram illustrating an example of an uplink transmission signaling procedure to which methods proposed in the present disclosure may be applied.

FIG. 24 is a diagram illustrating an example of an uplink transmission signaling procedure to which methods proposed in the present disclosure may be applied.

An example of signaling between the BS and the UE for the above-described proposed method (Proposal 1/Proposal 1-1/Proposal 2/Proposal 2-1/Proposal 2-2/Proposal 2-3) may be illustrated in FIG. 24. FIG. 24 is just for convenience of the description and does not limit the scope of the present disclosure.

Further, some of steps described in FIG. 24 may be merged or omitted. In performing procedures described below, the above-described CSI related operation may be considered/applied. The operations of the BS and the UE in FIG. 24 may be based on the above-described uplink transmission/reception operations.

BS Operation

A base station (BS) may receive UE capability information from a user equipment (UE) (S105). For example, the UE capability information may include # of supported antenna port/coherency capability (e.g., nonCoherent, partialNonCoherent, fullCoherent)/full power transmission capability. When the UE capability information is predefined/promised, the corresponding step may be omitted.

For example, an operation of the BS (e.g., reference numeral 100200 of FIG. 26) in step S105 described above, which receives the UE capability information from the UE (reference numeral 100/200 of FIGS. 26 to 29) may be implemented by the devices of FIGS. 26 to 29 to be described below. For example, referring to FIG. 26, one or more processors 102 may control one or more transceivers 106 and/or one or more memories 104 to receive the UE capability information, and one or more transceivers 106 may receive the UE capability information from the UE.

The BS may transmit, to the UE, system information (SI) and/or scheduling information and/or CSI related Configuration and/or PUSCH-Config through a higher layer (e.g., RRC or MAC CE). As an example, the information transmitted through the higher layer may be individually/independently transmitted.

For example, an operation of the BS (reference numeral 100/200 of FIG. 26) in step S110 described above, which transmits, to the UE (reference numeral 100/200 of FIGS. 26 to 29), system information (SI) and/or scheduling information and/or CSI related Config and/or PUSCH Config may be implemented by devices of FIGS. 26 to 29 to be described below. For example, referring to FIG. 26, one or more processors 102 may control one or more transceivers 106 and/or one or more memories 104 to transmit the system information (SI) and/or scheduling information and/or CSI related Config, and one or more transceivers 106 may transmit, to the UE, the system information (SI) and/or scheduling information and/or CSI related Config and/or PUSCH Config.

The BS may transmit, to the corresponding UE, RS (e.g., SSB, CSI-RS, TRS, PT-RS, etc.) in order to acquire information on a channel status (i.e., DL CSI acquisition) (S115). As an example, the corresponding step may be based on a CSI related operation.

For example, an operation of the BS (e.g., reference numeral 100/200 of FIG. 26) in step S115 described above, which transmits the DL CSI acquisition related RS to the UE (reference numeral 100/200 of FIGS. 26 to 29) may be implemented by devices of FIGS. 26 to 29 to be described below. For example, referring to FIG. 26, one or more processors 102 may control one or more transceivers 106 and/or one or more memories 104 to transmit the DL CSI acquisition related RS and one or more transceivers 106 may transmit the DL CSI acquisition related RS to the UE.

The BS may receive, from the corresponding UE, RS (e.g., SRS, etc.) in order to acquire information on a channel status (i.e., UL CSI acquisition). As an example, the corresponding step may be based on the above-described CSI related operation. As an example, the RS may be based on channel information calculated based on the DL CSI acquisition related RS in step S115 above. Further, the BS may receive the channel information together with the RS.

For example, an operation of the BS (e.g., reference numeral 100/200 of FIG. 26) in step S120 described above, which receives the UL CSI acquisition related RS from the UE (reference numeral 100/200 of FIGS. 26 to 29) may be implemented by devices of FIGS. 26 to 29 to be described below. For example, referring to FIG. 26, one or more processors 102 may control one or more transceivers 106 and/or one or more memories 104 to receive the UL CSI acquisition related RS and one or more transceivers 106 may receive the UL CSI acquisition related RS from the UE.

The BS may transmit, to the UE, UL scheduling information/precoding related information (S125). As an example, the precoding related information may include information on SRI/TPMI/TRI/MCS. As an example, the UL scheduling information/precoding related information may be DCI format 0-1 or DCI format 0-0. For example, the UL scheduling information/precoding related information may be determined/configured/indicated based on the above-described proposed method (e.g., Proposal 1/Proposal 1-1/Proposal 2/Proposal 2-1/Proposal 2-2/Proposal 2-3). As an example, when the UE is a Non-coherent UE, a codebook subset to be applied to/used for UL transmission of the corresponding UE may be configured/determined/indicated based on Proposal 1/Proposal 1-1 described above. As an example, when the UE is a Partial-coherent UE, the codebook subset to be applied to/used for UL transmission of the corresponding UE may be configured/determined/indicated based on Proposal 2/Proposal 2-1/Proposal 2-2/Proposal 2-3 described above.

For example, an operation of the BS (100/200 of FIG. 26) in step S125 described above, which transmits, to the UE (100/200 of FIGS. 26 to 29), the UL scheduling information/precoding related information may be implemented by the devices of FIGS. 26 to 29 to be described below. For example, referring to FIG. 26, one or more processors 102 may control one or more transceivers 106 and/or one or more memories 104 to transmit the UL scheduling information/precoding related information and one or more transceivers 106 may transmit the UL scheduling information/precoding related information to the UE.

The BS may receive, from the UE, a UL channel/signal transmitted based on the UL scheduling information/precoding related information (S130). As an example, the BS may receive, from the UE, data to which the precoding is applied and RS (e.g., DMRS) for data decoding. For example, the transmission of the UL channel/signal may be based on the above-described method (e.g., Proposal 1/Proposal 1-1/Proposal 2/Proposal 2-1/Proposal 2-2/Proposal 2-3). As an example, the transmission of the UL channel/signal may correspond to full power UL transmission which is based on the above-described method (e.g., Proposal 1/Proposal 1-1/Proposal 2/Proposal 2-1/Proposal 2-2/Proposal 2-3).

For example, an operation of the BS (e.g., reference numeral 100/200 of FIG. 26) in step S130 described above, which receives, from the UE (reference numeral 100/200 of FIGS. 26 to 29), the UL channel/signal may be implemented by the devices of FIGS. 26 to 29 to be described below. For example, referring to FIG. 26, one or more processors 102 may control one or more transceivers 106 and/or one or more memories 104 to receive the UL channel/signal, and one or more transceivers 106 may receive the UL channel/signal from the UE.

UE Operation

A user equipment (UE) may transmit UE capability information to a base station (BS) (S105). For example, the UE capability information may include # of supported antenna port/coherency capability (e.g., nonCoherent, partialNonCoherent, fullCoherent)/full power transmission capability. When the UE capability information is pre-defined/promised, the corresponding step may be omitted.

For example, an operation of the UE (e.g., reference numeral 100/200 of FIGS. 26 to 29) in step S105 described above, which transmits the UE capability information to the BS (reference numeral 100/200 of FIG. 26) may be implemented by the devices of FIGS. 26 to 29 to be described below. For example, referring to FIG. 26, one or more processors 102 may control one or more transceivers 106 and/or one or more memories 104 to transmit the UE capability information, and one or more transceivers 106 may transmit the UE capability information from the UE.

The UE may receive, from the BS, system information (SI) and/or scheduling information and/or CSI related Configuration (the above-described CSI reporting setting/CSI-RS resource setting) and/or PUSCH-Config through a higher layer (e.g., RRC or MAC CE) (S110). As an example, the information transmitted through the higher layer may be individually/independently transmitted.

For example, an operation of the UE (100/200 of FIGS. 26 to 29) in step S110 described above, receives, from the BS (100/200 of FIG. 26), the system information (SI) and/or scheduling information and/or CSI related Config may be implemented by the devices of FIGS. 26 to 29 to be described below. For example, referring to FIG. 26, one or more processors 102 may control one or more transceivers 106 and/or one or more memories 104 to transmit the system information (SI) and/or scheduling information and/or CSI related Config and/or PUSCH Config, and one or more transceivers 106 may receive, from the BS, the system information (SI) and/or scheduling information and/or CSI related Config and/or PUSCH Config.

The UE may receive, from the BS, RS (e.g., SSB, CSI-RS, TRS, PT-RS, etc.) transmitted for acquiring information on a downlink channel status (i.e., DL CSI acquisition) (S115). As an example, the corresponding step may be based on the above-described CSI related operation.

For example, an operation of the UE (e.g., reference numeral 100/200 of FIGS. 26 to 29) in step S115 described above, which receives the DL CSI acquisition related RS from the BS (reference numeral 100/200 of FIG. 26) may be implemented by the devices of FIGS. 26 to 29 to be described below. For example, referring to FIG. 26, one or more processors 102 may control one or more transceivers 106 and/or one or more memories 104 to receive the DL CSI acquisition related RS and one or more transceivers 106 may receive the DL CSI acquisition related RS to the UE.

The UE may transmit, to the BS, RS (e.g., SRS, etc.) in order to acquire information on an uplink channel status (i.e., UL CSI acquisition). As an example, the corresponding step may be based on a CSI related operation. As an example, the RS may be based on channel information calculated based on the DL CSI acquisition related RS in step S115 above. Further, the UE may transmit the channel information together with the RS.

For example, an operation of the UE (e.g., reference numeral 100/200 of FIGS. 26 to 29) in step S210 described above, which transmits the UL CSI acquisition related RS to the BS (reference numeral 100/200 of FIG. 26) may be implemented by the devices of FIGS. 26 to 29 to be described below. For example, referring to FIG. 26, one or more processors 102 may control one or more transceivers 106 and/or one or more memories 104 to transmit the UL CSI acquisition related RS and one or more transceivers 106 may transmit the UL CSI acquisition related RS from the UE.

The UE may receive, from the BS, UL scheduling information/precoding related information (S125). As an example, the precoding related information may include information on SRI/TPMI/TRI/MCS. As an example, the UL scheduling information/precoding related information may be DCI format 0-1 or DCI format 0-0. For example, the UL scheduling information/precoding related information may be determined/configured/indicated based on the above-described proposed method (e.g., Proposal 1/Proposal 1-1/Proposal 2/Proposal 2-1/Proposal 2-2/Proposal 2-3). As an example, when the UE is a Non-coherent UE, a codebook subset to be applied to/used for UL transmission of the corresponding UE may be configured/determined/indicated based on Proposal 1/Proposal 1-1 described above. As an example, when the UE is a Partial-coherent UE, the codebook subset to be applied to/used for UL transmission of the corresponding UE may be configured/determined/indicated based on Proposal 2/Proposal 2-1/Proposal 2-2/Proposal 2-3 described above.

For example, an operation of the UE (100/200 of FIGS. 26 to 29) in step S125 described above, which receives, from the BS (100/200 of FIG. 26), the UL scheduling information/ precoding related information may be implemented by the devices of FIGS. 26 to 29 to be described below. For example, referring to FIG. 26, one or more processors 102 may control one or more transceivers 106 and/or one or more memories 104 to receive the UL scheduling information/precoding related information and one or more transceivers 106 may receive the UL scheduling information/ precoding related information to the UE.

The UE may transmit, to the BS, a UL channel/signal transmitted based on the UL scheduling information/precoding related information (S130). As an example, the UE may transmit, to the BS, data to which the precoding is applied and RS (e.g., DMRS) for data decoding. For example, the transmission of the UL channel/signal may be based on the above-described method (e.g., Proposal 1/Proposal 1-1/Proposal 2/Proposal 2-1/Proposal 2-2/Proposal 2-3). As an example, the transmission of the UL channel/signal may correspond to full power UL transmission which is based on the above-described method (e.g., Proposal 1/Proposal 1-1/ Proposal 2/Proposal 2-1/Proposal 2-2/Proposal 2-3).

For example, an operation of the UE (e.g., reference numeral 100/200 of FIGS. 26 to 29) in step S130 described above, which transmits, to the BS (reference numeral 100/ 200 of FIG. 26), the UL channel/signal may be implemented by the devices of FIGS. 26 to 29 to be described below. For example, referring to FIG. 26, one or more processors 102 may control one or more transceivers 106 and/or one or more memories 104 to receive the UL channel/signal, and one or more transceivers 106 may transmit the UL channel/ signal from the UE.

As mentioned above, the above-described BS/UE operation (e.g., Proposal 1/Proposal 1-1/Proposal 2/Proposal 2-1/ Proposal 2-2/Proposal 2-3/FIG. 24) may be implemented by the devices (FIGS. 26 to 29) to be described below. For example, the UE may correspond to a first wireless device and the BS may correspond to a second wireless device and in some cases, an opposite case thereto may also be considered.

Figure 26:
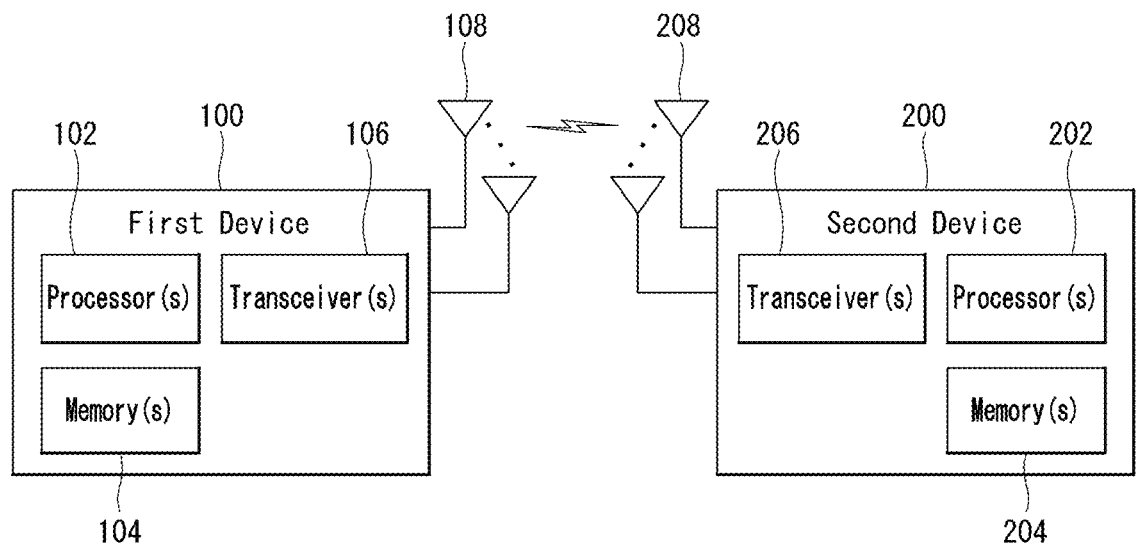
FIG. 26 illustrates a wireless device which may be applied to the present disclosure.

For example, the above-described BS/UE operation (e.g., Proposal 1/Proposal 1-1/Proposal 2/Proposal 2-1/Proposal 2-2/Proposal 2-3/FIG. 24) may be processed by one or more processors (e.g., 102 and 202) of FIGS. 26 to 29 and the BS/UE operation (e.g., Proposal 1/Proposal 1-1/Proposal 2/Proposal 2-1/Proposal 2-2/Proposal 2-3/FIG. 24) may be stored in a memory (e.g., one or more memories (e.g., 104 and 204) of FIG. 26) in the form of an instruction/program (e.g., instruction and executable code) for driving at least one processor (e.g., 102 and 202) of FIGS. 26 to 29.

Example of Communication System to which Present Disclosure is Applied

Although not limited thereto, but various descriptions, functions, procedures, proposals, methods, and/or operation flowcharts of the present disclosure, which are disclosed in this document may be applied to various fields requiring wireless communications/connections (e.g., 5G) between devices.

Hereinafter, the communication system will be described in more detail with reference to drawings. In the following drawings/descriptions, the same reference numerals will refer to the same or corresponding hardware blocks, software blocks, or functional blocks if not differently described.

Figure 25:
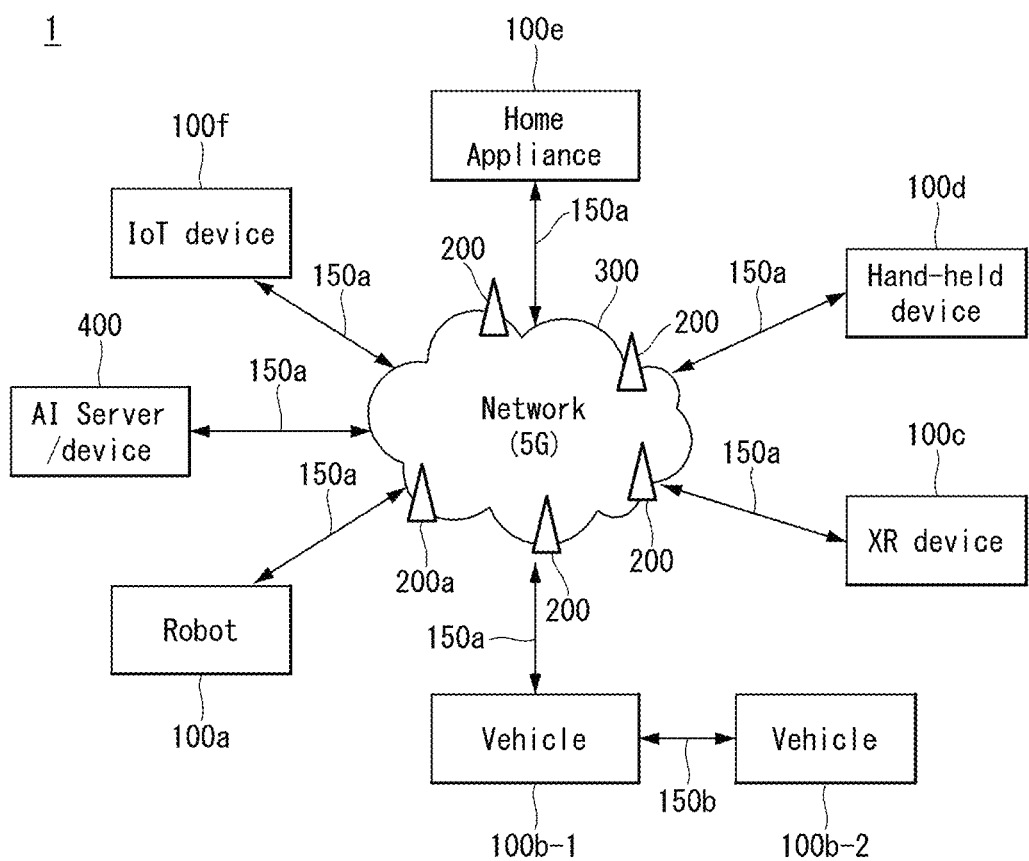
FIG. 25 illustrates a communication system applied to the present disclosure.

FIG. 25 illustrates a communication system applied to the present disclosure.

Referring to FIG. 25, a communication system 1 applied to the present disclosure includes a wireless device, a BS, and a network. Here, the wireless device may mean a device that performs communication by using a wireless access technology (e.g., 5G New RAT (NR) or Long Term Evolution (LTE)) and may be referred to as a communication/ wireless/5G device. Although not limited thereto, the wireless device may include a robot 100*a*. vehicles 100*b*-1 and 100*b*-2, an eXtended Reality (XR) device 100*c*, a hand-held device 100*d*, a home appliance 100*e*, an Internet of Thing (IoT) device 100*f*, and an AI device/server 400. For example, the vehicle may include a vehicle with a wireless communication function, an autonomous driving vehicle, a vehicle capable of performing inter-vehicle communication, and the like. Here, the vehicle may include an Unmanned Aerial Vehicle (UAV) (e.g., drone). The XR device may include an Augmented Reality (AR)/Virtual Reality (VR)/ Mixed Reality (MR) device and may be implemented as a form such as a head-mounted device (HMD), a head-up display (HUD) provided in the vehicle, a television, a smart phone, a computer, a wearable device, a home appliance device, digital signage, a vehicle, a robot, etc. The hand-held device may include the smart phone, a smart pad, a wearable device (e.g., a smart watch, a smart glass), a computer (e.g., a notebook, etc.), and the like. The home appliance device may include a TV, a refrigerator, a washing machine, and the like. The IoT device may include a sensor, a smart meter, and the like. For example, the BS and the network may be implemented even the wireless device and a specific wireless device 200*a* may operate an eNB/network node for another wireless device.

The wireless devices 100*a* to 100*f* may be connected to a network 300 through a BS 200. An artificial intelligence (AI) technology may be applied to the wireless devices 100*a* to 100*f* and the wireless devices 100*a* to 100*f* may be connected to an AI server 400 through the network 300. The network 300 may be configured by using a 3G network, a 4G (e.g., LTE) network, or a 5G (e.g., NR) network. The wireless devices 100*a* to 100*f* may communicate with each other through the BS 200/network 300, but may directly communicate with each other without going through the BS/network (sidelink communication). For example, the vehicles 100*b*-1 and 100*b*-2 may perform direct communication (e.g., Vehicle to Vehicle (V2V)/Vehicle to everything (V2X) communication). Further, the IoT device (e.g., sensor) may perform direct communication with other IoT devices (e.g., sensor) or other wireless devices 100*a* to 100*f*.

Wireless communications/connections 150*a*, 150*b*, and 150*c* may be made between the wireless devices 100*a* to 100*f* and the BS 200 and between the BS 200 and the BS 200. Here, the wireless communication/connection may be made through various wireless access technologies (e.g., 5G NR) such as uplink/downlink communication 150*a*, sidelink communication 150*b* (or D2D communication), and inter- BS communication 150*c* (e.g., relay, Integrated Access Backhaul (IAB). The wireless device and the BS/the wireless device and the BS and the BS may transmit/receive radio signals to/from each other through wireless communications/connections 150*a*, 150*b*, and 150*c*. For example, the wireless communications/connections 150*a*, 150*b*, and 150*c* may transmit/receive signals through various physical channels. To this end, based on various proposals of the present disclosure, at least some of various configuration information setting processes, various signal processing processes (e.g., channel encoding/decoding, modulation/ demodulation, resource mapping/demapping, etc.), a resource allocation process, and the like for transmission/reception of the radio signal may be performed.

Example of Wireless Device to Which Present Disclosure is Applied

FIG. 26 illustrates a wireless device which may be applied to the present disclosure.

Referring to FIG. 26, a first wireless device 100 and a second wireless device 200 may transmit/receive radio signals through various wireless access technologies (e.g., LTE and NR). Here, the first wireless device 100 and the second wireless device 200 may correspond to a wireless device 100x and a BS 200 and/or a wireless device 100x and a wireless device 100x of FIG. 25.

The first wireless device 100 may include one or more processors 102 and one or more memories 104 and additionally further include one or more transceivers 106 and/or one or more antennas 108. The processor 102 may control the memory 104 and/or the transceiver 106 and may be configured to implement descriptions, functions, procedures, proposals, methods, and/or operation flows disclosed in the present disclosure. For example, the processor 102 may process information in the memory 104 and generate a first information/signal and then transmit a radio signal including the first information/signal through the transceiver 106. Further, the processor 102 may receive a radio signal including a second information/signal through the transceiver 106 and then store in the memory 104 information obtained from signal processing of the second information/signal. The memory 104 may connected to the processor 102 and store various information related to an operation of the processor 102. For example, the memory 104 may store a software code including instructions for performing some or all of processes controlled by the processor 102 or performing the descriptions, functions, procedures, proposals, methods, and/or operation flowcharts disclosed in the present disclosure. Here, the processor 102 and the memory 104 may be a part of a communication modem/circuit/chip designated to implement the wireless communication technology (e.g., LTE and NR). The transceiver 106 may be connected to the processor 102 and may transmit and/or receive the radio signals through one or more antennas 108. The transceiver 106 may include a transmitter and/or a receiver. The transceiver 106 may be used mixedly with a radio frequency (RF) unit. In the present disclosure, the wireless device may mean the communication modem/circuit/chip.

The second wireless device 200 may include one or more processors 202 and one or more memories 204 and additionally further include one or more transceivers 206 and/or one or more antennas 208. The processor 202 may control the memory 204 and/or the transceiver 206 and may be configured to implement descriptions, functions, procedures, proposals, methods, and/or operation flows disclosed in the present disclosure. For example, the processor 202 may process information in the memory 204 and generate a third information/signal and then transmit a radio signal including the third information/signal through the transceiver 206. Further, the processor 202 may receive a radio signal including a fourth information/signal through the transceiver 206 and then store in the memory 204 information obtained from signal processing of the fourth information/signal. The memory 204 may connected to the processor 202 and store various information related to an operation of the processor 202. For example, the memory 204 may store a software code including instructions for performing some or all of processes controlled by the processor 202 or performing the descriptions, functions, procedures, proposals, methods, and/or operation flowcharts disclosed in the present disclosure. Here, the processor 202 and the memory 204 may be a part of a communication modem/circuit/chip designated to implement the wireless communication technology (e.g., LTE and NR). The transceiver 206 may be connected to the processor 202 and may transmit and/or receive the radio signals through one or more antennas 208. The transceiver 206 may include a transmitter and/or a receiver and the transceiver 206 may be mixed with the RF unit. In the present disclosure, the wireless device may mean the communication modem/circuit/chip.

Hereinafter, hardware elements of the wireless devices 100 and 200 will be described in more detail. Although not limited thereto, one or more protocol layers may be implemented by one or more processors 102 and 202. For example, one or more processors 102 and 202 may implement one or more layers (e.g., functional layers such as PHY, MAC, RLC, PDCP, RRC, and SDAP). One or more processors 102 and 202 may generate one or more protocol data units (PDUs) and/or one or more service data units (SDUs) according to the descriptions, functions, procedures, proposals, methods, and/or operation flowcharts disclosed in the present disclosure. One or more processors 102 and 202 may generate a message, control information, data, or information according to the descriptions, functions, procedures, proposals, methods, and/or operation flowcharts disclosed in the present disclosure. One or more processors 102 and 202 may generate a signal (e.g., a baseband signal) including the PDU, the SDU, the message, the control information, the data, or the information according to the function, the procedure, the proposal, and/or the method disclosed in the present disclosure and provide the generated signal to one or more transceivers 106 and 206. One or more processors 102 and 202 may receive the signal (e.g., baseband signal) from one or more transceivers 106 and 206 and acquire the PDU, the SDU, the message, the control information, the data, or the information according to the descriptions, functions, procedures, proposals, methods, and/or operation flowcharts disclosed in the present disclosure.

One or more processors 102 and 202 may be referred to as a controller, a microcontroller, a microprocessor, or a microcomputer. One or more processors 102 and 202 may be implemented by hardware, firmware, software, or a combination thereof. As one example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in one or more processors 102 and 202. The descriptions, functions, procedures, proposals, and/or operation flowcharts disclosed in the present disclosure may be implemented by using firmware or software and the firmware or software may be implemented to include modules, procedures, functions, and the like. Firmware or software configured to perform the descriptions, functions, procedures, proposals, and/or operation flowcharts disclosed in the present disclosure may be included in one or more processors 102 and 202 or stored in one or more memories 104 and 204 and driven by one or more processors 102 and 202. The descriptions, functions, procedures, proposals, and/or operation flowcharts disclosed in the present disclosure may be implemented by using firmware or software in the form of a code, the instruction and/or a set form of the instruction.

One or more memories 104 and 204 may be connected to one or more processors 102 and 202 and may store various types of data, signals, messages, information, programs, codes, instructions, and/or commands. One or more memories 104 and 204 may be configured by a ROM, a RAM, an EPROM, a flash memory, a hard drive, a register, a cache memory, a computer reading storage medium, and/or a combination thereof. One or more memories 104 and 204 may be positioned inside and/or outside one or more processors 102 and 202. Further, one or more memories 104 and 204 may be connected to one or more processors 102 and 202 through various technologies such as wired or wireless connection.

One or more transceivers 106 and 206 may transmit to one or more other devices user data, control information, a wireless signal/channel, etc., mentioned in the methods and/or operation flowcharts of the present disclosure. One or more transceivers 106 and 206 may receive from one or more other devices user data, control information, a wireless signal/channel, etc., mentioned in the descriptions, functions, procedures, proposals, methods, and/or operation flowcharts disclosed in the present disclosure. For example, one or more transceivers 106 and 206 may be connected to one or more processors 102 and 202 and transmit and receive the radio signals. For example, one or more processors 102 and 202 may control one or more transceivers 106 and 206 to transmit the user data, the control information, or the radio signal to one or more other devices. Further, one or more processors 102 and 202 may control one or more transceivers 106 and 206 to receive the user data, the control information, or the radio signal from one or more other devices. Further, one or more transceivers 106 and 206 may be connected to one or more antennas 108 and 208 and one or more transceivers 106 and 206 may be configured to transmit and receive the user data, control information, wireless signal/channel, etc., mentioned in the descriptions, functions, procedures, proposals, methods, and/or operation flowcharts disclosed in the present disclosure through one or more antennas 108 and 208. In the present disclosure one or more antennas may be a plurality of physical antennas or a plurality of logical antennas (e.g., antenna ports). One or more transceivers 106 and 206 may convert the received radio signal/channel from an RF band signal to a baseband signal in order to process the received user data, control information, radio signal/channel, etc., by using one or more processors 102 and 202. One or more transceivers 106 and 206 may convert the user data, control information, radio signal/channel, etc., processed by using one or more processors 102 and 202, from the baseband signal into the RF band signal. To this end, one or more transceivers 106 and 206 may include an (analog) oscillator and/or filter.

Example of Signal Processing Circuit to Which Present Disclosure is Applied

Figure 27:
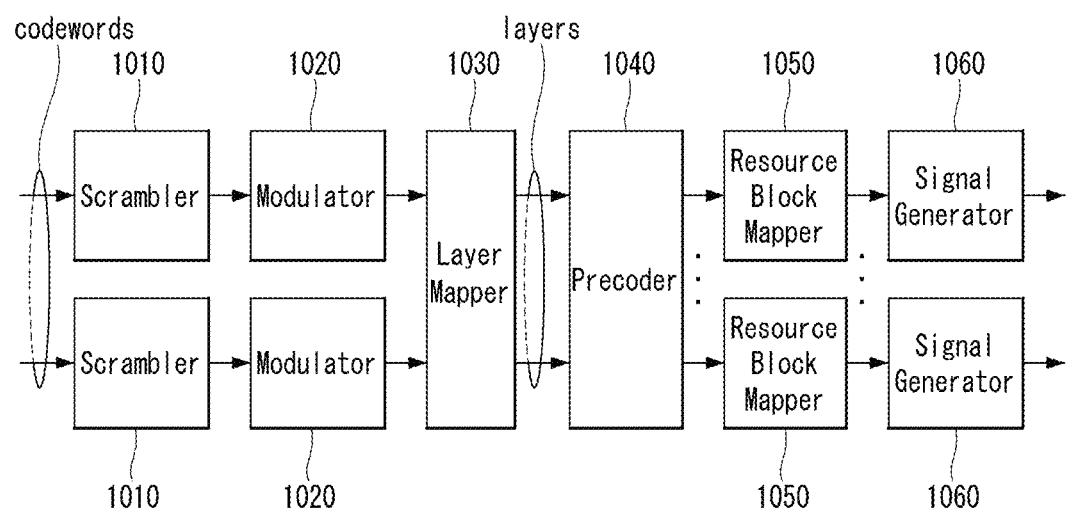
FIG. 27 illustrates a signal processing circuit for a transmit signal.

FIG. 27 illustrates a signal processing circuit for a transmit signal.

Referring to FIG. 27 a signal processing circuit 1000 may include a scrambler 1010, a modulator 1020, a layer mapper 1030, a precoder 1040, a resource mapper 1050, and a signal generator 1060. Although not limited thereto, an operation/function of FIG. 27 may be performed by the processors 102 and 202 and/or the transceivers 106 and 206 of FIG. 26. Hardware elements of FIG. 27 may be implemented in the processors 102 and 202 and/or the transceivers 106 and 206 of FIG. 26. For example, blocks 1010 to 1060 may be implemented in the processors 102 and 202 of FIG. 26. Further, blocks 1010 to 1050 may be implemented in the processors 102 and 202 of FIG. 26 and the block 1060 may be implemented in the transceivers 106 and 206 of FIG. 26.

A codeword may be transformed into a radio signal via the signal processing circuit 1000 of FIG. 27. Here, the codeword is an encoded bit sequence of an information block. The information block may include transport blocks (e.g., a UL-SCH transport block and a DL-SCH transport block). The radio signal may be transmitted through various physical channels (e.g., PUSCH and PDSCH).

Specifically, the codeword may be transformed into a bit sequence scrambled by the scrambler 1010. A scramble sequence used for scrambling may be generated based on an initialization value and the initialization value may include ID information of a wireless device. The scrambled bit sequence may be modulated into a modulated symbol sequence by the modulator 1020. A modulation scheme may include pi/2-Binary Phase Shift Keying (pi/2-BPSK), m-Phase Shift Keying (m-PSK), m-Quadrature Amplitude Modulation (m-QAM), etc. A complex modulated symbol sequence may be mapped to one or more transport layers by the layer mapper 1030. Modulated symbols of each transport layer may be mapped to a corresponding antenna port(s) by the precoder 1040 (precoding). Output z of the precoder 1040 may be obtained by multiplying output y of the layer mapper 1030 by precoding matrix W of N*M. Here, N represents the number of antenna ports and M represents the number of transport layers. Here, the precoder 1040 may perform precoding after performing transform precoding (e.g., DFT transform) for complex modulated symbols. Further, the precoder 1040 may perform the precoding without performing the transform precoding.

The resource mapper 1050 may map the modulated symbols of each antenna port to a time-frequency resource. The time-frequency resource may include a plurality of symbols (e.g., CP-OFDMA symbol and DFT-s-OFDMA symbol) in a time domain and include a plurality of subcarriers in a frequency domain. The signal generator 1060 may generate the radio signal from the mapped modulated symbols and the generated radio signal may be transmitted to another device through each antenna. To this end, the signal generator 1060 may include an Inverse Fast Fourier Transform (IFFT) module, a Cyclic Prefix (CP) insertor, a Digital-to-Analog Converter (DAC), a frequency uplink converter, and the like.

A signal processing process for a receive signal in the wireless device may be configured in the reverse of the signal processing process (1010 to 1060) of FIG. 27. For example, the wireless device (e.g., 100 or 200 of FIG. 26) may receive the radio signal from the outside through the antenna port/transceiver. The received radio signal may be transformed into a baseband signal through a signal reconstructer. To this end, the signal reconstructer may include a frequency downlink converter, an analog-to-digital converter (ADC), a CP remover, and a Fast Fourier Transform (FFT) module. Thereafter, the baseband signal may be reconstructed into the codeword through a resource demapper process, a postcoding process, a demodulation process, and a de-scrambling process. The codeword may be reconstructed into an original information block via decoding. Accordingly, a signal processing circuit (not illustrated) for the receive signal may include a signal reconstructer, a resource demapper, a postcoder, a demodulator, a descrambler, and a decoder.

Utilization Example of Wireless Device to which Present Disclosure is Applied

Figure 28:
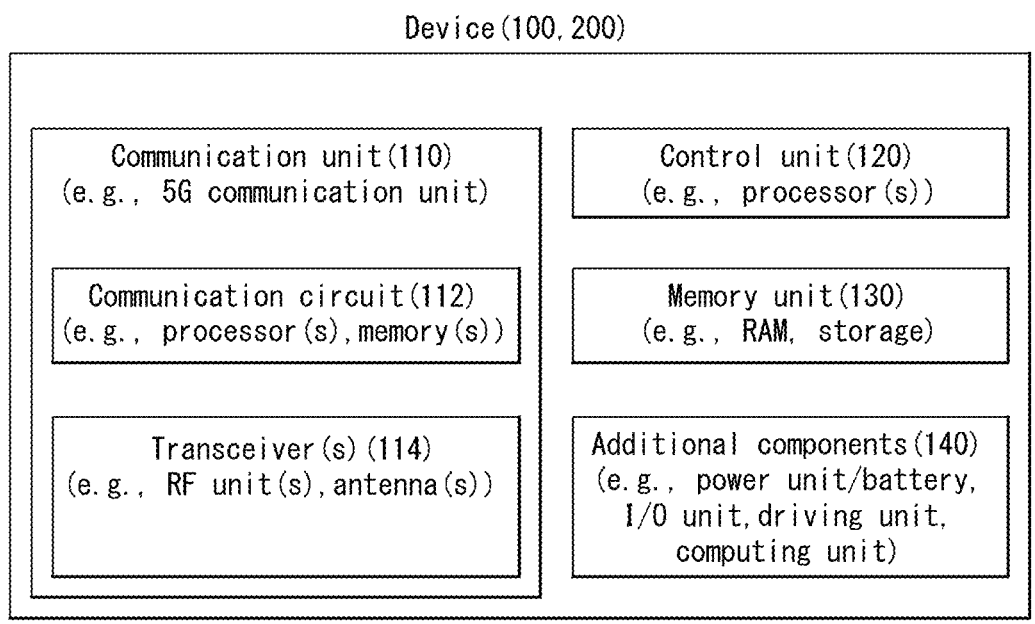
FIG. 28 illustrates another example of a wireless device applied to the present disclosure.

FIG. 28 illustrates another example of a wireless device applied to the present disclosure. The wireless device may be implemented as various types according to a use example/service (see FIG. 25).

Referring to FIG. 28, wireless devices 100 and 200 may correspond to the wireless devices 100 and 200 of FIG. 26 and may be constituted by various elements, components, units, and/or modules. For example, the wireless devices 100 and 200 may include a communication unit 110, a control unit 120, and a memory unit 130, and an additional element 140. The communication unit may include a communication circuit 112 and a transceiver(s) 114. For example, the communication circuit 112 may include one or more processors 102 and 202 and/or one or more memories 104 and 204 of FIG. 26. For example, the transceiver(s) 114 may include one or more transceivers 106 and 206 and/or one or more antennas 108 and 208 of FIG. 26. The control unit 120 is electrically connected to the communication unit 110, the memory unit 130, and the additional element 140 and controls an overall operation of the wireless device. For example, the control unit 120 may an electrical/mechanical operation of the wireless device based on a program/code/instruction/information stored in the memory unit 130. Further, the control unit 120 may transmit the information stored in the memory unit 130 to the outside (e.g., other communication devices) through the communication unit 110 via a wireless/wired interface or store information received from the outside (e.g., other communication devices) through the wireless/wired interface through the communication unit 110.

The additional element 140 may be variously configured according to the type of wireless device. For example, the additional element 140 may include at least one of a power unit/battery, an input/output (I/O) unit, a driving unit, and a computing unit. Although not limited thereto, the wireless device may be implemented as a form such as the robot 100*a* of FIG. 25, the vehicles 100*b*-1 and 100*b*-2 of FIG. 25, the XR device 100*c* of FIG. 25, the portable device 100*d* of FIG. 25, the home appliance 100*e* of FIG. 25, the IoT device 100*f* of FIG. 25, a digital broadcasting terminal, a hologram device, a public safety device, an MTC device, a medical device, a fintech device (or financial device), a security device, a climate/environment device, an AI server/device 400 of FIG. 25, the BS 200 of FIG. 25, a network node, etc. The wireless device may be movable or may be used at a fixed place according to a use example/service.

In FIG. 28, all of various elements, components, units, and/or modules in the wireless devices 100 and 200 may be interconnected through the wired interface or at least may be wirelessly connected through the communication unit 110. For example, the control unit 120 and the communication 110 in the wireless devices 100 and 200 may be wiredly connected and the control unit 120 and the first unit (e.g., 130 or 140) may be wirelessly connected through the communication unit 110. Further, each element, component, unit, and/or module in the wireless devices 100 and 200 may further include one or more elements.

For example, the control unit 120 may be constituted by one or more processor sets. For example, the control unit 120 may be configured a set of a communication control processor, an application processor, an electronic control unit (ECU), a graphic processing processor, a memory control processor, etc. As another example, the memory 130 may be configured as a random access memory (RAM), a dynamic RAM (DRAM), a read only memory (ROM), a flash memory, a volatile memory, a non-volatile memory, and/or combinations thereof.

Hereinafter, an implementation example of FIG. 28 will be described in more detail with reference to the drawings.

Example of AI Device to which the Present Disclosure is Applied

Figure 29:
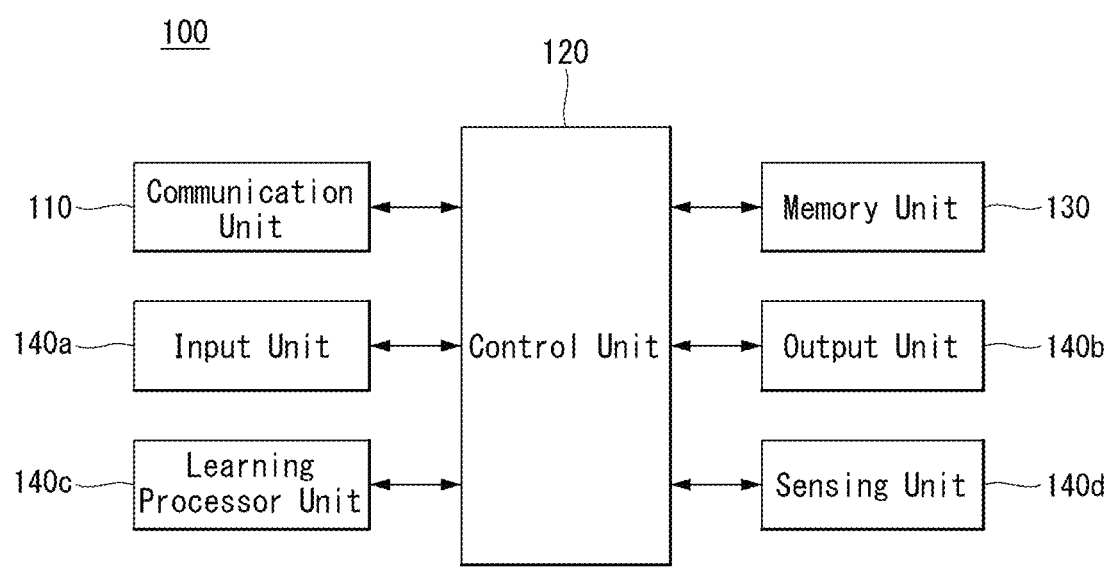
FIG. 29 exemplifies an AI device that is applied to the present disclosure.

FIG. 29 exemplifies an AI device that is applied to the present disclosure. The AI device may be implemented as a fixed device or a mobile device such as a TV, a projector, a smartphone, a PC, a notebook, a terminal for digital broadcasting, a tablet PC, a wearable device, a set-top (STB), a radio, a laundry machine, a refrigerator, a digital signage, a robot, and a vehicle.

Referring to FIG. 29, an AI device 100 may include a communication unit 110, a controller 120, a memory unit 130, an input/output unit 140*a*/140*b*, a running processor unit 140*c*, and a sensor unit 140*d*. Blocks 110~130/140*a*~140*d* respectively correspond to the blocks 110~130/140 of FIG. X3.

The communication unit 110 can transmit/receive wire/wireless signals to/from external devices such as other AI devices (e.g., 100*x*, 200, and 400 in FIG. 25) or an AI server (e.g., 400 in FIG. 25). To this end, the communication unit 110 can transmit information in the memory unit 130 to an external device or can transmit a signal received from the external device to the memory unit 130.

The controller 120 can determine at least one executable operation of the AI device 100, based on information determined or created using a data analysis algorithm or a machine learning algorithm. Further, the controller 120 can perform operations determined by the components of the AI device 100. For example, the controller 120 can request, search for, receive, or use data of the learning processor unit 140 or the memory unit 130, and can control the components of the AI device 100 to perform predicted operations or operations determined as being preferable of at least one executable operation. Further, the controller 120 can collect and store history information including feedback from a user about the operation contents or the operation of the AI device 100 in the memory unit 130 or the learning processor unit 140*c* or can transmit the history information to an external device such as the AI server (400 in FIG. 25). The collected history information can be used to update a learning model.

The memory unit 130 can store data that support various functions of the AI device 100. For example, the memory unit 130 can store data obtained from the input unit 140*a*, data obtained from the communication unit 110, output data of the learning processor unit 140*c*, and data obtained from the sensing unit 140. Further, the memory 130 can store control information and/or software codes for operation/execution of the controller 120.

The input unit 140*a* can acquire various kinds of data from the outside of the AI device (100). For example, the input unit 140*a* can acquire learning data for model learning, input data to which a learning model is applied, etc. The input unit 140*a* may include a camera, a microphone, and/or a user input unit. The output unit 140*b* can generate output related to the sense of sight, the sense of hearing, the sense of touch, or the like. The output unit 140*b* may include a display unit, a speaker, and/or a haptic module. The sensing unit 140 may obtain at least one of the internal information of the AI device 100, the surrounding environment information of the AI device 100, and user information. The sensing unit 140 may include a proximity sensor, an illumination sensor, an acceleration sensor, a magnetic sensor, a gyro sensor, a inertia sensor, an RGB sensor, an IR sensor, a fingerprint recognition sensor, an ultrasonic sensor, a light sensor, a microphone, and/or a radar.

The learning processor unit 140*c* can train a model 151*a* configured as an artificial neural network using learning data. The learning processor unit 140*c* can perform AI processing together with the learning processor unit of the AI server (400 in FIG. 25). The learning processor unit 140*c* can process information received from an external device through the communication unit 110 and/or information stored in the memory unit 130. Further, the output value of the learning processor unit 140*c* can be transmitted to an external device trough the communication unit and/or may be stored in the memory unit 130.

Here, wireless communication technology implemented in wireless devices 100 and 200 of the present disclosure may include Narrowband Internet of Things for low-power communication in addition to LTE, NR, and 6G In this case, for example, NB-IoT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices 100 and 200 of the present disclosure may perform communication based on LTE-M technology. In this case, as an example, the LTE-M technology may be an example of the LPWAN and may be called various names including enhanced Machine Type Communication (eMTC), and the like. For example, the LTE-M technology may be implemented as at least any one of various standards such as 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M. Additionally or alternatively, the wireless communication technology implemented in the wireless devices 100 and 200 of the present disclosure may includes at least one of ZigBee, Bluetooth, and Low Power Wide Area Network (LPWAN) considering the low-power communication, and is not limited to the name described above. As an example, the ZigBee technology may generate personal area networks (PAN) associated with small/low-power digital communication based on various standards including IEEE 802.15.4, and the like, and may be called various names.

It is apparent to those skilled in the art that the present disclosure may be embodied in other specific forms without departing from essential characteristics of the present disclosure. Accordingly, the aforementioned detailed description should not be construed as restrictive in all terms and should be exemplarily considered. The scope of the present disclosure should be determined by rational construing of the appended claims and all modifications within an equivalent scope of the present disclosure are included in the scope of the present disclosure.

The aforementioned embodiments are achieved by combination of structural elements and features of the present invention in a predetermined manner. Each of the structural elements or features should be considered selectively unless specified separately. Each of the structural elements or features may be carried out without being combined with other structural elements or features. In addition, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it is apparent that some claims referring to specific claims may be combined with another claims referring to the other claims other than the specific claims to constitute the embodiment or add new claims by means of amendment after the application is filed.

The embodiments of the present invention may be achieved by various means, for example, hardware, firmware, software, or a combination thereof. In a hardware configuration, the methods according to the embodiments of the present invention may be achieved by one or more ASICs (Application Specific Integrated Circuits), DSPs (Digital Signal Processors), DSPDs (Digital Signal Processing Devices), PLDs (Programmable Logic Devices), FPGAs (Field Programmable Gate Arrays), processors, controllers, microcontrollers, microprocessors, etc.

In a firmware or software configuration, the embodiments of the present invention may be implemented in the form of a module, a procedure, a function, etc. Software code may be stored in the memory and executed by the processor. The memory may be located at the interior or exterior of the processor and may transmit data to and receive data from the processor via various known means.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method in which a user equipment (UE) transmits an uplink signal, based on a codebook, in a wireless communication system, the method comprising:

receiving, from a base station, downlink control information (DCI) for determining a precoding matrix, which is applied to transmission of the uplink signal;

determining, based on the DCI, a precoding matrix that is applied to transmission of the uplink signal, wherein the precoding matrix is determined from a codebook subset related to transmission of the uplink signal; and transmitting the uplink signal to the base station, based on the determined precoding matrix, wherein, based on that the codebook subset is set to nonCoherent, the codebook subset includes at least one specific precoding matrix for full power transmission, and wherein the at least one specific precoding matrix is related to (i) rank 1 uplink transmission using 2 antenna ports and (ii) rank 1, rank 2, and rank 3 uplink transmission using 4 antenna ports.

2. The method of claim 1, wherein UE capability related to coherence is the nonCoherent, and wherein the UE capability of the nonCoherent is that differences between phase values applied to antenna ports for transmitting the uplink signal are changed in all pairs of antenna ports.

3. The method of claim 2, wherein, based on that the determined precoding matrix is one precoding matrix of the at least one specific precoding matrix, the uplink signal is transmitted based on the full power transmission, and wherein, based on that the determined precoding matrix is one precoding matrix of the at least one specific precoding matrix, the uplink signal is transmitted through all of the antenna ports for transmitting the uplink signal.

4. The method of claim 3, further comprising determining uplink transmission power for uplink transmission, based on the DCI, wherein the DCI further includes information about an optimal power level for the uplink transmission, and the determined uplink transmission power is divided and applied into the same values across all of antenna ports for transmitting the uplink signal.

5. The method of claim 3, wherein the codebook includes a first codebook for a rank 1 using two antenna ports to transmit the uplink signal and a second codebook for a rank 2 using two antenna ports to transmit the uplink signal, wherein the codebook subset is configured based on precoding matrices respectively included in the first codebook and the second codebook, and wherein, among a first precoding matrix set for the rank 1 and a second precoding matrix set for the rank 2 that are included in the codebook subset, the at least one specific precoding matrix is included in the first precoding matrix set.

6. The method of claim 5, wherein the precoding matrices respectively included in the first codebook and the second codebook are indexed by a TPMI (transmit precoding matrix indicator) index.

7. The method of claim 6, wherein the first codebook code book is determined by the following table,

TABLE

| TPMI index | W (ordered from left to right in increasing order of TPMI index) | | | | | | | |
|---|---|---|---|---|---|---|---|---|
| 0-5 | $\frac{1}{\sqrt{2}}\begin{bmatrix}1\\0\end{bmatrix}$ | $\frac{1}{\sqrt{2}}\begin{bmatrix}0\\1\end{bmatrix}$ | $\frac{1}{\sqrt{2}}\begin{bmatrix}1\\1\end{bmatrix}$ | $\frac{1}{\sqrt{2}}\begin{bmatrix}1\\-1\end{bmatrix}$ | $\frac{1}{\sqrt{2}}\begin{bmatrix}1\\j\end{bmatrix}$ | $\frac{1}{\sqrt{2}}\begin{bmatrix}1\\-j\end{bmatrix}$ | — | — | where, the TPMI index is indexed in ascending power from the left to the right in the tables for the precoding matrices included in the first codebook.

8. The method of claim 7, wherein the at least one specific precoding matrix is a precoding matrix in which the TPMI index is 2 of the precoding matrices included in the first codebook.

9. The method of claim 3, wherein the codebook further includes (i) a first codebook related to a rank 1 using four antenna ports to transmit the uplink signal, (ii) a second codebook related to a rank 2 using four antennas to transmit the uplink signal, (iii) a third codebook related to a rank 3 using four antennas to transmit the uplink signal, and (iv) a fourth codebook related to a rank 4 using four antenna ports to transmit the uplink signal, and
wherein the codebook subset is configured based on precoding matrices included in each of the first codebook to the fourth codebook.

10. The method of claim 9, wherein the at least one specific precoding matrix includes precoding matrices that are respectively applied to the rank 1, the rank 2, and the rank 3, and
wherein, among (i) a first precoding matrix set for the rank 1, (ii) a second precoding matrix set for the rank 2, (iii) a third precoding matrix set for the rank 3, and (iv) a fourth precoding matrix set for the rank 4 that are included in the codebook subset, the at least one specific precoding matrix is included in the first precoding matrix set for the rank 1, the second precoding matrix set for the rank 2, and the third precoding matrix set for the rank 3 for each rank.

11. The method of claim 10, wherein the precoding matrices included in each of the first codebook to the fourth codebook are indexed by a TPMI index.

12. The method of claim 11, wherein the first codebook is determined by one of the following tables,

TABLE

| TPMI index | W (ordered from left to right in increasing order of TPMI index) | | | | | | | |
|---|---|---|---|---|---|---|---|---|
| 0-7 | $\frac{1}{2}\begin{bmatrix}1\\0\\0\\0\end{bmatrix}$ | $\frac{1}{2}\begin{bmatrix}0\\1\\0\\0\end{bmatrix}$ | $\frac{1}{2}\begin{bmatrix}0\\0\\1\\0\end{bmatrix}$ | $\frac{1}{2}\begin{bmatrix}0\\0\\0\\1\end{bmatrix}$ | $\frac{1}{2}\begin{bmatrix}1\\0\\1\\0\end{bmatrix}$ | $\frac{1}{2}\begin{bmatrix}1\\0\\-1\\0\end{bmatrix}$ | $\frac{1}{2}\begin{bmatrix}1\\0\\j\\0\end{bmatrix}$ | $\frac{1}{2}\begin{bmatrix}1\\0\\-j\\0\end{bmatrix}$ |
| 8-15 | $\frac{1}{2}\begin{bmatrix}0\\1\\0\\1\end{bmatrix}$ | $\frac{1}{2}\begin{bmatrix}0\\1\\0\\-1\end{bmatrix}$ | $\frac{1}{2}\begin{bmatrix}0\\1\\0\\j\end{bmatrix}$ | $\frac{1}{2}\begin{bmatrix}0\\1\\0\\-j\end{bmatrix}$ | $\frac{1}{2}\begin{bmatrix}1\\1\\1\\-1\end{bmatrix}$ | $\frac{1}{2}\begin{bmatrix}1\\1\\j\\j\end{bmatrix}$ | $\frac{1}{2}\begin{bmatrix}1\\1\\-1\\1\end{bmatrix}$ | $\frac{1}{2}\begin{bmatrix}1\\1\\-j\\-j\end{bmatrix}$ |
| 16-23 | $\frac{1}{2}\begin{bmatrix}1\\j\\1\\j\end{bmatrix}$ | $\frac{1}{2}\begin{bmatrix}1\\j\\j\\1\end{bmatrix}$ | $\frac{1}{2}\begin{bmatrix}1\\j\\-1\\-j\end{bmatrix}$ | $\frac{1}{2}\begin{bmatrix}1\\j\\-j\\-1\end{bmatrix}$ | $\frac{1}{2}\begin{bmatrix}1\\-1\\1\\1\end{bmatrix}$ | $\frac{1}{2}\begin{bmatrix}1\\-1\\j\\-j\end{bmatrix}$ | $\frac{1}{2}\begin{bmatrix}1\\-1\\-1\\-1\end{bmatrix}$ | $\frac{1}{2}\begin{bmatrix}1\\-1\\-j\\-j\end{bmatrix}$ |
| 24-27 | $\frac{1}{2}\begin{bmatrix}1\\-j\\1\\-j\end{bmatrix}$ | $\frac{1}{2}\begin{bmatrix}1\\-j\\j\\-1\end{bmatrix}$ | $\frac{1}{2}\begin{bmatrix}1\\-j\\-1\\j\end{bmatrix}$ | $\frac{1}{2}\begin{bmatrix}1\\-j\\-j\\1\end{bmatrix}$ | — | — | — | — |

TABLE

| TPMI index | W (ordered from left to right in increasing order of TPMI index) | | | | | | | |
|---|---|---|---|---|---|---|---|---|
| 0-7 | $\frac{1}{2}\begin{bmatrix}1\\0\\0\\0\end{bmatrix}$ | $\frac{1}{2}\begin{bmatrix}0\\1\\0\\0\end{bmatrix}$ | $\frac{1}{2}\begin{bmatrix}0\\0\\1\\0\end{bmatrix}$ | $\frac{1}{2}\begin{bmatrix}0\\0\\0\\1\end{bmatrix}$ | $\frac{1}{2}\begin{bmatrix}1\\0\\1\\0\end{bmatrix}$ | $\frac{1}{2}\begin{bmatrix}1\\0\\-1\\0\end{bmatrix}$ | $\frac{1}{2}\begin{bmatrix}1\\0\\j\\0\end{bmatrix}$ | $\frac{1}{2}\begin{bmatrix}1\\0\\-j\\0\end{bmatrix}$ |
| 8-15 | $\frac{1}{2}\begin{bmatrix}0\\1\\0\\1\end{bmatrix}$ | $\frac{1}{2}\begin{bmatrix}0\\1\\0\\-1\end{bmatrix}$ | $\frac{1}{2}\begin{bmatrix}0\\1\\0\\j\end{bmatrix}$ | $\frac{1}{2}\begin{bmatrix}0\\1\\0\\-j\end{bmatrix}$ | $\frac{1}{2}\begin{bmatrix}1\\1\\1\\1\end{bmatrix}$ | $\frac{1}{2}\begin{bmatrix}1\\1\\j\\j\end{bmatrix}$ | $\frac{1}{2}\begin{bmatrix}1\\1\\-1\\-1\end{bmatrix}$ | $\frac{1}{2}\begin{bmatrix}1\\1\\-j\\-j\end{bmatrix}$ |
| 16-23 | $\frac{1}{2}\begin{bmatrix}1\\j\\1\\j\end{bmatrix}$ | $\frac{1}{2}\begin{bmatrix}1\\j\\j\\-1\end{bmatrix}$ | $\frac{1}{2}\begin{bmatrix}1\\j\\-1\\-j\end{bmatrix}$ | $\frac{1}{2}\begin{bmatrix}1\\j\\-j\\1\end{bmatrix}$ | $\frac{1}{2}\begin{bmatrix}1\\-1\\1\\-1\end{bmatrix}$ | $\frac{1}{2}\begin{bmatrix}1\\-1\\j\\-j\end{bmatrix}$ | $\frac{1}{2}\begin{bmatrix}1\\-1\\-1\\1\end{bmatrix}$ | $\frac{1}{2}\begin{bmatrix}1\\-1\\-j\\j\end{bmatrix}$ |
| 24-27 | $\frac{1}{2}\begin{bmatrix}1\\-j\\1\\-j\end{bmatrix}$ | $\frac{1}{2}\begin{bmatrix}1\\-j\\j\\1\end{bmatrix}$ | $\frac{1}{2}\begin{bmatrix}1\\-j\\-1\\j\end{bmatrix}$ | $\frac{1}{2}\begin{bmatrix}1\\-j\\-j\\-1\end{bmatrix}$ | — | — | — | — | the second codebook is determined by the following table,

TABLE

| TPMI index | W (ordered from left to right in increasing order of TPMI index) | | | |
|---|---|---|---|---|
| 0-3 | $\frac{1}{2}\begin{bmatrix}1&0\\0&1\\0&0\\0&0\end{bmatrix}$ | $\frac{1}{2}\begin{bmatrix}1&0\\0&0\\0&1\\0&0\end{bmatrix}$ | $\frac{1}{2}\begin{bmatrix}1&0\\0&0\\0&0\\0&1\end{bmatrix}$ | $\frac{1}{2}\begin{bmatrix}0&0\\1&0\\0&1\\0&0\end{bmatrix}$ |
| 4-7 | $\frac{1}{2}\begin{bmatrix}0&0\\1&0\\0&0\\0&1\end{bmatrix}$ | $\frac{1}{2}\begin{bmatrix}0&0\\0&0\\1&0\\0&1\end{bmatrix}$ | $\frac{1}{2}\begin{bmatrix}1&0\\0&1\\1&0\\0&-j\end{bmatrix}$ | $\frac{1}{2}\begin{bmatrix}1&0\\0&1\\1&0\\0&j\end{bmatrix}$ |
| 8-11 | $\frac{1}{2}\begin{bmatrix}1&0\\0&1\\-j&0\\0&1\end{bmatrix}$ | $\frac{1}{2}\begin{bmatrix}1&0\\0&1\\-j&0\\0&-1\end{bmatrix}$ | $\frac{1}{2}\begin{bmatrix}1&0\\0&1\\-1&0\\0&-j\end{bmatrix}$ | $\frac{1}{2}\begin{bmatrix}1&0\\0&1\\-1&0\\0&j\end{bmatrix}$ |
| 12-15 | $\frac{1}{2}\begin{bmatrix}1&0\\0&1\\j&0\\0&1\end{bmatrix}$ | $\frac{1}{2}\begin{bmatrix}1&0\\0&1\\j&0\\0&-1\end{bmatrix}$ | $\frac{1}{2\sqrt{2}}\begin{bmatrix}1&1\\1&1\\1&-1\\1&-1\end{bmatrix}$ | $\frac{1}{2\sqrt{2}}\begin{bmatrix}1&1\\1&1\\j&-j\\j&-j\end{bmatrix}$ |
| 16-19 | $\frac{1}{2\sqrt{2}}\begin{bmatrix}1&1\\j&j\\1&-1\\j&-j\end{bmatrix}$ | $\frac{1}{2\sqrt{2}}\begin{bmatrix}1&1\\j&j\\j&-j\\-1&1\end{bmatrix}$ | $\frac{1}{2\sqrt{2}}\begin{bmatrix}1&1\\-1&-1\\1&-1\\-1&1\end{bmatrix}$ | $\frac{1}{2\sqrt{2}}\begin{bmatrix}1&1\\-1&-1\\j&-j\\-j&j\end{bmatrix}$ |

TABLE-continued

| TPMI index | W (ordered from left to right in increasing order of TPMI index) | | | |
|---|---|---|---|---|
| 20-21 | $\frac{1}{2\sqrt{2}}\begin{bmatrix}1 & 1\\-j & -j\\1 & -1\\-j & j\end{bmatrix}$ | $\frac{1}{2\sqrt{2}}\begin{bmatrix}1 & 1\\-j & -j\\j & -j\\1 & -1\end{bmatrix}$ | — | — | the third codebook is determined by the following table, and

TABLE

| TPMI index | W (ordered from left to right in increasing order of TPMI index) | | | |
|---|---|---|---|---|
| 0-3 | $\frac{1}{2}\begin{bmatrix}1 & 0 & 0\\0 & 1 & 0\\0 & 0 & 1\\0 & 0 & 0\end{bmatrix}$ | $\frac{1}{2}\begin{bmatrix}1 & 0 & 0\\0 & 1 & 0\\1 & 0 & 0\\0 & 0 & 1\end{bmatrix}$ | $\frac{1}{2}\begin{bmatrix}1 & 0 & 0\\0 & 1 & 0\\-1 & 0 & 0\\0 & 0 & 1\end{bmatrix}$ | $\frac{1}{2\sqrt{3}}\begin{bmatrix}1 & 1 & 1\\1 & -1 & 1\\1 & 1 & -1\\1 & -1 & -1\end{bmatrix}$ |
| 4-6 | $\frac{1}{2\sqrt{3}}\begin{bmatrix}1 & 1 & 1\\1 & -1 & 1\\j & j & -j\\j & -j & -j\end{bmatrix}$ | $\frac{1}{2\sqrt{3}}\begin{bmatrix}1 & 1 & 1\\-1 & 1 & -1\\1 & 1 & -1\\-1 & 1 & 1\end{bmatrix}$ | $\frac{1}{2\sqrt{3}}\begin{bmatrix}1 & 1 & 1\\-1 & 1 & -1\\j & j & -j\\-j & j & j\end{bmatrix}$ | — | where, the TPMI index are indexed in ascending power from the left to the right in the table for the precoding matrices included in each of the first codebook, the second codebook, and the third codebook.

13. The method of claim 12, wherein a precoding matrix that is applied to the rank 1 of the precoding matrices included in the at least one specific precoding matrix is a precoding matrix of which the TPMI index is 13 of precoding matrices included in the first codebook,
wherein a precoding matrix that is applied to the rank 2 of the precoding matrices included in the at least one specific precoding matrix is a precoding matrix of which the TPMI index is 6 of precoding matrices included in the second codebook, and
wherein the precoding matrix that is applied to the rank 3 of the precoding matrices included in the at least one specific precoding matrix is a precoding matrix of which the TPMI index is 1 of precoding matrices included in the third codebook.

14. The method of claim 12, further comprising receiving, from the base station, configuration information about a maximum rank value for the uplink signal transmission,
wherein the first precoding set included in the codebook subset is differently configured based on the maximum rank value.

15. The method of claim 14, wherein, based on that the maximum rank value is 1, the precoding matrix that is applied to the rank 1 of the precoding matrices included in the at least one specific precoding matrix is a precoding matrix of which the TPMI index is 12 to 15 of the precoding matrices included in the first codebook.

16. A user equipment (UE) configured to transmit an uplink signal, based on a codebook, in a wireless communication system, the UE comprising:
a transmitter;
a receiver; and
a processor functionally connected with the transmitter and the receiver,
wherein the processor is configured to:
control the receiver to receive, from a base station, downlink control information (DCI) for determining a precoding matrix, which is applied to the uplink signal transmission, and
determine, based on the DCI, a precoding matrix that is applied to transmission of the uplink signal, wherein the precoding matrix is determined from a codebook subset related to transmission of the uplink signal; and
controls the transmitter to transmit the uplink signal to the base station, based on the determined precoding matrix,
wherein, based on that the codebook subset is set to nonCoherent, the codebook subset includes at least one specific precoding matrix for full power transmission, and
wherein the at least one specific precoding matrix is related to (i) rank 1 uplink transmission using 2 antenna ports and (ii) rank 1, rank 2, and rank 3 uplink transmission using 4 antenna ports.

17. A method in which a base station receives an uplink signal, based on a codebook, in a wireless communication system, the method comprising:
transmitting, to a user equipment (UE), downlink control information (DCI) for determining a precoding matrix, which is applied to the uplink signal transmission, to the UE; and
receiving, from the UE, the uplink signal based on the precoding matrix determined based on the DCI, wherein the precoding matrix is from a codebook subset related to transmission of the uplink signal,
wherein, based on that the codebook subset is set to nonCoherent, the codebook subset includes at least one specific precoding matrix for full power transmission, and wherein the at least one specific precoding matrix is related to (i) rank 1 uplink transmission using 2 antenna ports and (ii) rank 1, rank 2, and rank 3 uplink transmission using 4 antenna ports.

18. A base station configured to receive an uplink signal, based on a codebook, in a wireless communication system, the base station comprising:

a transmitter;

a receiver; and a processor functionally connected with the transmitter and the receiver, wherein the processor is configured to:

control the transmitter to transmit, to the UE, downlink control information (DCI) for determining a precoding matrix, which is applied to the uplink signal transmission; and controls the receiver to receive, from the UE, the uplink signal based on the precoding matrix determined based on the DCI, wherein the precoding matrix is from a codebook subset related to transmission of the uplink signal, wherein, based on that the codebook subset is set to nonCoherent, the codebook subset includes at least one specific precoding matrix for full power transmission, and wherein the at least one specific precoding matrix is related to (i) rank 1 uplink transmission using 2 antenna ports and (ii) rank 1, rank 2, and rank 3 uplink transmission using 4 antenna ports.

* * * * *

UNITED STATES PATENT AND TRADEMARK OFFICE
CERTIFICATE OF CORRECTION

PATENT NO. : 11,095,348 B2
APPLICATION NO. : 16/993971
DATED : August 17, 2021
INVENTOR(S) : Park et al.

Page 1 of 1

It is certified that error appears in the above-identified patent and that said Letters Patent is hereby corrected as shown below:

In the Claims

In Column 95, Line 5-9, in Claim 7, after codebook delete "code book".

Signed and Sealed this
Twenty-sixth Day of October, 2021

Drew Hirshfeld
*Performing the Functions and Duties of the*
*Under Secretary of Commerce for Intellectual Property and*
*Director of the United States Patent and Trademark Office*